(12) United States Patent
Takeda et al.

(10) Patent No.: US 7,110,063 B2
(45) Date of Patent: Sep. 19, 2006

(54) LIQUID CRYSTAL DISPLAY AND METHOD OF MANUFACTURING THE SAME

(75) Inventors: Arihiro Takeda, Kawasaki (JP); Kimiaki Nakamura, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 10/236,002

(22) Filed: Sep. 5, 2002

(65) Prior Publication Data

US 2003/0058374 A1   Mar. 27, 2003

(30) Foreign Application Priority Data

Sep. 7, 2001   (JP) ............................. 2001-272355
Dec. 27, 2001   (JP) ............................. 2001-398317

(51) Int. Cl.
*G02F 1/133*   (2006.01)
*G02F 1/1337*   (2006.01)

(52) U.S. Cl. ..................... 349/85; 349/130; 349/138; 349/143; 349/178

(58) Field of Classification Search .................. 349/38, 349/43, 85, 139, 143, 144, 33, 138, 178, 349/39; 345/89
See application file for complete search history.

(56) References Cited

U.S. PATENT DOCUMENTS

| | | | | |
|---|---|---|---|---|
| 5,576,858 A | * | 11/1996 | Ukai et al. | ..................... 349/42 |
| 5,717,474 A | * | 2/1998 | Sarma | ........................ 349/85 |
| 5,790,218 A | | 8/1998 | Koden et al. | .................. 349/92 |
| 5,936,690 A | | 8/1999 | Koden et al. | ................ 349/124 |
| 6,384,889 B1 | * | 5/2002 | Miyachi et al. | ............. 349/143 |
| 6,501,524 B1 | * | 12/2002 | Yoshida et al. | ............. 349/130 |
| 6,724,452 B1 | * | 4/2004 | Takeda et al. | .............. 349/139 |

FOREIGN PATENT DOCUMENTS

| | | |
|---|---|---|
| JP | 7-270822 | 10/1995 |
| JP | 8-211366 | 8/1996 |

* cited by examiner

*Primary Examiner*—Tarifur R. Chowdhury
*Assistant Examiner*—Tai Duong
(74) *Attorney, Agent, or Firm*—Greer, Burns & Crain, Ltd

(57) ABSTRACT

A liquid crystal display including a pair of substrates having electrodes and a liquid crystal layer sandwiched between the substrates. A bank-shaped projection made of an insulating material is formed on the electrode, and each of the display pixels is divided into two or more regions having different capacitances by capacitive coupling. Additionally, voltages corresponding to the capacitances are applied to the respective regions in the application of a driving voltage.

8 Claims, 58 Drawing Sheets

EXAMPLE OF METHOD OF EVALUATING
MOVING IMAGE PERFORMANCE
(MOVEMENT OF GRAY LEVEL BAR)

PLAN VIEW

SECTIONAL VIEW

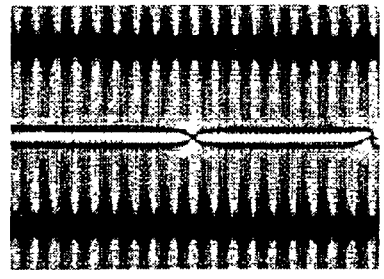
FIG. 5C  4.0V (58%/42%)
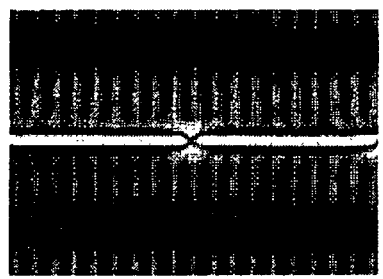
FIG. 5B  3.5V (32%/23%)
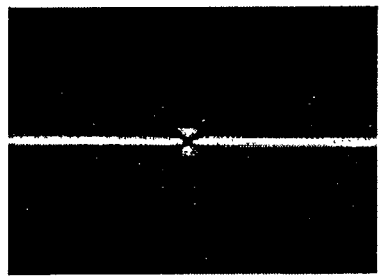
FIG. 5A  3.0V (9%/7%)
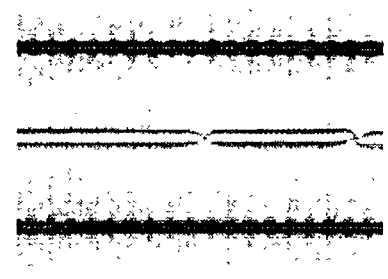
FIG. 5F  7.0V (—/100%)
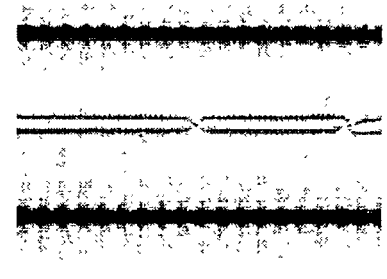
FIG. 5E  6.0V (—/90%)
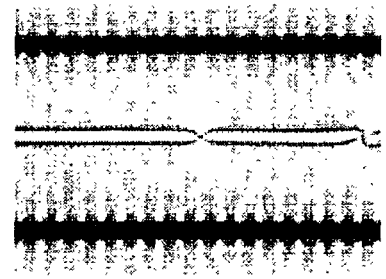
FIG. 5D  5.0V (100%/73%)
※APPLIED VOLTAGE (GRAY LEVEL TRANSMITTANCE WHEN 5V/7V ARE DRIVEN) ALIGNMENT STATE (EXPERIMENT 1)

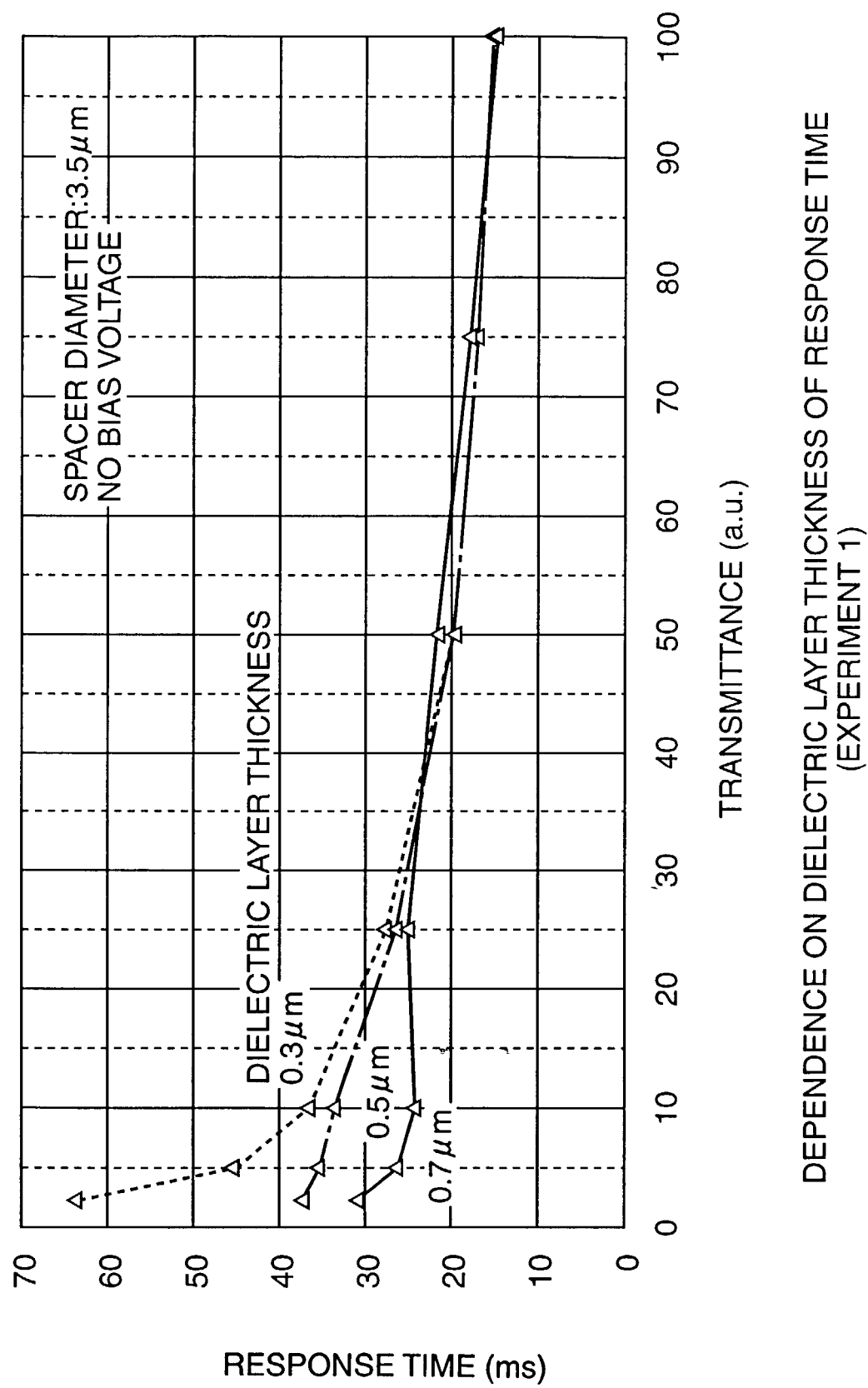

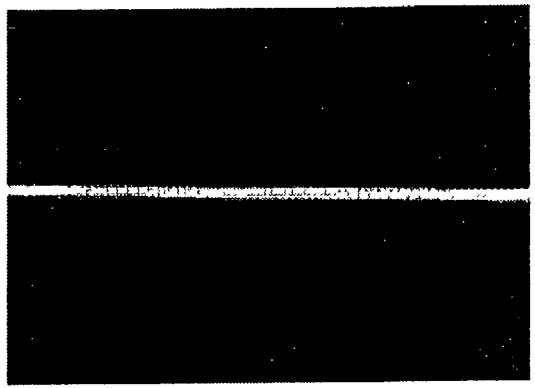
FIG. 7A LAYER THICKNESS 0.3μm
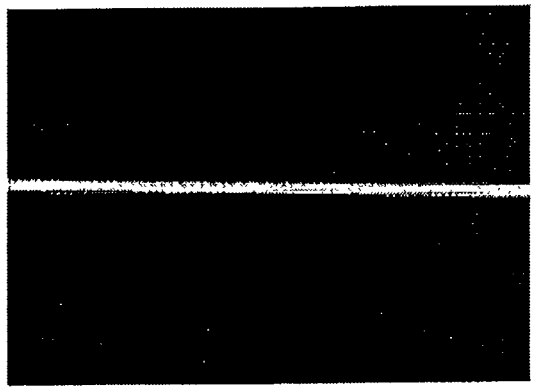
FIG. 7B LAYER THICKNESS 0.5μm
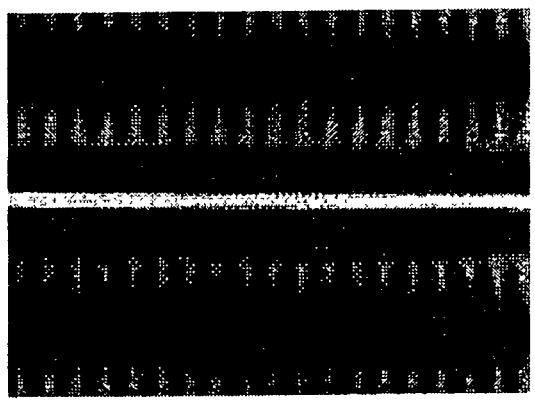
FIG. 7C LAYER THICKNESS 0.7μm
※DIELECTRIC MATERIAL
DIELECTRIC LAYER THICKNESS AND PARTIAL RESPONSE CONDITIONS
(APPLICATION OF 3.0V) (EXPERIMENT 1)

PLAN VIEW

SECTIONAL VIEW

FIG. 9A
FIG. 9B
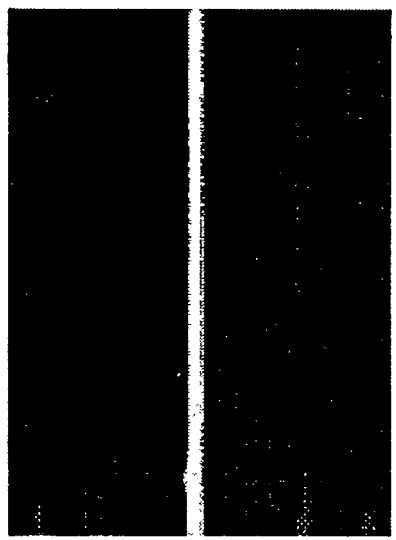
3.0V
5.0V
ALIGNMENT STATE OF EXPERIMENT 2 (EXPERIMENT 2)

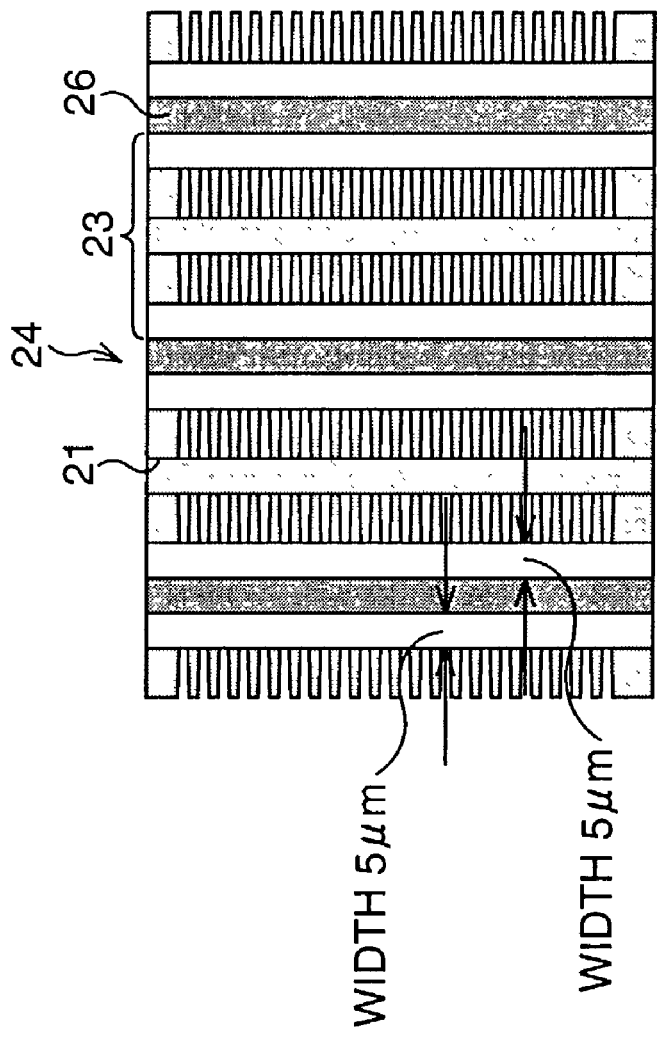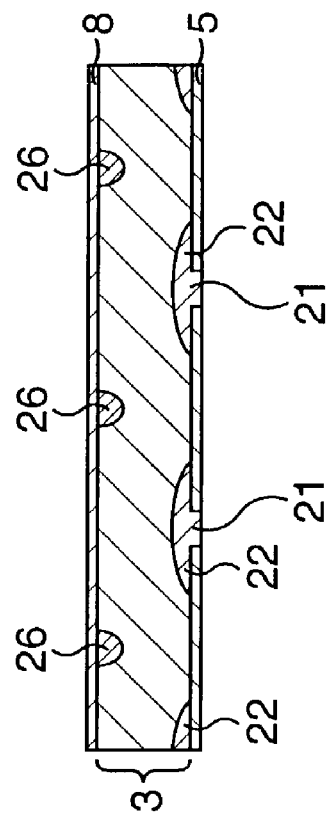
FIG. 10A
PLAN VIEW
FIG. 10B
SECTIONAL VIEW 3.0V 3.5V 4.0V 5.0V 6.0V 7.0V

ALIGNMENT STATE OF EXPERIMENT 3

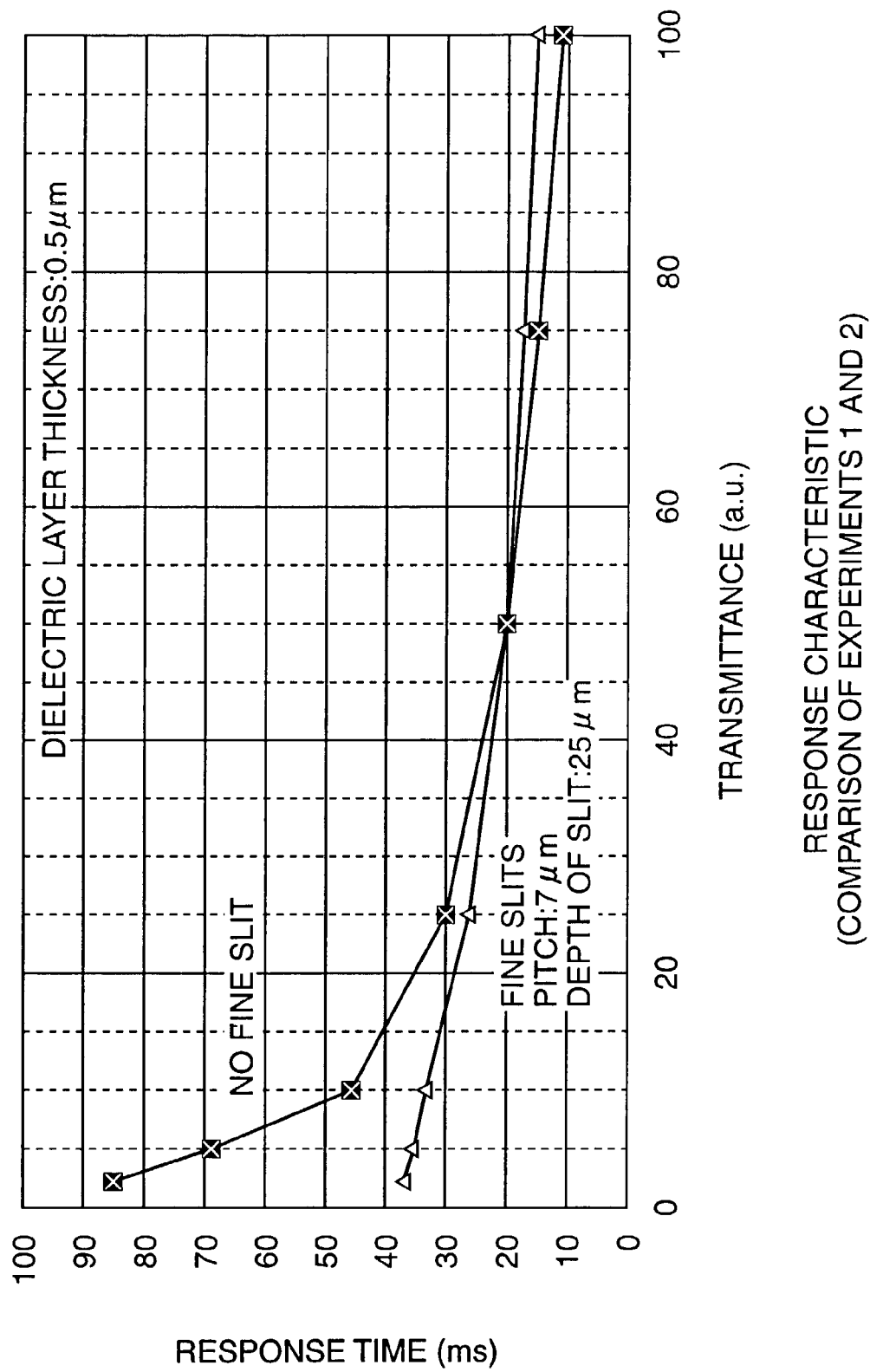

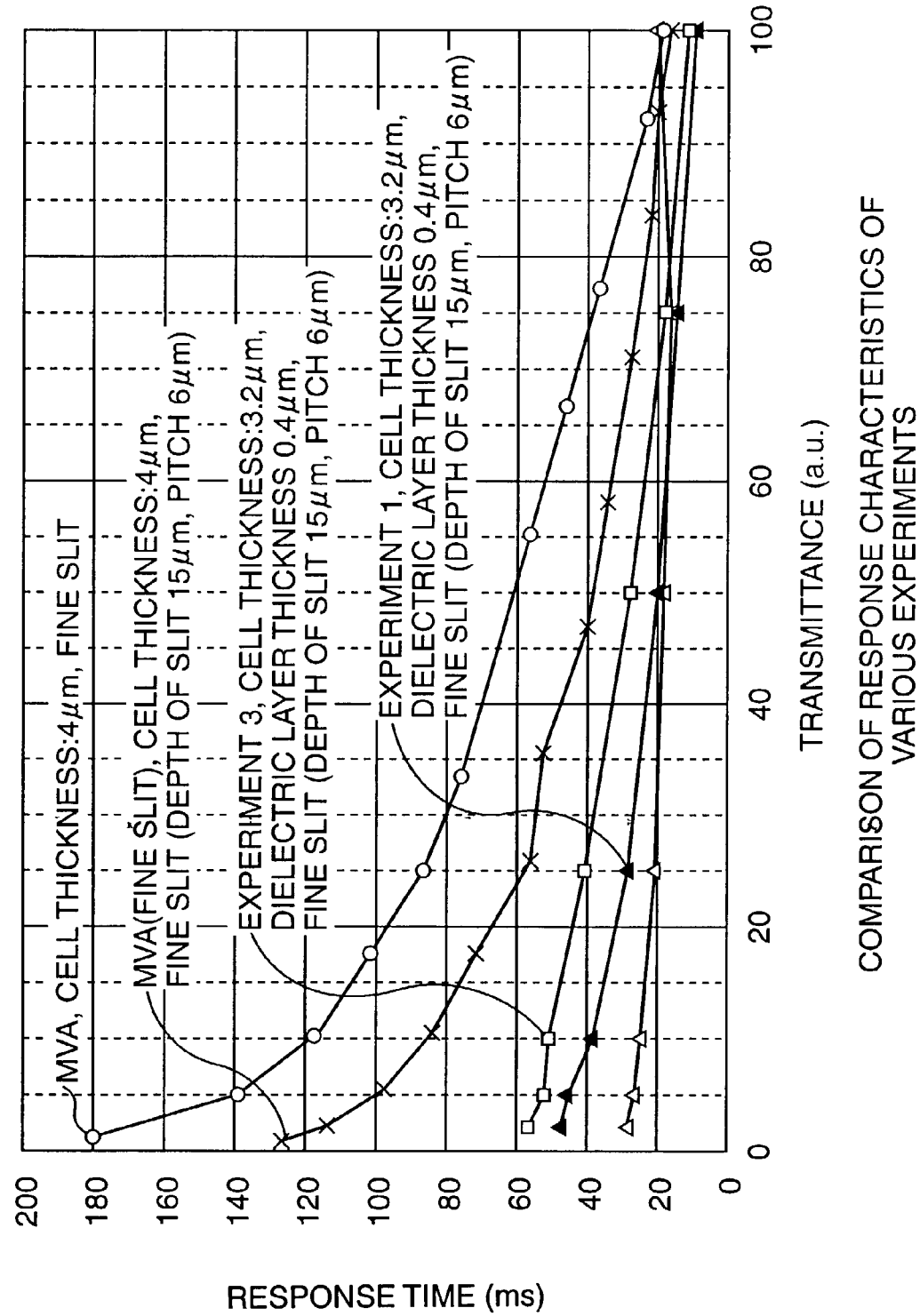

GRAY LEVEL-DRIVING VOLTAGE CHARACTERISTIC OF VARIOUS CONSTRUCTIONS

EXPERIMENT 4

EXPERIMENT 4

EXPERIMENT 5

SECTIONAL VIEW

PLAN VIEW

EXPERIMENT 13

PLAN VIEW

SECTIONAL VIEW

EXPERIMENT 13

SECTIONAL VIEW

PLAN VIEW

EXPERIMENT 13

PLAN VIEW

SECTIONAL VIEW

EXPERIMENT 13

SECTIONAL VIEW

PLAN VIEW

EXPERIMENT 14

PLAN VIEW

SECTIONAL VIEW

PLACEMENT OF POLARIZATION AXES

EXPERIMENT 15

EXPERIMENT 15

PLACEMENT OF POLARIZATION AXES

EXAMPLE IN WHICH FINE ELECTRODES ARE PARTIALLY FORMED

SECTIONAL VIEW

PLACEMENT OF POLARIZATION AXES

EXPERIMENT 15

SECTIONAL VIEW

PLACEMENT OF POLARIZATION AXES

EXPERIMENT 15

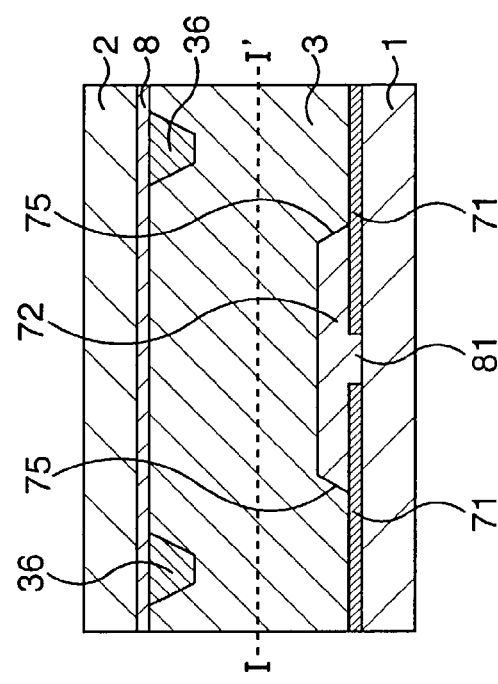
FIG. 37A
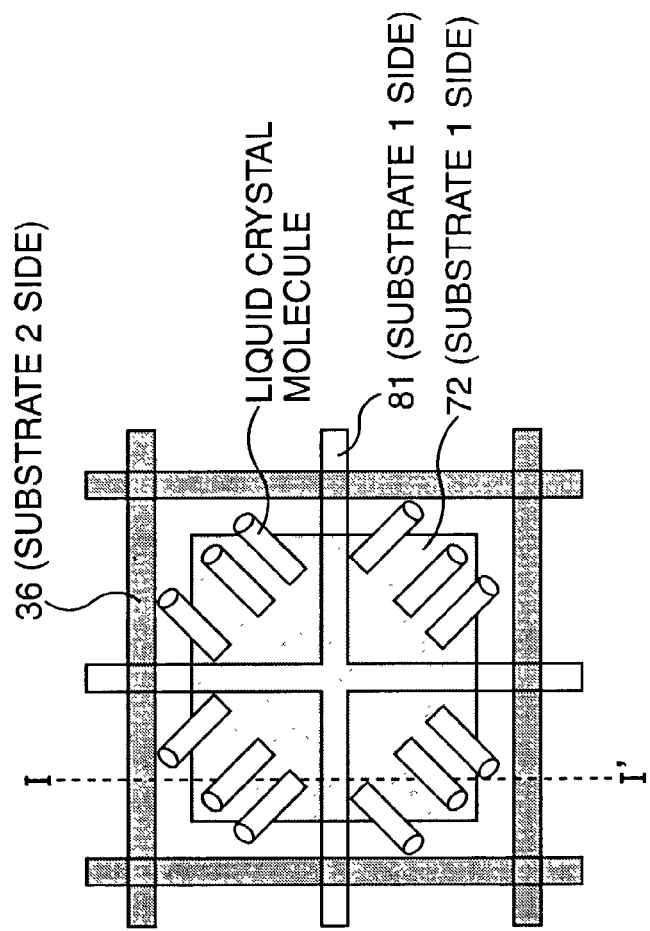
FIG. 37B

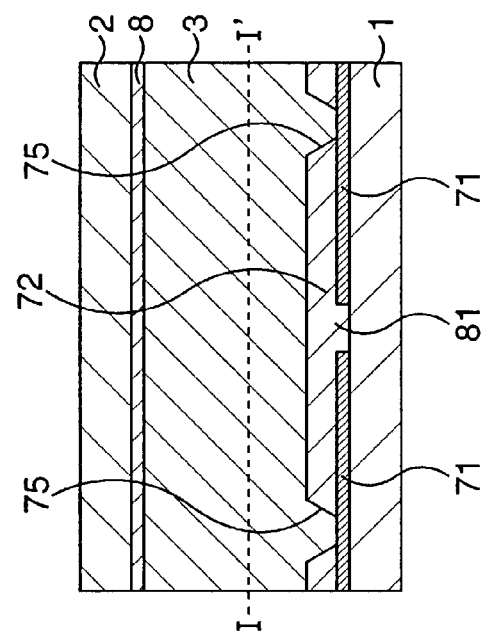
FIG. 38B
SECTIONAL VIEW
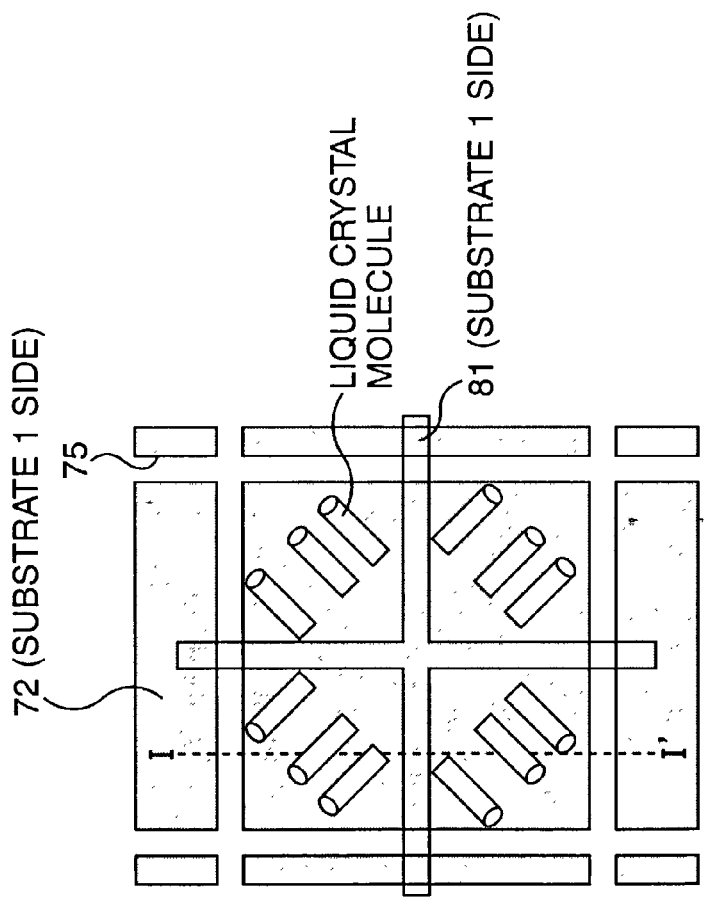
FIG. 38A
PLACEMENT OF POLARIZATION AXES
EXPERIMENT 15

EXPERIMENT 16

SECTIONAL VIEW

PLACEMENT OF POLARIZATION AXES

EXPERIMENT 16

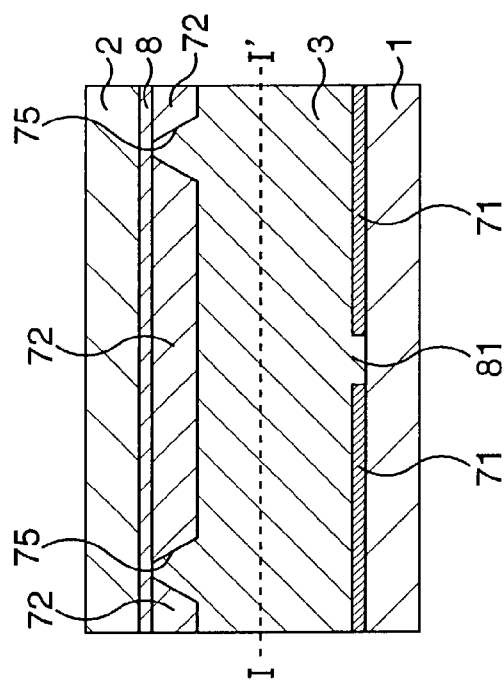
FIG. 41B
SECTIONAL VIEW
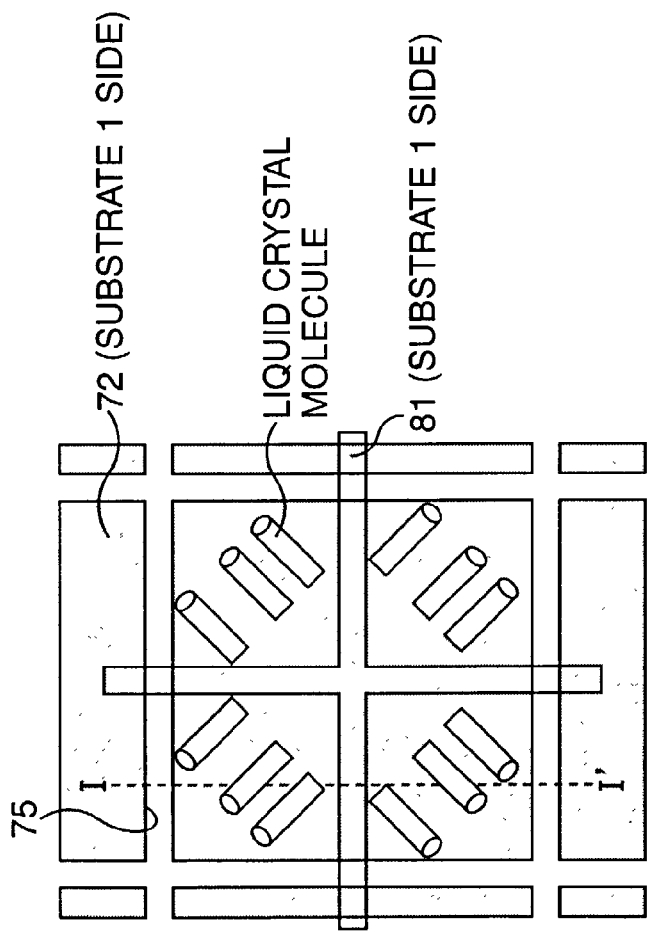
FIG. 41A
EXPERIMENT 16

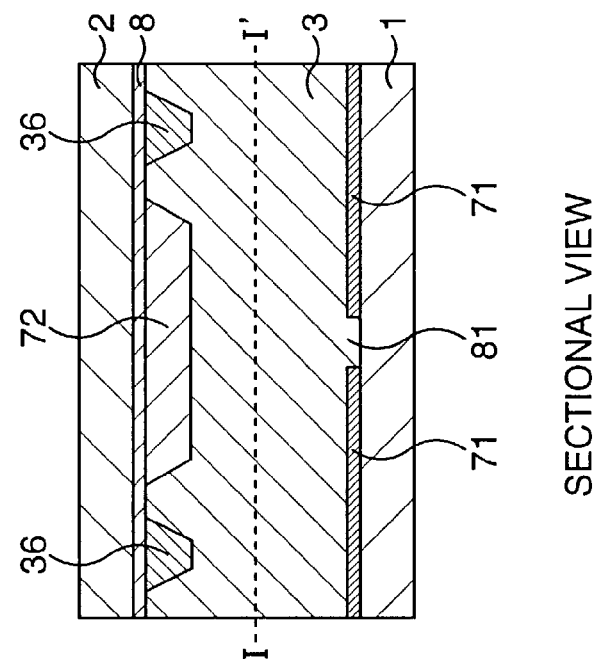
FIG. 42B
SECTIONAL VIEW
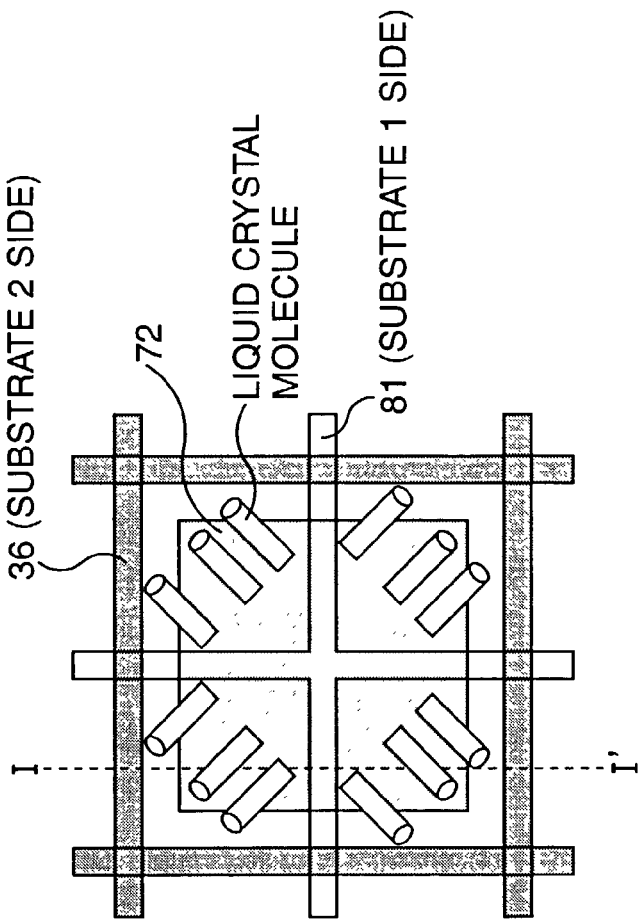
FIG. 42A
PLACEMENT OF POLARIZATION AXES
EXPERIMENT 16

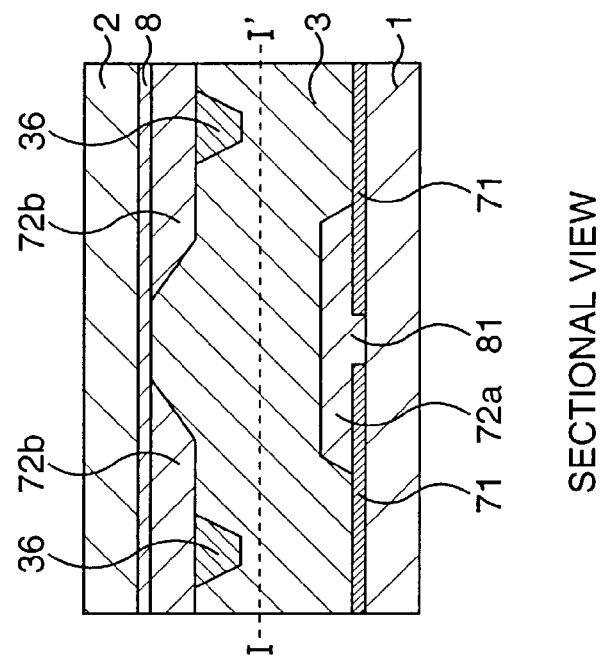
FIG. 43A
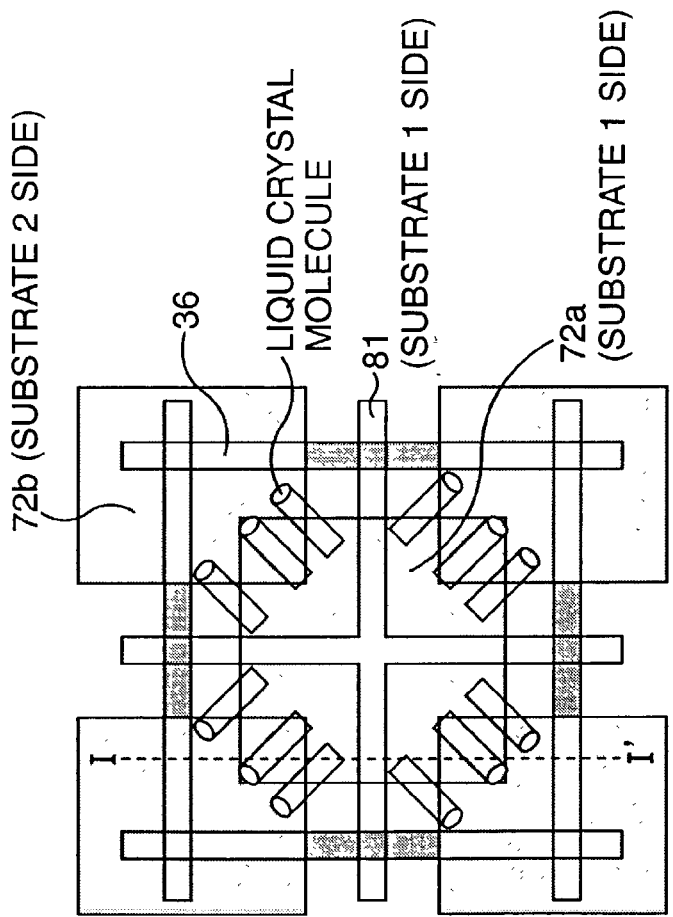
FIG. 43B
SECTIONAL VIEW
EXPERIMENT 17
PLACEMENT OF POLARIZATION AXES

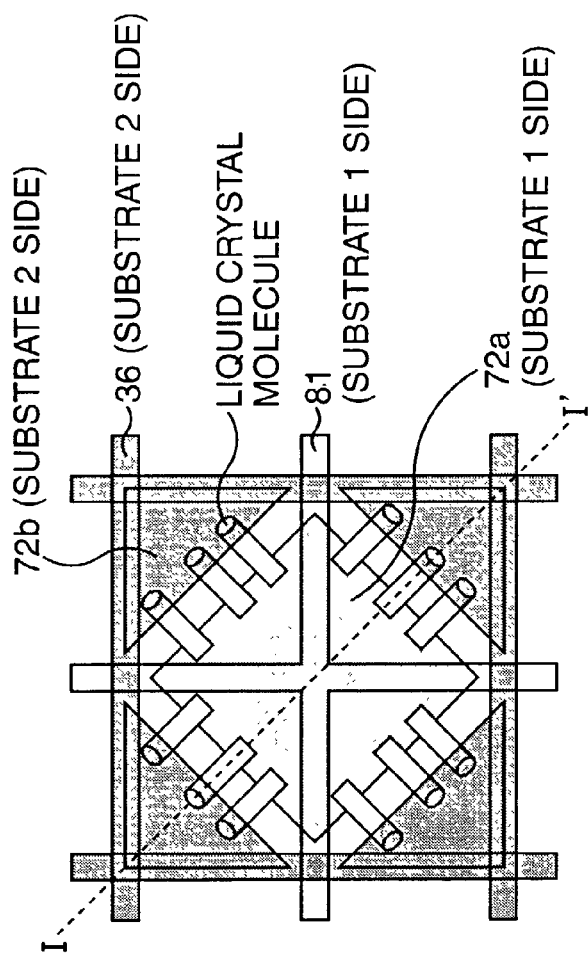
FIG. 45A
FIG. 45B

FIG. 46B
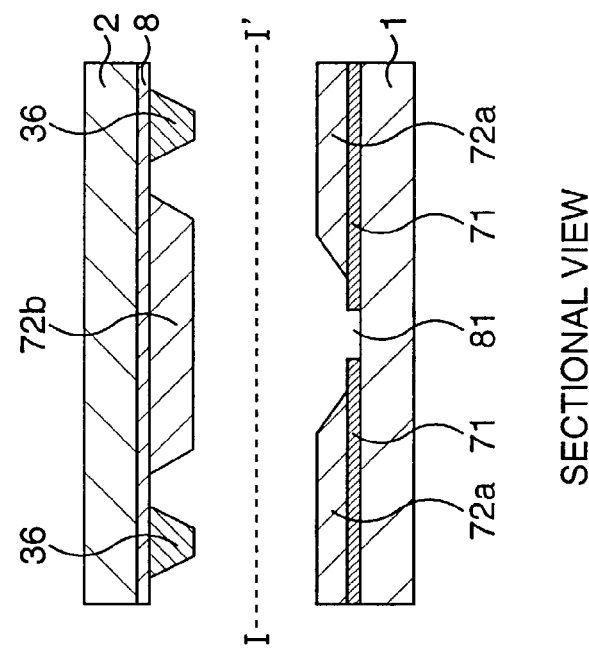
SECTIONAL VIEW
FIG. 46A
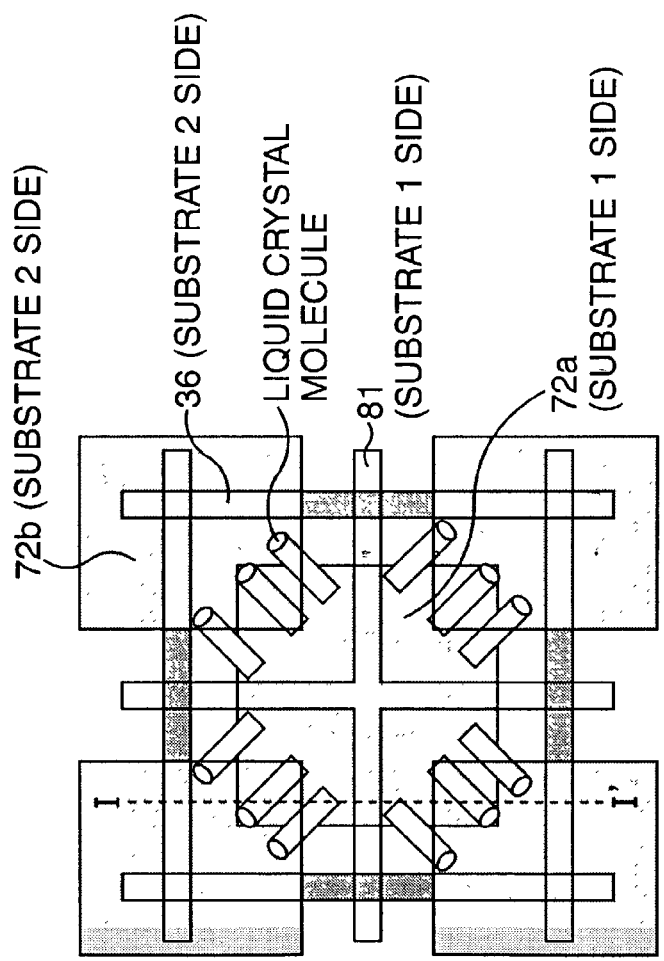
PLACEMENT OF POLARIZATION AXES
EXPERIMENT 17

(WIDTH a) > (WIDTH b)

(HEIGHT c) > (HEIGHT d)

LIQUID CRYSTAL MOLECULE

LIQUID CRYSTAL MOLECULE

SECTIONAL VIEW

PLAN VIEW

SECTIONAL VIEW

PLAN VIEW

SECTIONAL VIEW

PLAN VIEW (SECTION TAKEN ALONG LINE I—I IN FIG.58)

(SECTION TAKEN ALONG LINE I—I IN FIG.59)

FIG. 62
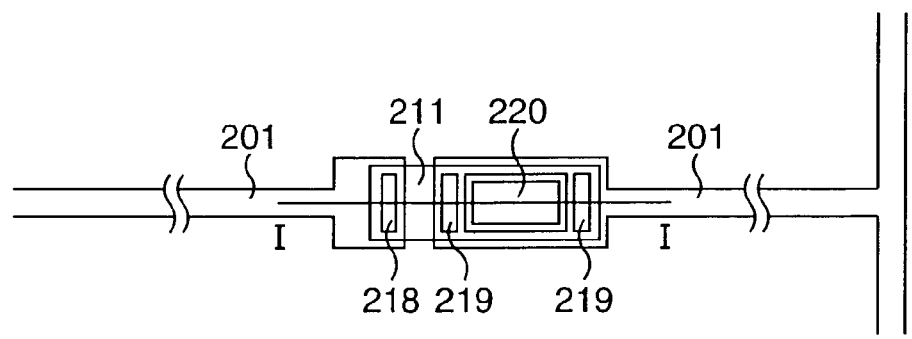
FIG. 63A
FIG. 63B
FIG. 63C
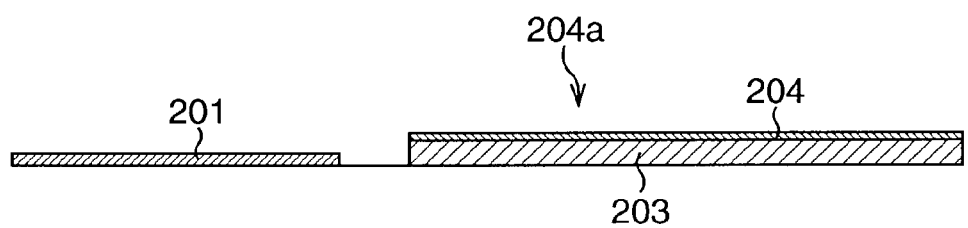
FIG. 63D
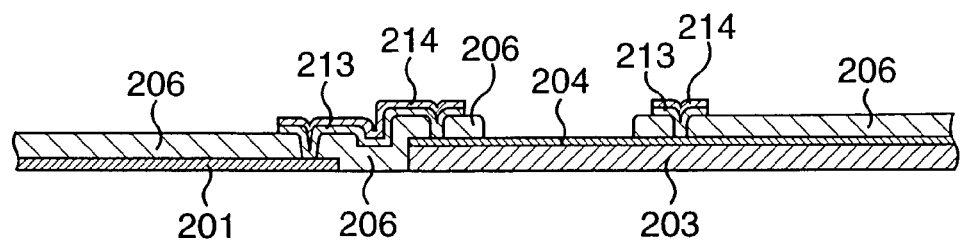
(SECTION TAKEN ALONG LINE I—I IN FIG.62)

(SECTION TAKEN ALONG LINE I—I IN FIG.64)

LIQUID CRYSTAL DISPLAY AND METHOD OF MANUFACTURING THE SAME

CROSS-REFERENCE TO RELATED APPLICATIONS

This application is based upon and claims priority of Japanese Patent Application Nos. 2001-272355, filed on Sep. 7, 2001 and 2001-398317, filed on Dec. 27, 2001, the contents being incorporated herein by reference.

BACKGROUND OF THE INVENTION

1. Field of the Invention

The present invention relates to a liquid crystal display constructed by sandwiching a liquid crystal layer between a pair of substrates having electrodes and a method of manufacturing the same, and particularly relates to a liquid crystal display which uses liquid crystals having negative dielectric constant anisotropy.

2. Description of the Related Art

A liquid crystal display (LCD) is currently utilized for the most purposes among flat panel displays. The display quality of the LCD, whose application to a large screen TV or a product such as called an AV personal computer into which a PC and a TV are integrated as well as a personal computer (PC), a word processor, OA equipment, a cellular phone is lately expected, has made remarkable progress in recent years, and its contrast and color reproduction at the front become equal to or better than those of a CRT. Especially, as a PC monitor, the LCD comes to have a satisfactory spec.

The LCD is excellent in contrast and color reproduction at the front, but still has a big problem as concerns a viewing angle and moving image performance (response characteristic).

Therefore, in terms of an improvement in the viewing angle characteristic of the liquid crystal display, a so-called MVA (Multi-domain Vertical Alignment) liquid crystal display mode attracts considerable attention. The MVA mode is a mode in which domain division of vertically aligned mode liquid crystals is performed by using structures or slits provided above the substrate. More specifically, by placing band-shaped structures or slits in the electrode alternately above the surfaces of the upper and lower substrates, liquid crystal domains different in alignment direction by almost 180° with the structures or slits as boundaries are formed to realize domain division. The viewing angle characteristic of the liquid crystal display is improved greatly by this MVA mode.

The MVA mode is regarded as representation of high image quality liquid crystal modes because of its wide viewing angle, and actually has almost all performance necessary for a PC monitor. However, its application to the TV or the AV PC is considered, there is a problem that halftone response from black to dark gray is slow.

In the MVA mode, liquid crystals are aligned vertically when no voltage is applied. Accordingly, at the beginning of tilting (from black to low gray levels), the rotation speed of the liquid crystals is very slow. This delay in response speed at low gray levels is a problem related to the basic construction of the MVA mode, and is a fateful disadvantage.

SUMMARY OF THE INVENTION

The present invention is made in view of the aforementioned problem, and its object is to provide a liquid crystal display which makes it possible to increase the speed of halftone response by improving a delay in response speed at low gray levels and realizes very reliable image display with moving image performance capable of being used without a sense of incongruity as compared with that of a CRT.

The present inventor attained to aspects of the invention shown below as a result of earnest examination.

The present invention aims at a liquid crystal display constructed by sandwiching a liquid crystal layer between a pair of substrates having electrodes.

A liquid crystal display of the present invention is characterized in that regions with different threshold voltages are formed in each of display pixels, and control for a desired gray level display characteristic is performed by adjusting the threshold voltages.

Another aspect of the liquid crystal display of the present invention is characterized in that regions with different threshold voltages are formed in each of display pixels by alignment control of a liquid crystal alignment film, and control for a desired gray level display characteristic is performed by adjusting the threshold voltages.

Another aspect of the liquid crystal display of the present invention is characterized in that each of display pixels is divided into two or more regions having different distances between the respective electrodes facing each other, and an insulator with a thickness capable of making up the difference in distance is provided on the electrode.

Another aspect of the liquid crystal display of the present invention is characterized in that each of display pixels is divided into two or more regions having different capacitances by capacitive coupling, and voltages corresponding to the capacitances are applied to the respective regions in the application of a driving voltage.

Another aspect of the liquid crystal display of the present invention is characterized in that a plurality of minute through-holes are formed in a predetermined portion of the electrode, and each of display pixels is divided into different two or more regions corresponding to the portion.

Another aspect of the liquid crystal display of the present invention is characterized in that in each of display pixels, an insulating structure for exposing a portion of the electrode is provided above at least one of the substrates, and regions with different threshold voltages are formed in the display pixel by the insulating structure, and control for a desired gray level display characteristic is performed by adjusting the threshold voltages.

Another aspect of the liquid crystal display of the present invention is characterized in that regions with different threshold voltages are formed in each of display pixels above one of the substrates, control for a desired gray level display characteristic is performed by adjusting the threshold voltages, a plurality of band-shaped bank-shaped projections are formed above the other of the substrates, and each of the bank-shaped projections is formed in such a manner that at least either its width or height differs according to its position.

Another aspect of the liquid crystal display of the present invention is characterized in that an insulating member is provided partially above one of the substrates so that each of display pixels is divided into two or more regions with different disgraces between the respective electrodes facing each other, and control for a desired gray level display characteristic is performed.

Moreover, the present invention aims at a method of manufacturing a liquid crystal display constructed as stated above.

A method of manufacturing a liquid crystal display of the present invention is a method of manufacturing a liquid crystal display constructed by sandwiching a liquid crystal layer between a first substrate formed with first electrodes and thin film transistors and a second substrate formed with a second electrode with a liquid crystal alignment film therebetween, comprising the steps of: forming a transparent conducting film on the first substrate with an insulating film therebetween and working the transparent conducting film to form peripheral connecting wires as well as the first electrodes; and connecting gate bus lines and drain bus lines which compose the thin film transistors by the peripheral connecting wires.

Another aspect of the method of manufacturing the liquid crystal display of the present invention is a method of manufacturing a liquid crystal display constructed by sandwiching a liquid crystal layer between a first substrate formed with first electrodes and thin film transistors and a second substrate formed with a second electrode with a liquid crystal alignment film therebetween, wherein in forming a gate insulating film composing the thin film transistors, an insulating member with a predetermined shape for performing control for a desired gray level display characteristic is formed on the first electrodes together with the gate insulating film by using the same material.

Another aspect of the method of manufacturing the liquid crystal display of the present invention is a method of manufacturing a liquid crystal display constructed by sandwiching a liquid crystal layer between a first substrate formed with first electrodes and thin film transistors and a second substrate formed with a second electrode with a liquid crystal alignment film therebetween, comprising the steps of: forming a transparent conducting film on the first substrate with an insulating film therebetween and working the transparent conducting film to form peripheral connecting wires as well as the first electrodes; and connecting gate bus lines and drain bus lines which compose the thin film transistors by the peripheral connecting wires, wherein in forming a gate insulating film composing the thin film transistors, an insulating member with a predetermined shape for performing control for a desired gray level display characteristic is formed on the first electrodes together with the gate insulating film by using the same material.

BRIEF DESCRIPTION OF THE DRAWINGS

FIG. 5A to FIG. 5F are microphotographs showing the alignment state of liquid crystals in the construction of the experiment 1;

FIG. 6 is a characteristic diagram showing the result of an investigation of effect of partial response and dependence on dielectric layer thickness;

FIG. 7A to FIG. 7C are microphotographs showing the relation between dielectric layer thickness and partial response when 3.0 V is applied;

FIG. 9A and FIG. 9B are microphotographs showing the alignment state of liquid crystals in the construction of the experiment 2;

FIG. 10A and FIG. 10B are schematic views showing the main construction of a liquid crystal display of an experiment 3 in the first embodiment;

FIG. 12 is a characteristic diagram showing a comparison between response speeds of the experiments 1 and 2;

FIG. 13 is a characteristic diagram showing a comparison between response speeds of the experiments 1 and 3;

FIG. 37A and FIG. 37B are schematic views showing still another example of the liquid crystal display of the experiment 15 in the first embodiment;

FIG. 38A and FIG. 38B are schematic views showing yet another example of the liquid crystal display of the experiment 15 in the first embodiment;

FIG. 41A and FIG. 41B are schematic views showing still another example of the liquid crystal display of the experiment 16 in the first embodiment;

FIG. 42A and FIG. 42B are schematic views showing yet another example of the liquid crystal display of the experiment 16 in the first embodiment;

FIG. 43A and FIG. 43B are schematic views showing the main construction of a liquid crystal display of an experiment 17 in the first embodiment;

FIG. 45A and FIG. 45B are schematic views showing still another example of the liquid crystal display of the experiment 17 in the first embodiment;

FIG. 46A and FIG. 46B are schematic views showing yet another example of the liquid crystal display of the experiment 17 in the first embodiment;

FIG. 62 is a schematic plan view showing a gate bus line terminal and its vicinity in the fourth embodiment;

FIG. 63A to FIG. 63D are schematic sectional views showing the process of forming the gate bus line terminal;

DETAILED DESCRIPTION OF THE PREFERRED EMBODIMENTS

Preferred embodiments to which the present invention is applied will be explained in detail below with reference to the drawings.

(First Embodiment)

First, the first embodiment of the present invention will be explained.

In this embodiment, an MVA mode liquid crystal display is exemplified.

Schematic Construction of Liquid Crystal Display

Figure 1:
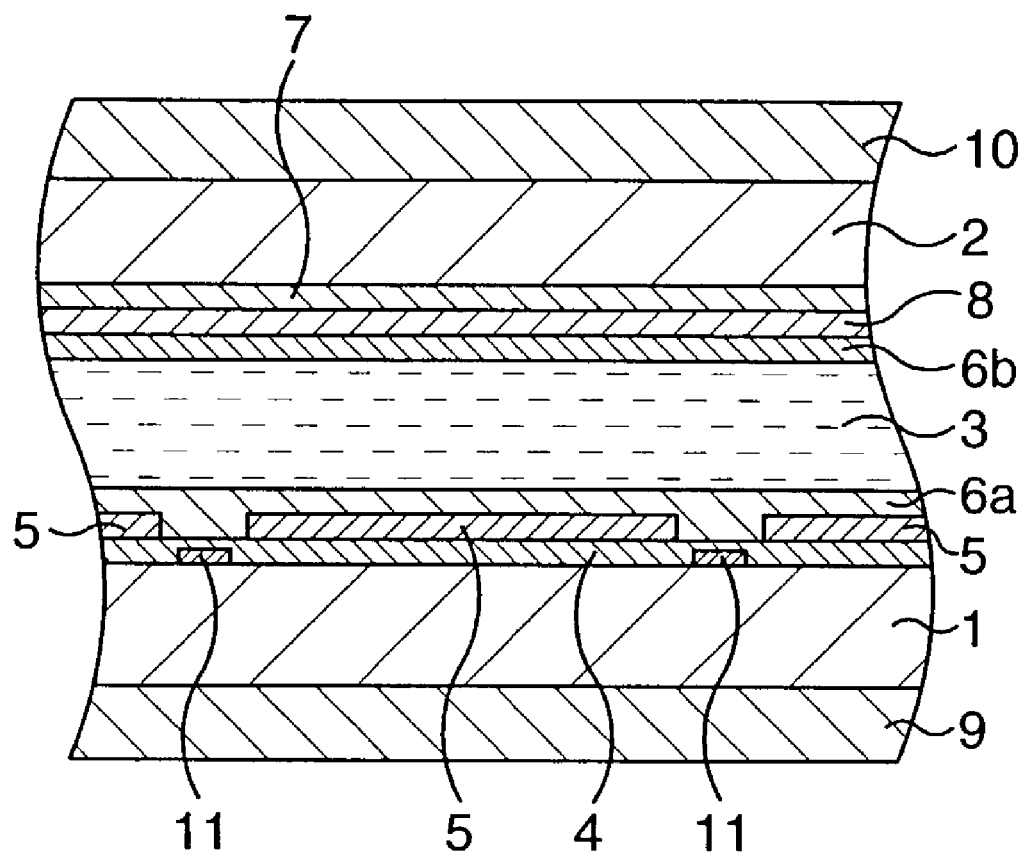
FIG. 1 is a sectional view showing the schematic main construction of a liquid crystal display of the present invention.

FIG. 1 is a sectional view showing the schematic main construction of a liquid crystal display of the present invention.

This liquid crystal display is constructed including a pair of transparent glass substrates 1 and 2 which face each other with a predetermined space therebetween, and a liquid crystal layer 3 sandwiched between the transparent glass substrates.

A plurality of ITO pixel electrodes 5 are formed on one transparent glass substrate 1 with an insulating layer 4 therebetween, and a transparent liquid crystal alignment film 6a is formed so as to cover the ITO pixel electrodes 5. A color filter 7, an ITO common electrode 8, and a liquid crystal alignment film 6b are stacked in sequence on the other transparent glass substrate 2. The liquid crystal alignment films (vertical alignment films) 6a and 6b are joined to sandwich the liquid crystal layer 3 between them, so that the glass substrates 1 and 2 are fixed. Polarizers 9 and 10 are respectively provided outside the substrates 1 and 2. The ITO pixel electrodes 5 are formed together with an active matrix, and in an illustrated example, data bus lines 11 of the active matrix are shown. Incidentally, only one substrate is provided with electrodes in some cases (for example, in the case of an IPS mode).

The liquid crystal layer 3 is made of liquid crystals having negative dielectric constant anisotropy and adopts a so-called VA mode (Vertically Aligned Mode) in which liquid crystal molecules are aligned almost vertically when no voltage is applied and aligned almost horizontally when a predetermined voltage is applied.

Explanation of Principle of This Embodiment

In this embodiment, in a display pixel, regions with different threshold voltages, that is, a low threshold voltage region and a high threshold voltage region are formed, and by adjusting the threshold voltages so that high-speed response is performed in the low threshold voltage region, control for a predetermined gray level display characteristic, that is, such control that response speeds are leveled between respective gray levels and uniformed, is performed.

Figure 2:
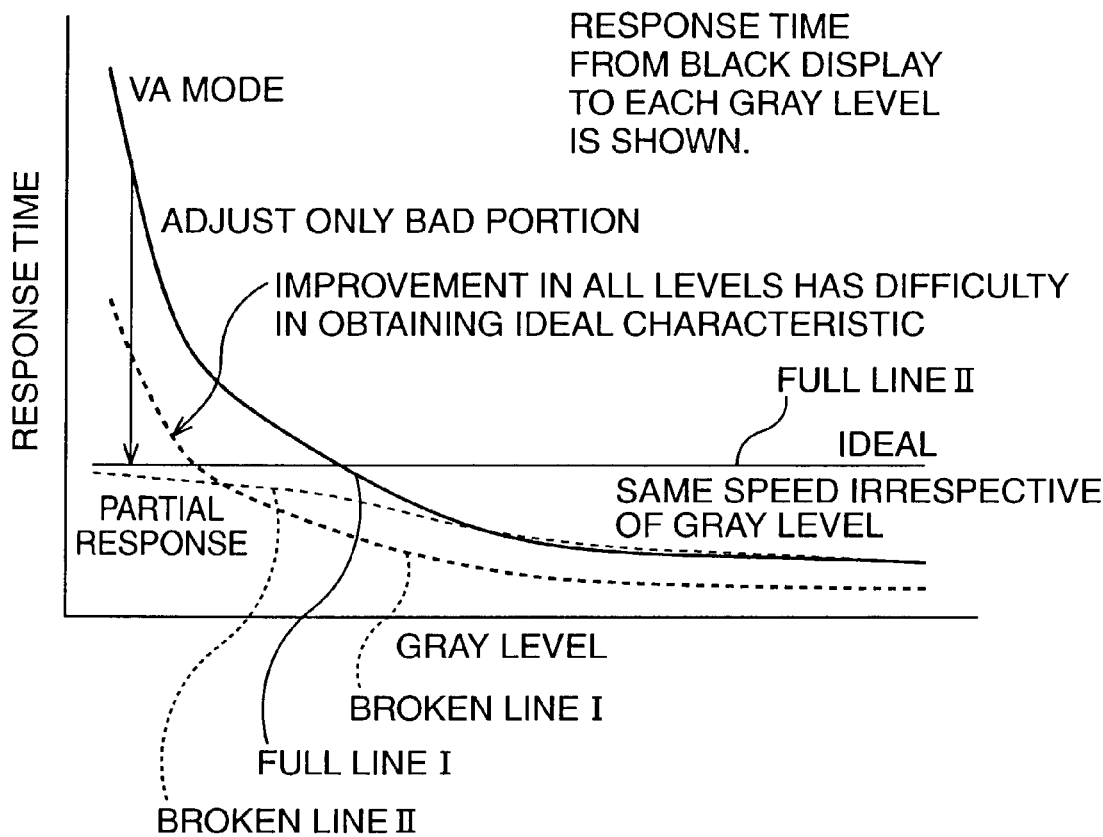
FIG. 2 is a characteristic diagram showing the relation between transmittance and response time to explain the principle of a first embodiment.

FIG. 2 is a characteristic diagram showing the relation between transmittance and response time for explaining the principle of this embodiment.

Figure 3:
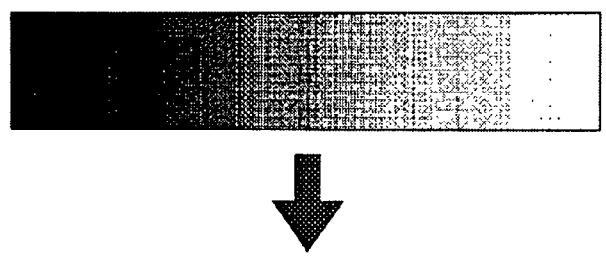
FIG. 3 is a diagrammatic view showing a gray level bar.

In the VA mode liquid crystal display, there essentially occurs a delay in response speed at low gray levels as shown by a full line I since liquid crystals are aligned almost vertically when no voltage is applied. Ideally, for example, when a screen in which such a gray level bar as shown in FIG. 3 moves is assumed, it is suitable that the shape of a moving body is displayed correctly without an after-image due to movement remaining, that is, the response speed is constant irrespective of gray level as shown by a full line II shown as an ideal state in FIG. 2.

However, even if the response speed is increased globally at all gray levels by a general method, for example, reduction in thickness, only the response time is shortened as a whole as shown by a broken line I which has almost the same shape as the full line I due to the aforementioned essential construction of the VA mode, whereby the response speed is slower at low gray levels than at high gray levels, and hence the response speed which does not depend on gray levels can not be obtained (response is slower at low gray levels than at high gray levels).

An object of this embodiment is to increase response speed at low gray levels, and the following points are the basic gist of this embodiment.

(1) An area which lights up in the display pixel is changed depending on a gray level to be displayed (a wider area is lit up in bright display, and a narrower area is lit up in dark display).

(2) When some gray level is displayed, operations of a region operated at a low gray level and a region lit up additionally are leveled off.

Namely, by dividing a display region into a low threshold voltage region and a high threshold voltage region and increasing the response speed in the low threshold voltage region (partial response), as shown by a broken line II, the response speed is increased only in the low threshold voltage region while the same high-speed response as that shown by the full line I is maintained in the high threshold voltage region. As a result, almost leveled response speed which is close to the ideal full line II is obtained as a whole. Actually, by keeping the maximum difference in response time between gray levels within about one and half times to about three times, moving image display properties of VA liquid crystals can be drastically improved.

Concrete Experiments

Based on the aforementioned principle of partial response, concrete experiments for realizing the partial response will be explained below.

Experiment 1

Figures 4A, 4B:
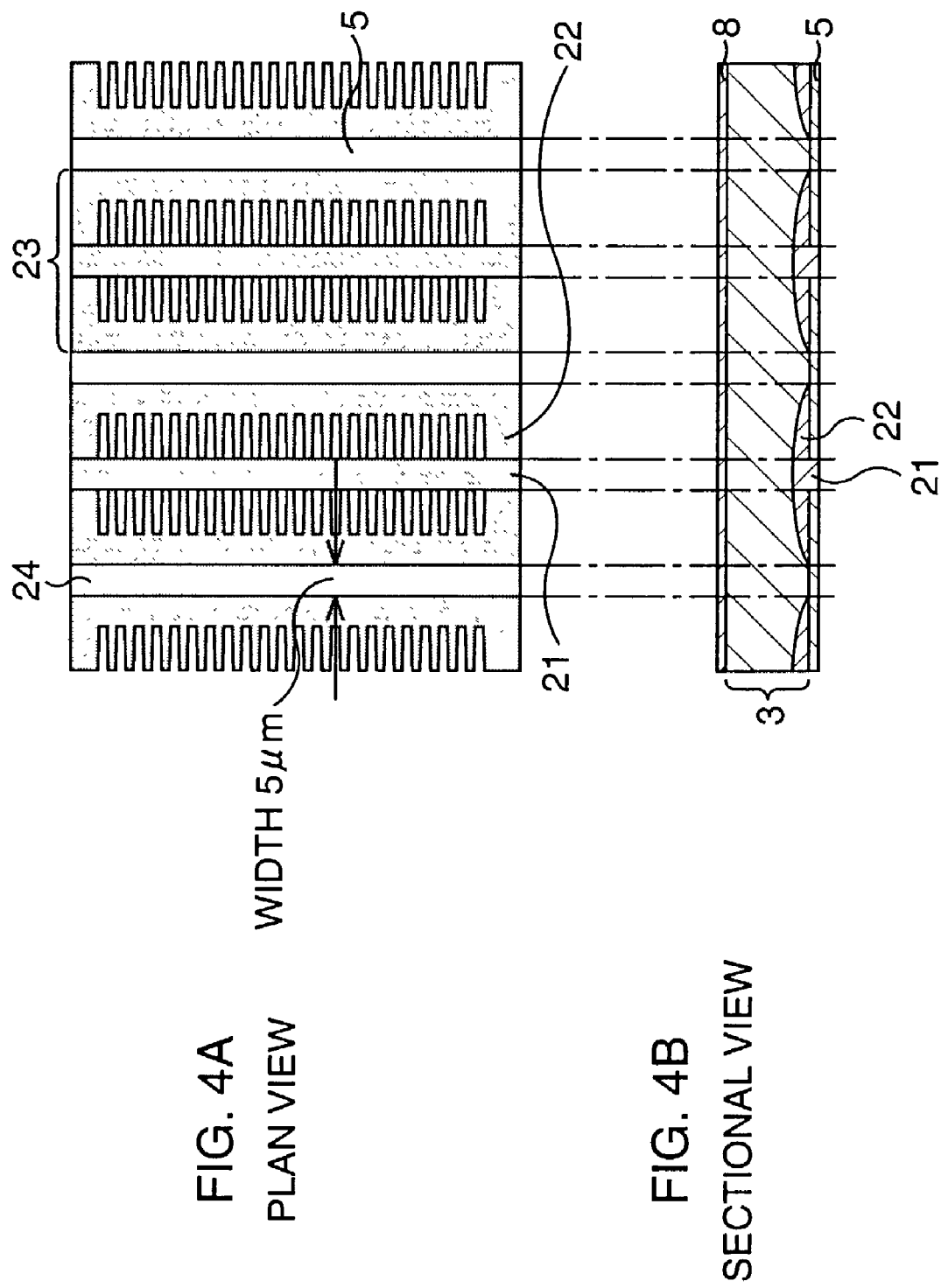
FIG. 4A and FIG. 4B are schematic views showing the main construction of a liquid crystal display of an experiment 1 in the first embodiment.

FIGS. 4A and 4B are schematic views showing the main construction of a liquid crystal display of the experiment 1. Here, FIG. 4A is a plan view, and FIG. 4B is a sectional view.

In this experiment, as shown, on the pixel electrode 5 above the transparent glass substrate 1, slit-shaped fine electrode patterns 21, which are patter-formed in the shape of the fine teeth of a comb bilaterally symmetrical with respect to band-shaped portions, are formed at even intervals. Moreover, band-shaped dielectric layers 22 are pattern-formed at even intervals in the display pixel so as to cover the fine electrode patterns 21 on the pixel electrode 5. Although not shown, the alignment film 6a is formed to cover these dielectric layers 22. By the existence of the dielectric layer 22 and the fine electrode pattern 21 complementing this, a portion formed with these layer and fine electrode is a high threshold voltage region 23, and relatively, a low threshold voltage region 24 where the dielectric layer 22 does not exist is formed. By this construction, at low gray levels, only the low threshold voltage region 24 operates since the threshold voltage is lower in the low threshold voltage region 24 where the dielectric layer 22 does not exist, whereby the aforementioned partial response is realized.

In the realization of the aforementioned partial response, the operation is confirmed using the construction shown in FIGS. 4A and 4B. The dielectric layers 22 (photoresist manufactured by Shipley Company) having a thickness of about 0.5 μm are partially provided on the fine electrode patterns 21. In a region where the dielectric layer 22 exists, the threshold voltage is higher, and in a region where the dielectric layer 22 does not exist, operation is performed at an ordinary voltage.

FIGS. 5A to 5F are microphotographs showing the alignment state of liquid crystals in the construction of the experiment 1.

When a voltage of 3.0 V is applied, only non-dielectric regions operate, and thus it is known that the aforementioned partial response is realized (FIG. 5A). At 3.5 V to 4.0 V, non-dielectric portions and non-fine slit portions (portions where no fine electrode pattern 21 exists) operate, and regions on the fine electrode patterns 21 do not operate (FIGS. 5B and 5C). All the regions operate only when 5 V or more is applied (FIGS. 5D to 5F).

FIG. 6 is a characteristic diagram showing the result of an investigation of effect of partial response and dependence on dielectric layer thickness, and FIGS. 7A to 7C are microphotographs showing the relation between dielectric layer thickness and partial response when 3.0 V is applied.

As shown in FIGS. 7A to 7C, the dielectric layer 22 is required to have a thickness of 0.5 μm or more in order to obtain an effect with acceptable stability. In a thickness of 0.5 μm, response from a gray level of 0% to a gray level of 2.5% is improved to 38 ms (180 ms in a conventional MVA mode), and in 0.7 μm, the response is improved to 30 ms. The response from black to white (from a gray level of 0% to a gray level of 100%) takes about 15 ms (also 15 ms in the conventional MVA mode) in each thickness condition. The partial response does not contribute to an improvement in response at high gray levels, but it can be confirmed that the partial response is very effective in improving response at low gray levels, that is, the partial response is an effective means for leveling response between gray levels.

Experiment 2

Figures 8A, 8B:
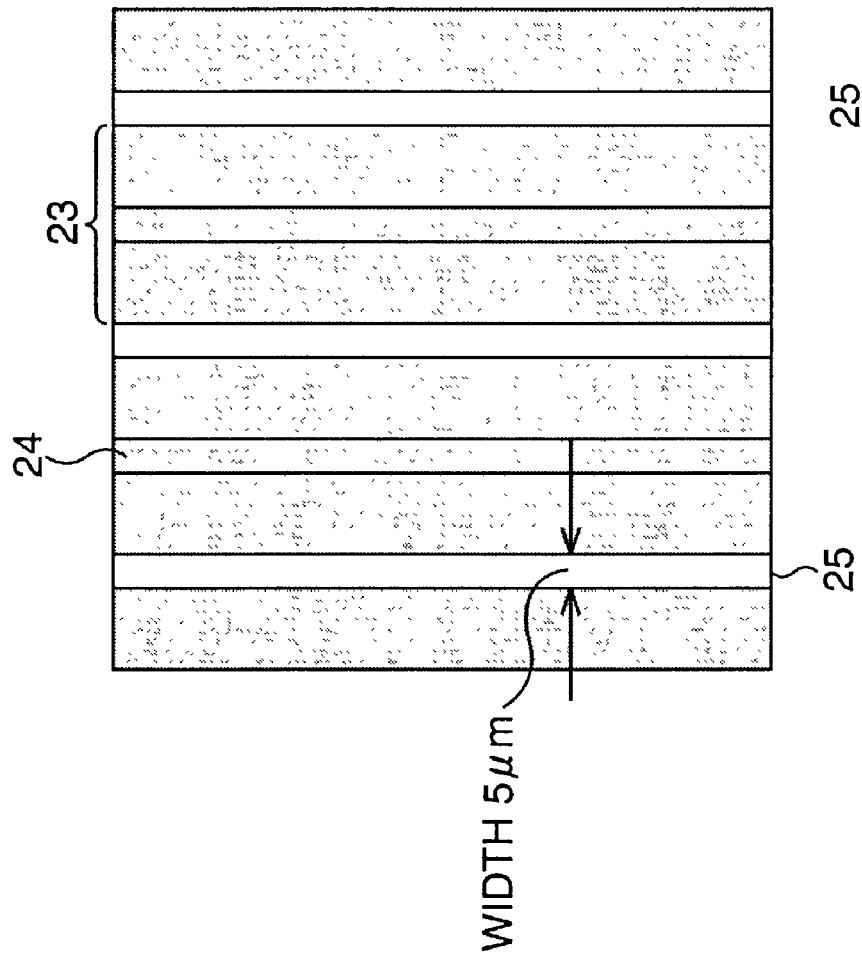
FIG. 8A and FIG. 8B are schematic views showing the main construction of a liquid crystal display of an experiment 2 in the first embodiment.
Figure 11A:
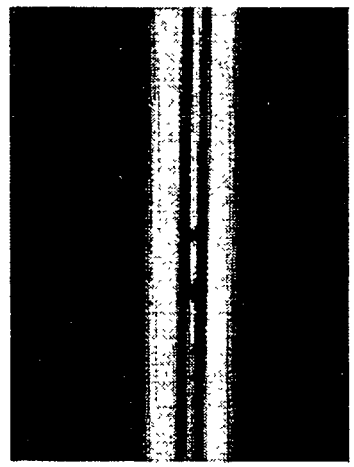
FIG. 11A to FIG. 11F are microphotographs showing the alignment state of liquid crystals in the construction of the experiment 3.
Figure 11B:
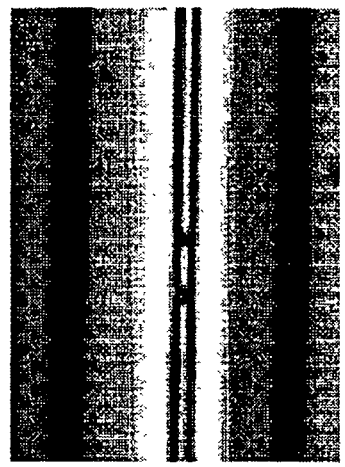
Figure 11C:
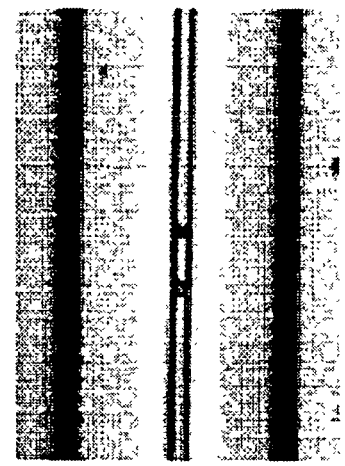
Figure 11D:
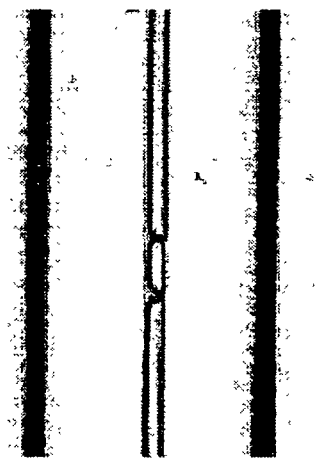
Figure 11E:
Figure 11F:

FIGS. 8A and 8B are schematic views showing the main construction of a liquid crystal display of the experiment 2, FIG. 8A is a plan view, and FIG. 8B is a sectional view.

In the experiment 1, a case where the dielectric layers 22 are provided on the pixel electrode 5 formed with the fine electrode patterns 21, above the transparent glass substrate 1 is shown. In this experiment, however, to simplify the process, the formation of the fine electrode patterns 21 are omitted, the dielectric layers 22 are provided on the pixel electrode 5 formed with only band-shaped slits 25 having a width of about 10 μm, and similarly to the experiment 1, the effect of partial response and the dependence on dielectric layer thickness are investigated.

FIGS. 9A and 9B are microphotographs showing the alignment state of liquid crystals in the construction of the experiment 2.

As shown, partial response is recognized when alignment in the application of a voltage of 3.0 V is observed. However, when being observed carefully, it is found that liquid crystals in the non-dielectric regions also operate slightly Probably, this is because the voltage applied to the liquid crystal layer 3 becomes a little higher since the fine electrode patterns 21 are eliminated and only the band-shaped slits 25 are provided.

Experiment 3

FIGS. 10A and 10B are schematic views showing the main construction of a liquid crystal display of the experiment 3, FIG. 10A is a plan view, and FIG. 10B is a sectional view.

In this experiment, in addition to the construction of the experiment 1, band-shaped bank-shaped projections 26 made of a dielectric material are provided in portions corresponding to the non-dielectric regions of the transparent glass substrate 1, above the transparent glass substrate 2, and similarly to the experiment 1, the effect of partial response and the dependence on dielectric layer thickness are investigated.

FIGS. 11A to 11F are microphotographs showing the alignment state of liquid crystals in the construction of the experiment 3.

In this experiment, likewise with the experiment 1, the partial response can be realized by applying a voltage of 3.0 V or less. In a single cell experiment, a transmittance of 19% (21% in the conventional MVA mode) is obtained at 5.4 V. In this case, the loss is 10 per cent or less, and this may be attributed to the shift of the saturation point of transmittance to the higher voltage side due to an increase in the threshold voltage of each of the dielectric regions.

[Comparison and Examination of Experiments 1 to 3]

When the experiments 1 and 2 are compared, as shown in FIG. 12, in the experiment 1, compared with the experiment 2, the excellent response speed can be obtained at low gray levels. It is thought that in the case of the experiment 2, since the effect of the partial response is lowered as compared with the experiment 1, the effect of improving response at low gray levels is also lowered. Therefore, in the construction of the experiment 2, it is required to form the dielectric layers thicker to obtain a sufficient effect.

When the experiments 1 and 3 are compared, as shown in FIG. 13, in the experiment 3, the response speed at low gray levels are slower compared with the experiment 1, but even in the experiment 3, the excellent response time of 55 ms from a gray level of 0% to 2.5% can be obtained (180 ms in the conventional MVA mode).

Figure 14:
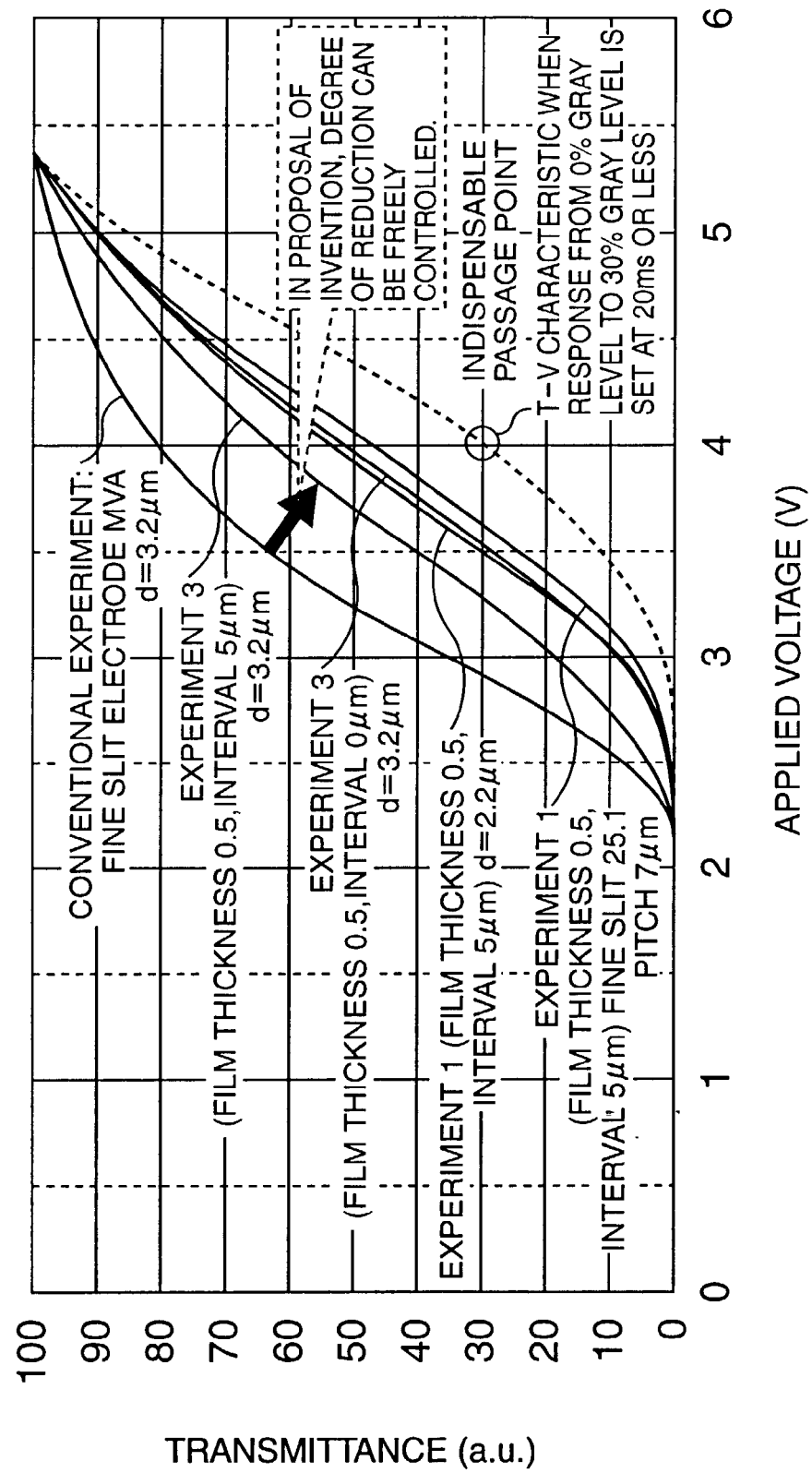
FIG. 14 is a characteristic diagram (T-V characteristic diagram) in which in the constructions of the embodiments 1 and 3, the widths of the non-dielectric regions are unified to about 5 μm and the horizontal axis represents voltage in place of gray level.

FIG. 14 is a response characteristic diagram in which in the constructions of the embodiments 1 and 3, the widths of the non-dielectric regions are unified to about 5 μm and the horizontal axis represents voltage in place of gray level.

If the widths of apertures are the same, both of the structures show almost the same response characteristic when being compared based on voltage (In FIG. 13 in which the horizontal axis represents gray level, the response speed in the experiment 1 is higher). It is thought that this is because the difference in T-V characteristic influences operation at low gray levels, whereby the experiment 1 shows higher-speed operation at low gray levels.

Figure 15:
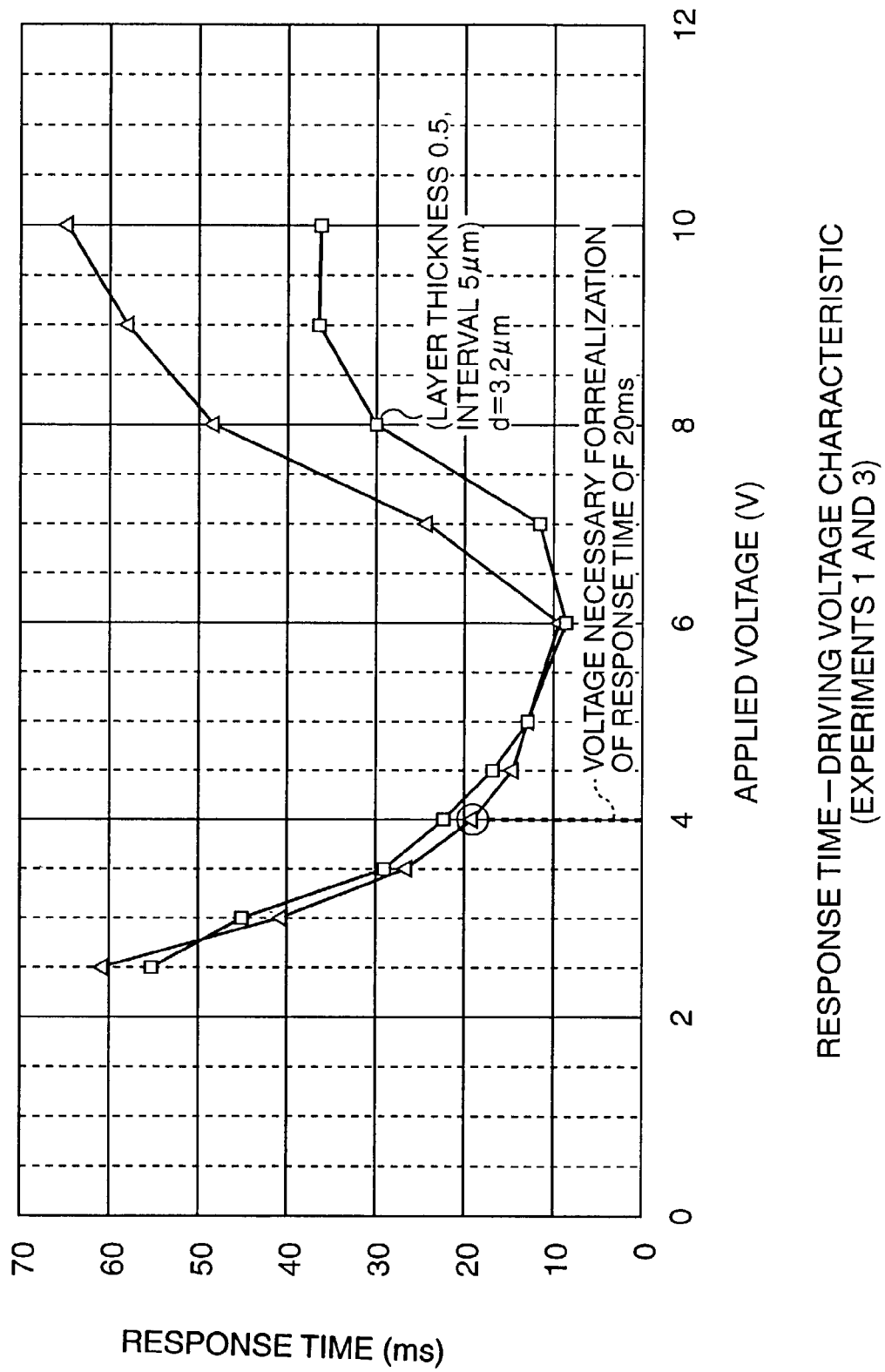
FIG. 15 is a characteristic diagram showing the relation between voltage and response time in the constructions of the experiments 1 and 3.

FIG. 15 is a characteristic diagram showing the relation between voltage and response time in the constructions of the experiments 1 and 3.

As shown, it can be seen that a characteristic curve curves more sharply in the experiment 1 compared with the experiment 3. In other words, a higher voltage is needed to display the same gray level. It is known that the voltage necessary to display a low gray level is higher in the experiment 1. This is the reason why higher speed can be achieved in the experiment 1 than the experiment 3.

The present invention also brings about an epoch-making improvement to panel design. For example, suppose that it is found that a response at a gray level of about 30% is the most noticeable to the naked eye, but if the response time at this gray level is reduced to 20 ms or less, it is not noticeable. In conventional arts, even if it is found, it is impossible to change a T-V characteristic with a reduction in response time. Contrary to this, in the present invention, the T-V characteristic can be freely controlled by changing the area ratio of dielectric regions to non-dielectric regions. Specifically, the voltage necessary to achieve 20 ms in FIG. 15 is 4 V, and hence it is recommended to realize the T-V characteristic in which a gray level of 30% is displayed when 4 V is applied in FIG. 14. This can be easily realized by only changing the area ratio or design conditions such as a dielectric layer thickness, a dielectric constant, and the like.

[Experiment 4]

Figure 16:
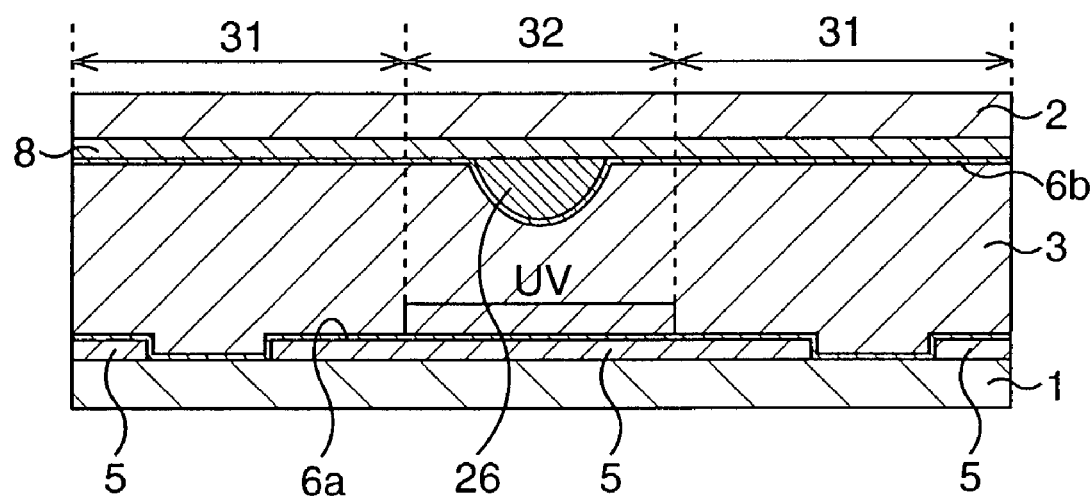
FIG. 16 is a schematic view showing the main construction of a liquid crystal display of an experiment 4 in the first embodiment.

FIG. 16 is a schematic sectional view showing the main construction of a liquid crystal display of the experiment 4.

In the construction of this experiment, the surface of the liquid crystal alignment film 6a on the transparent glass substrate 1 side is partially irradiated with ultraviolet rays, resulting in the formation of regions with different threshold voltages, that is, a high threshold voltage region 31 and a low threshold voltage region 32 relative thereto. In this case, in the high threshold voltage region 31 which is a portion not irradiated, operation is performed at an ordinary threshold voltage, but in the low threshold voltage region 32 which is a irradiated portion, the threshold voltage shifts to the lower voltage side, and hence at a low voltage, only the irradiated portion lights up, whereby the aforementioned partial response is realized.

In this experiment, first of all, whether the threshold voltage (T-V) characteristic can be changed by the ultraviolet rays is examined.

An experiment cell is constructed by irradiating the surface of the liquid crystal alignment film 6a (vertical alignment film: manufactured by JSR) provided above the one transparent glass substrate 1 having the ITO pixel electrodes 5 formed with slits, bonding this substrate to the other transparent substrate 2 having the ITO common electrode 8 formed with the bank-shaped projections 26, and injecting liquid crystals (manufactured by Merck & Co., Inc.) having negative dielectric constant anisotropy to form the liquid crystal layer 3. The thickness of the cell is 4 μm. Incidentally, in this experiment, the relation between voltage and transmittance is examined by changing irradiation energy by the use of two kinds of ultraviolet light sources, a parallel light source (UV irradiation device manufactured by USHIO Inc.) and a non-parallel light source (UV irradiation device manufactured by ORC Inc.).

Figure 17A:
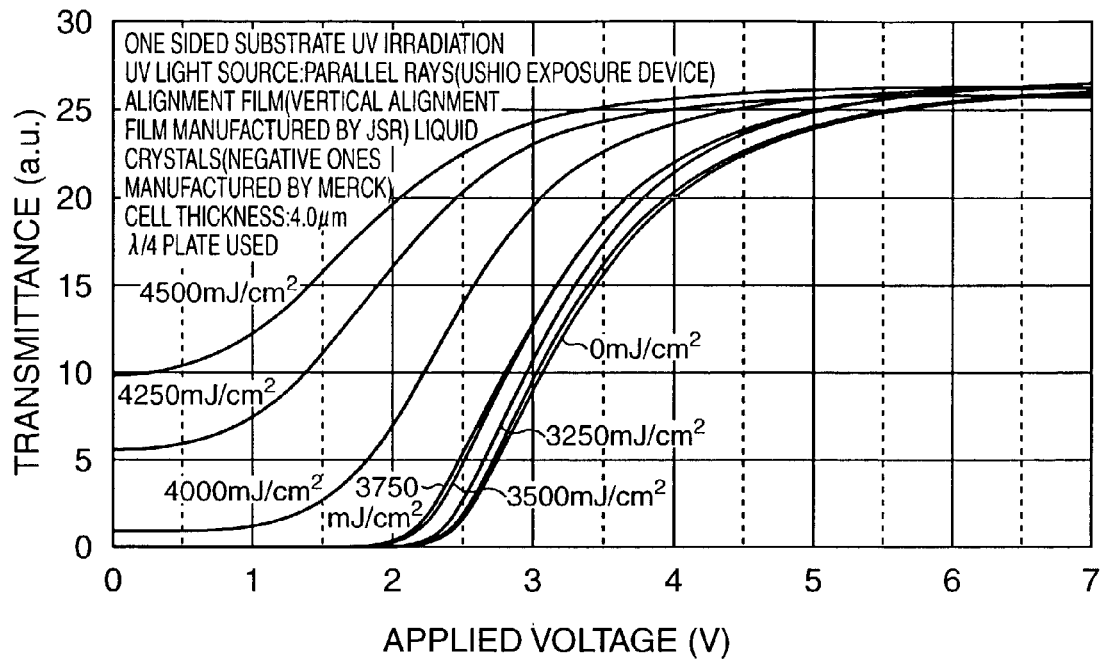
FIG. 17A and FIG. 17B are characteristic diagrams each showing a result of an investigation of the relation between voltage and transmittance by changing irradiation energy by the use of two kinds of ultraviolet light sources, a parallel light source and a non-parallel light source.
Figure 17B:
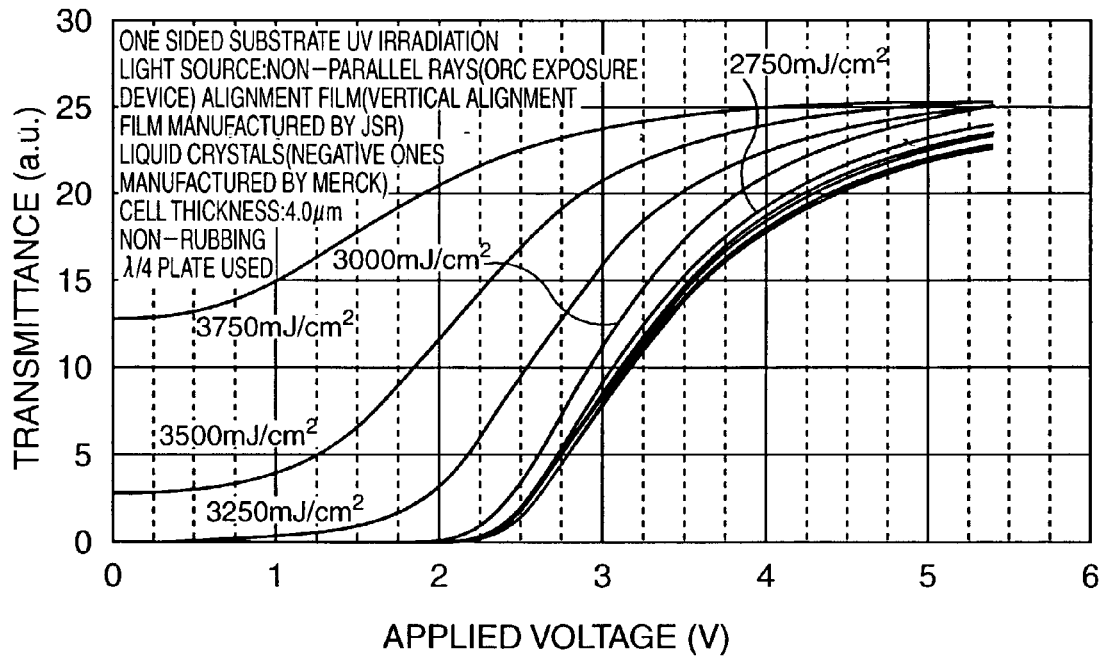

The result of the former is shown in FIG. 17A, and the result of the latter is shown in FIG. 17B respectively.

It is found that the threshold voltage can be changed by irradiating the surface of the liquid crystal alignment film 6a with ultraviolet rays as stated above.

Next, in the construction of this experiment, in order to examine the realization of partial response by the local irradiation of the surface of the liquid crystal alignment film with violet rays, the relation between voltage and transmittance and the relation between transmittance and response time are examined respectively by changing the irradiation amount of a ultraviolet light source.

Figure 18A:
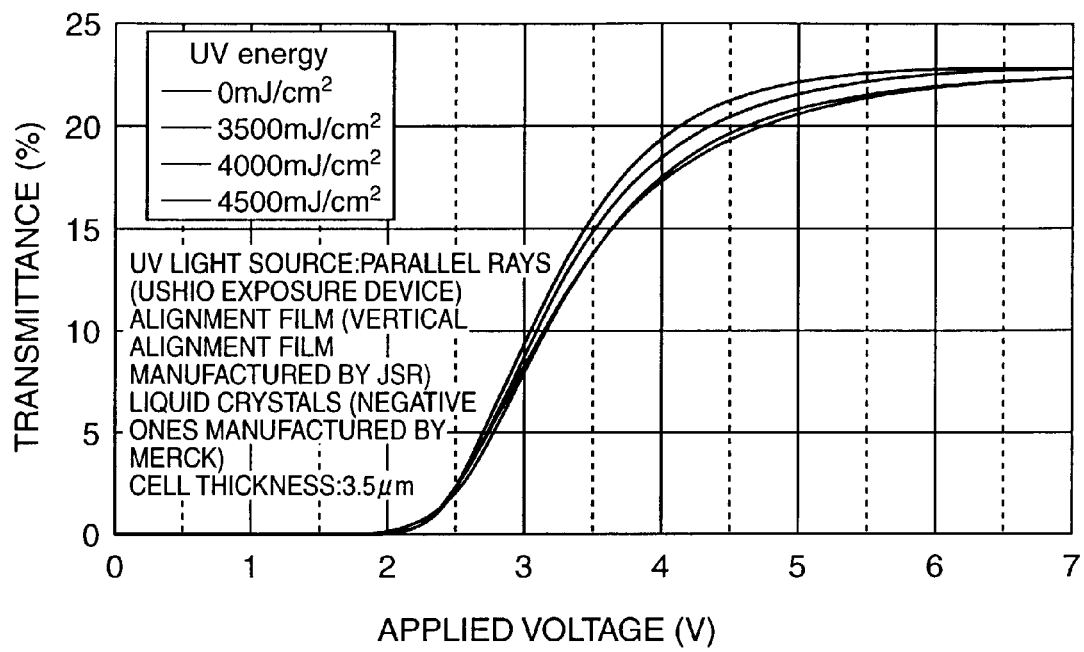
FIG. 18A and FIG. 18B are characteristic diagrams each showing a result of an investigation of the relation between voltage and transmittance and the relation between transmittance and response time by changing the irradiation amount of a ultraviolet light source.
Figure 18B:
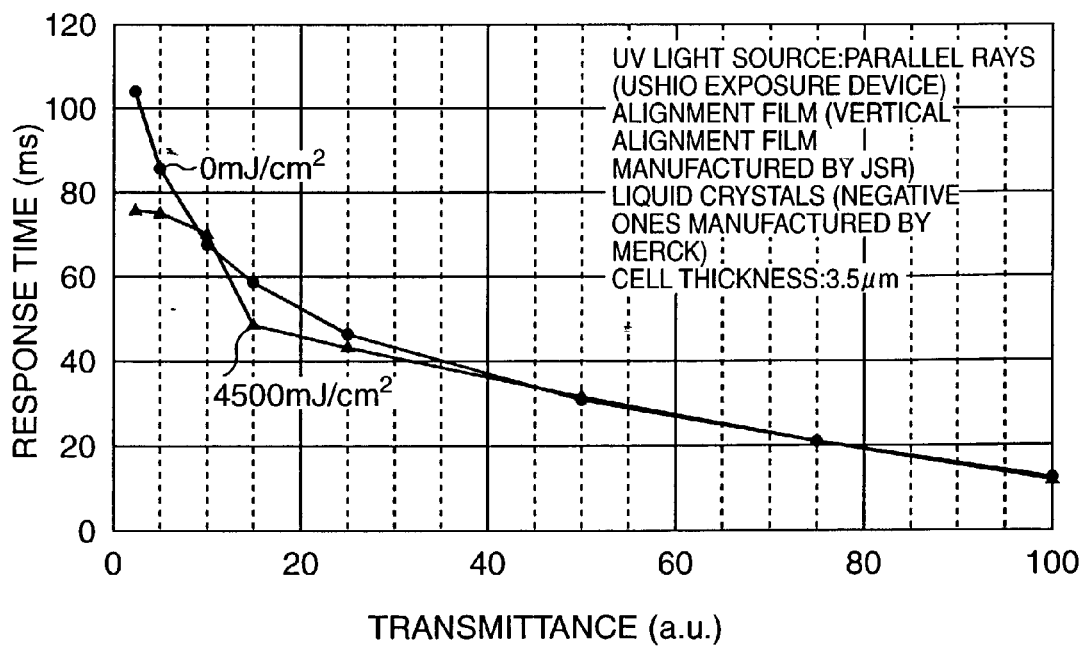

The result of the former is shown in FIG. 18A and the result of the latter is shown in FIG. 18B respectively.

As shown, it is confirmed that the threshold voltage is slightly sifted to the lower voltage side in an irradiation amount of 4500 $mJ/cm^2$. Regarding the response characteristic, similarly, it is confirmed that the maximum response time is shortened from 105 ms to 75 ms in the irradiation amount of 4500 $mJ/cm^2$, as compared with a case where ultraviolet irradiation is not performed, leading to improved operation at low gray levels.

[Experiment 5]

In this experiment, by using the different irradiation amounts of ultraviolet rays respectively in the liquid crystal alignment film 6a provided above the one transparent glass substrate 1 having the ITO pixel electrodes 5 formed with the slits and the liquid crystal alignment film 6b provided above the other transparent glass substrate 2 having the ITO common electrode 8 formed with the bank-shaped projections 26, so that the threshold voltages (vertical alignment components) are different from each other.

Figure 19A:
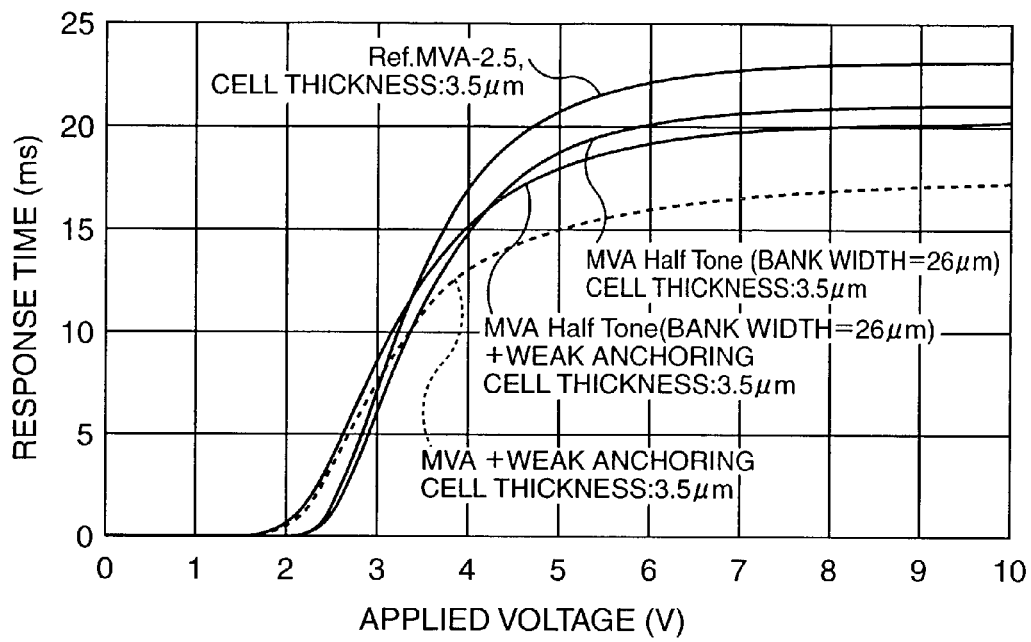
FIG. 19A and FIG. 19B are characteristic diagrams each showing a response characteristic of low gray levels.
Figure 19B:
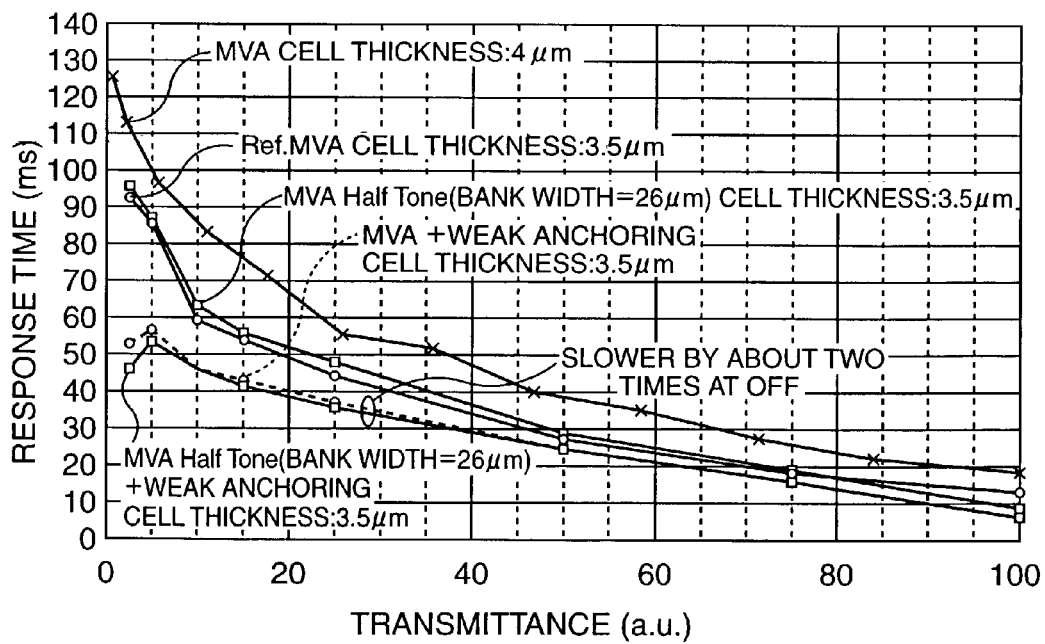

More specifically, a vertical alignment film with 25% vertical alignment components (manufactured by JSR) as the liquid crystal alignment film 6b is provided above the other transparent glass substrate 2, and a vertical alignment film whose vertical alignment components are reduced to 5% is provided as the liquid crystal alignment film 6a above the one transparent glass substrate 1. In the latter vertical alignment film with a low vertical alignment property, liquid crystals tilt more easily by the application of voltage, whereby as shown in FIGS. 19A and 19B (FIG. 19A shows the relation between voltage and response time, and FIG. 19B shows the relation between transmittance and response time), the threshold voltage can be reduced greatly. Moreover, as for the response characteristic at low gray levels, the maximum response time is shortened from 95 ms to 55 ms as compared with a case where the vertical alignment components are not adjusted (adjusted to reduce), and an improvement superior to the case of the experiment 4 is confirmed.

[Experiment 6]

In this experiment, above the one transparent glass substrate 1 having the ITO pixel electrodes 5 formed with the band-shaped slits 25 and the other transparent glass substrate 2 having the ITO common electrode 8 formed with the bank-shaped projections 26, the same vertical alignment film (manufactured by JSR) is provided as the liquid crystal alignment films 6a and 6b, and only the vertical alignment film above the other transparent glass substrate 2 is irradiated with 3000 $mJ/cm^2$ of ultraviolet rays by the non-parallel light source (UV irradiation device manufactured by ORC Inc.). As a result, similarly to the experiment 4, concerning the response characteristic at low gray levels, the maximum response time is shortened from 95 ms to 60 ms, and an excellent improvement is conformed.

[Experiment 7]

Figure 20:
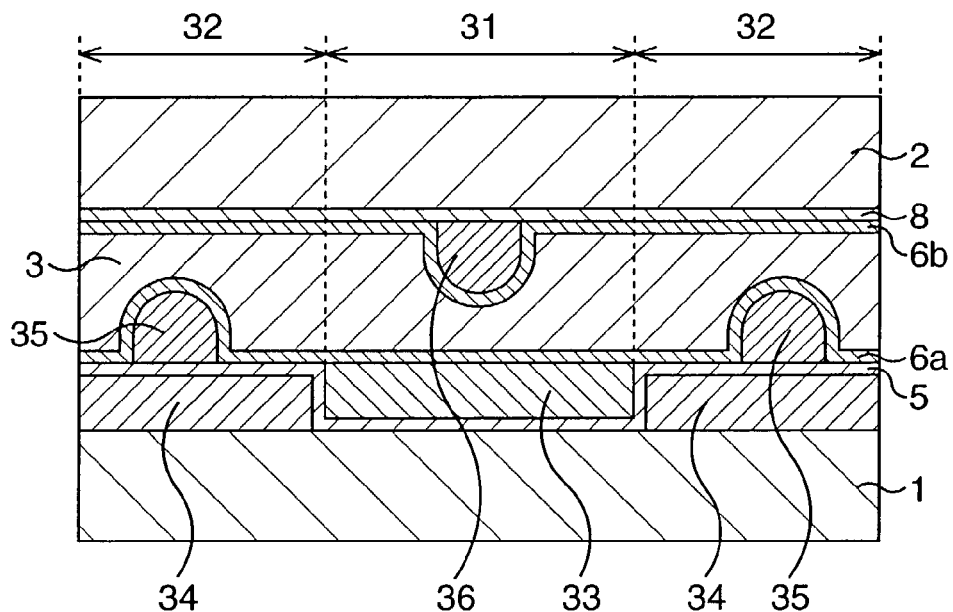
FIG. 20 is a schematic view showing the main construction of a liquid crystal display of an experiment 7 in the first embodiment.

FIG. 20 is a schematic sectional view showing the main construction of a liquid crystal display of the experiment 7.

In this experiment, a display pixel is divided into two regions 31 and 32 having different distances between the electrodes (the ITO pixel electrode 5 and the ITO common electrode 8) of the opposed transparent glass substrates 1 and 2. Moreover, an insulator with a thickness capable of making up the difference in distance, a dielectric layer 33 in this case, is provided to fill up a groove portion of the region 31, on the ITO pixel electrode 5, whereby almost flat face is formed by the dielectric layer 33 and the insulating layer 34 such as $SiO_2$. Incidentally, it is desirable to use a photoresist with high transparency (for example, positive photoresist manufactured by JSR) as the dielectric layer 33. Moreover, in the region 32, that is, on the ITO pixel electrode 5 above the transparent glass substrate 1 with the insulating layer 34 therebetween, a bank-shaped projection 35 is provided, and a bank-shaped projection 36 is provided on the ITO common electrode 8 of the glass substrate 2 in a portion facing the region 31.

The liquid crystal alignment film 6a is formed to cover the flat face and the bank-shaped projections 35 on the transparent glass substrate 1 side, and the liquid crystal alignment film 6b is formed to cover the ITO common electrode 8 and the bank-shaped projections 36 on the transparent glass substrate 2 side, and the liquid crystal display is constructed by sandwiching the liquid crystal layer 3 between these substrates 1 and 2.

In the liquid crystal display of this experiment, due to a difference in dielectric constant between the dielectric layer 33 and the insulating layer 34, the region 31 is made a high threshold voltage region and the region 32 is made a low threshold voltage region, whereby only the region 32 operates at low gray levels, and hence the response time is shortened, resulting in the realization of the partial response. Further, the existence of the bank-shaped projections 35 and 36 causes a pretilt of liquid crystals and can stabilize the alignment property of the liquid crystals in a short time, whereby an improvement in response characteristic is promoted. Furthermore, in this experiment, the flat face is formed by the dielectric layer 33 and the insulating layer 34, and hence the thickness of the liquid crystal layer 3 is made almost uniform, whereby improvement in transmittance and viewing angle characteristic can be realized.

[Experiment 8]

Figure 21:
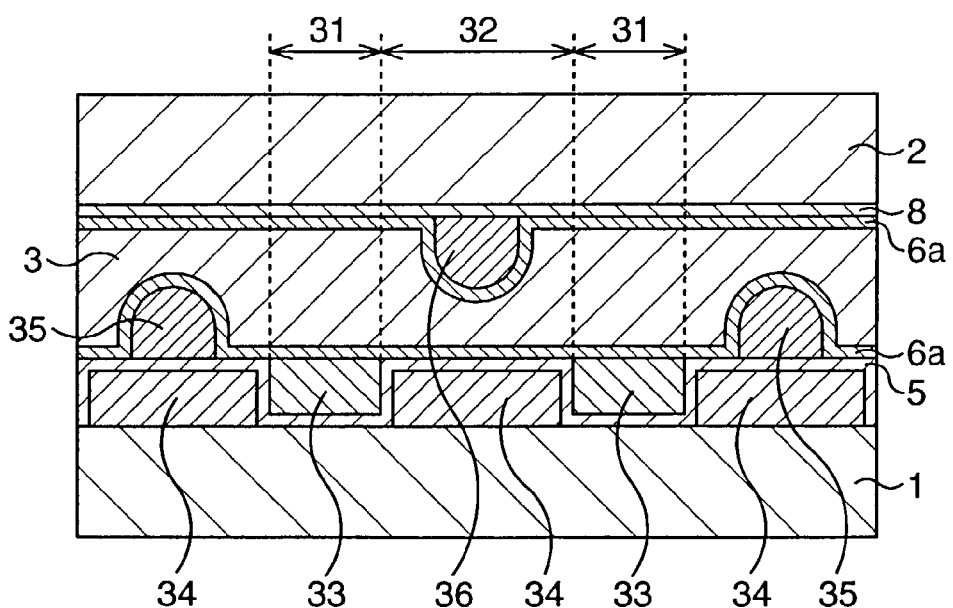
FIG. 21 is a schematic view showing the main construction of a liquid crystal display of an experiment 8 in the first embodiment.

FIG. 21 is a schematic sectional view showing the main construction of a liquid crystal display of the experiment 8.

This experiment is a modified example of the experiment 7, and the liquid crystal display is constructed in such a manner that pitches of the regions 31 and 32 in the construction explained by means of FIG. 20 are changed (narrowed), and each of the bank-shaped projections 36 on the transparent glass substrate 2 side faces to the region 31 (insulating layer 34) on the transparent glass substrate 1 side.

In this case, a strong voltage is applied only in the vicinity of the bank-shaped projections 35 and 36. Since the pretilt of liquid crystals is performed in the vicinity of the bank-shaped projections 35 and 36, the alignment of the liquid crystals is changed easily at a low voltage. Accordingly, thanks to this construction, by increasing a voltage near the bank-shaped projections 35 and 36, the movement of the liquid crystals in the vicinity thereof can be assisted.

[Experiment 9]

Figure 22:
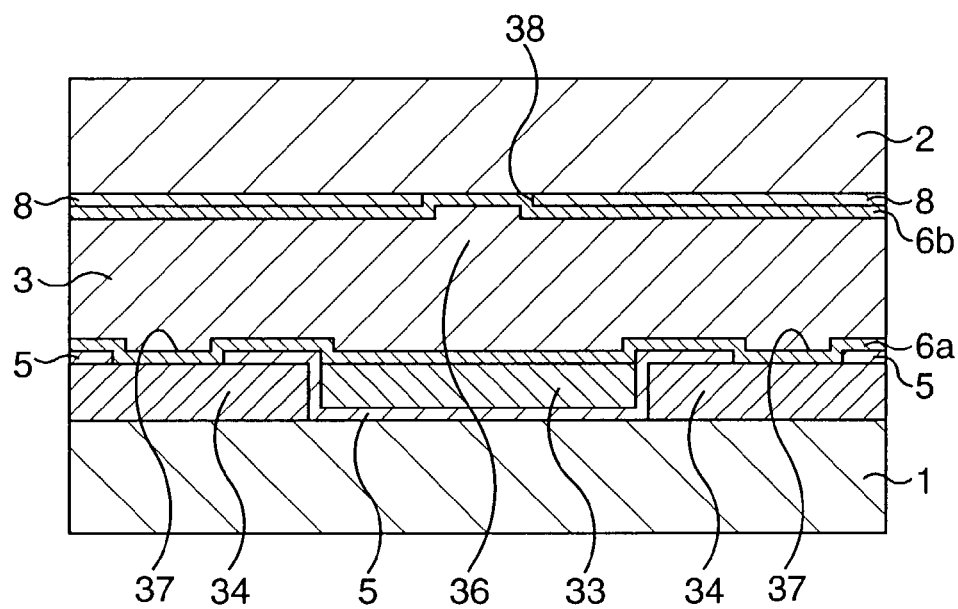
FIG. 22 is a schematic view showing the main construction of a liquid crystal display of an experiment 9 in the first embodiment.

FIG. 22 is a schematic sectional view showing the main construction of a liquid crystal display of the experiment 9.

This experiment is a modified example of the experiment 7, and in place of the bank-shaped projections 35 and 36, band-shaped slits 37 and 38 are respectively formed in portions corresponding to the bank-shaped projections 35 and 36 of the ITO electrode 5 and the ITO common electrode 8. Consequently, the response time is shortened and the aforementioned partial response is realized. Also, similarly to the case where the bank-shaped projections 35 and 36 are provided, the pretilt of liquid crystals is caused, and the alignment property of the liquid crystals can be stabilized in a short time, whereby an improvement in response characteristic is promoted. Incidentally, it is possible to mingle the bank-shaped projections and the slits in the electrodes.

Figure 23:
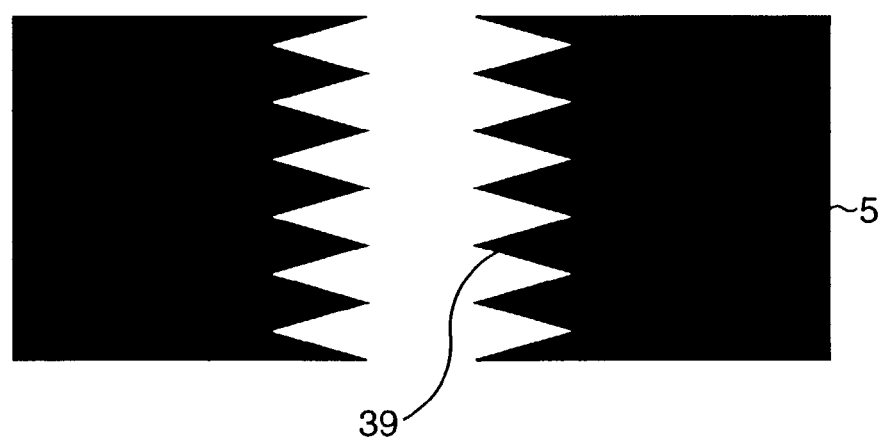
FIG. 23 is a schematic view showing another example of the liquid crystal display of the experiment 9 in the first embodiment.

In this experiment, it is suitable to form a fine slit 39, which is pattern-formed in the shape of fine teeth of a comb laterally symmetrical with respect to a band shaped portion as shown in FIG. 23, in the ITO pixel electrode 5 (ITO common electrode 8), in place of the band-shaped slit. Consequently, the aforementioned partial response can be enhanced more.

[Experiment 10]

Figure 24:
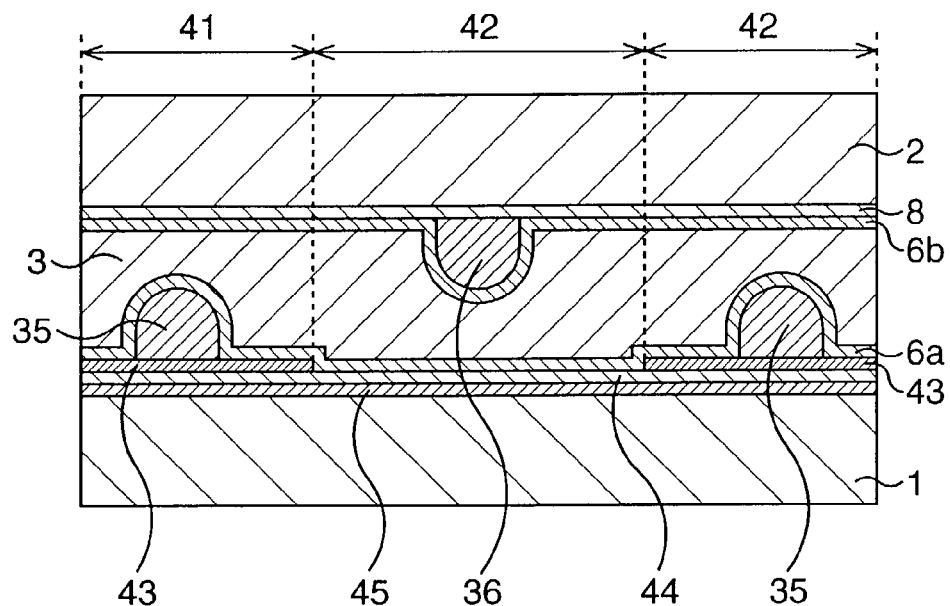
FIG. 24 is a schematic view showing the main construction of a liquid crystal display of an experiment 10 in the first embodiment.

FIG. 24 is a schematic sectional view showing the main construction of a liquid crystal display of the experiment 10.

In the liquid crystal display of this experiment, a display pixel is divided into two regions 41 and 42 having different capacitances by capacitive coupling, and voltages corresponding to the capacitances are respectively applied to the regions 41 and 42 in the application of a driving voltage.

Specifically, above the transparent glass substrate 1, the respective regions 41 and 42 are formed according to the presence or absence of a driving electrode 43 as an alternative to the ITO pixel electrode, a division electrode 45 which capacitively couples with the driving electrode 43 with a dielectric layer 44 therebetween is provided under the driving electrode 43, and the bank-shaped projections 35 and 36 are provided in the same portions as those of the liquid crystal display of the experiment 7. As the dielectric layer 44, for example, SiN or the like used as an interlayer dielectric of a thin film transistor (TFT) is formed to have a thickness of about 150 nm.

In this experiment, by the aforementioned construction, a voltage applied to the driving electrode 43 is divided by the capacitance of the driving electrode 43 and the division electrode 45 and the capacitance of the pixel, and applied to the division electrode 43. Hence, in one pixel, the region 41 with the driving electrode 43 and the region 42 without the driving electrode 43 can have different applied voltages, whereby the response time is shortened, resulting in the realization of the aforementioned partial response. Incidentally, the division electrode 43 may be disposed in a portion midway located between the adjacent bank-shaped projections 35 and 36.

[Experiment 11]

Figure 25:
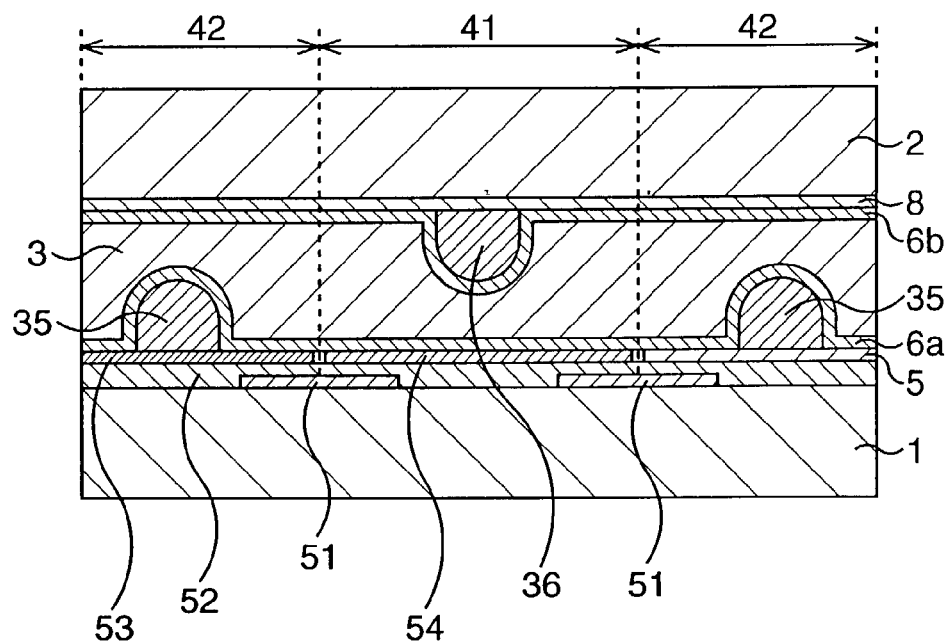
FIG. 25 is a schematic view showing the main construction of a liquid crystal display of an experiment 11 in the first embodiment.

FIG. 25 is a schematic sectional view showing the main construction of a liquid crystal display of the experiment 11.

This experiment is a modified example of the experiment 10. Capacitive coupling electrodes 51 are formed at even intervals in predetermined portions on the transparent glass substrate 1, and a driving electrode 53 and a division electrode 54 are formed adjacent to each other above each of these capacitive coupling electrodes 51 with an dielectric layer 52 therebetween. A gap between the driving electrode 53 and the division electrode 54 is adjusted to be located in a predetermined portion on the capacitive coupling electrode 51, so that a voltage applied to the driving electrode 53 is divided by the respective capacitances of the driving electrode 53 and the capacitive coupling electrode 51 and of the driving electrode 53 and the division electrode 54, and the capacitance of the pixel, and applied to the division electrode 53. Hence, in one pixel, the region 41 with the capacitive coupling electrode 51 and the region 42 without the capacitive coupling electrode 51 can have different applied voltages, whereby the response time is shortened, resulting in the realization of the aforementioned partial response. Incidentally, the division electrode 54 may be disposed in a portion midway located between the adjacent bank-shaped projections 35 and 36.

[Experiment 12]

Figure 26:
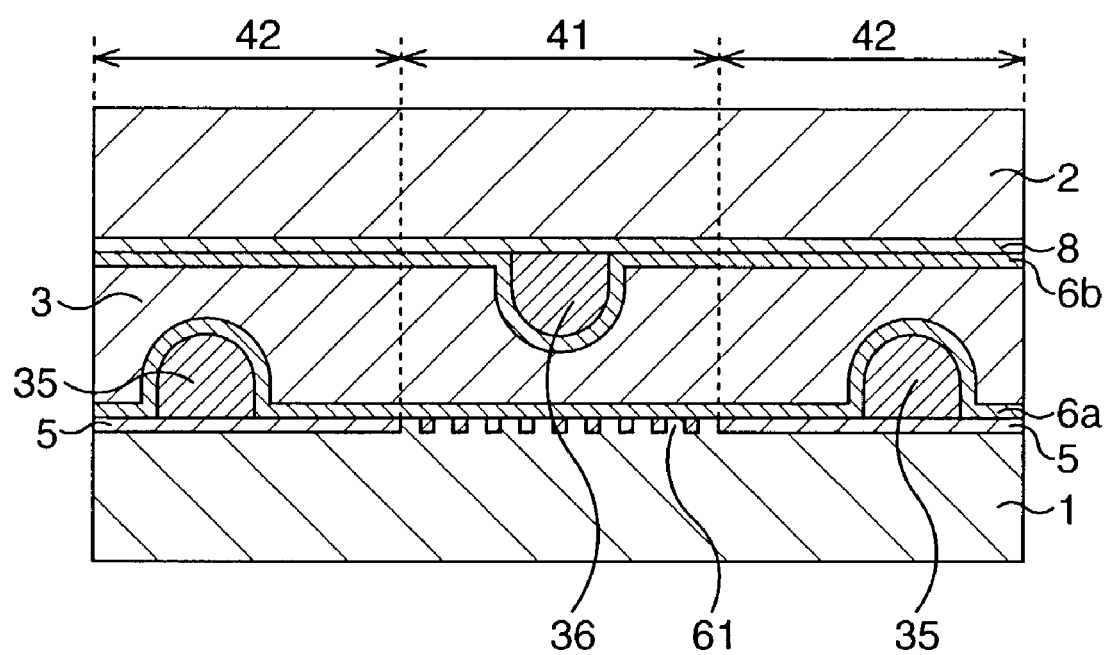
FIG. 26 is a schematic view showing the main construction of a liquid crystal display of an experiment 12 in the first embodiment.

FIG. 26 is a schematic sectional view showing the main construction of a liquid crystal display of the experiment 12.

In the liquid crystal display of this experiment, minute through-holes 61 (with a diameter of about 1 μm) are formed densely in a predetermined portion of the ITO pixel electrode 5, and the display pixel is divided into different two regions corresponding to the portions. In this case, in the display pixel, the average electric field strength lowers in the region 41 formed with the through-holes 61, while the average electric field strength relatively elevates in the region 42 formed without the through-holes 61, whereby the operating voltage of liquid crystals can be made different depending on the regions of the pixel, leading to a reduction in response time and the realization of the partial response.

[Experiment 13]

Figure 27B:
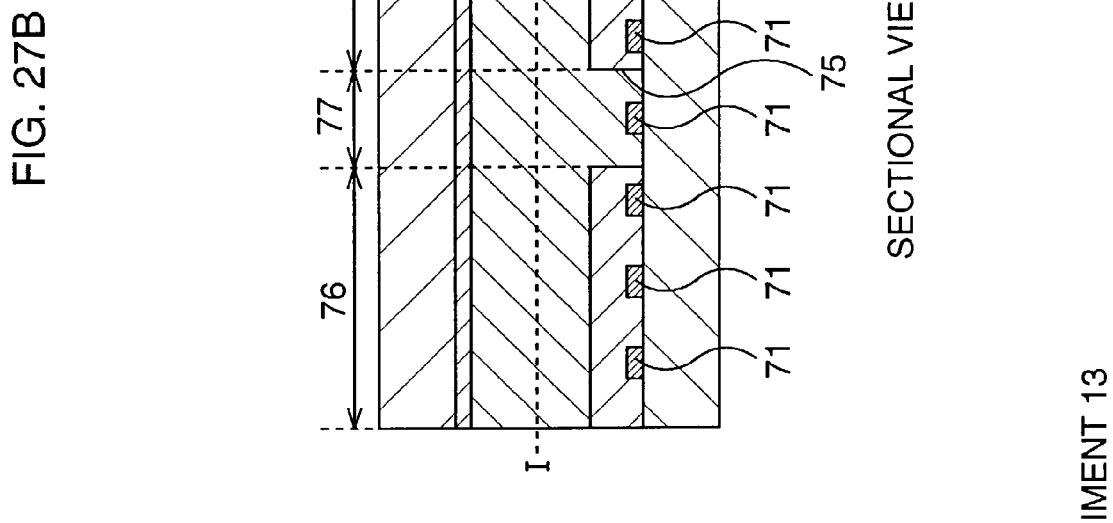
FIG. 27A and FIG. 27B are schematic views showing the main construction of a liquid crystal display of an experiment 13 in the first embodiment.
Figure 27A:
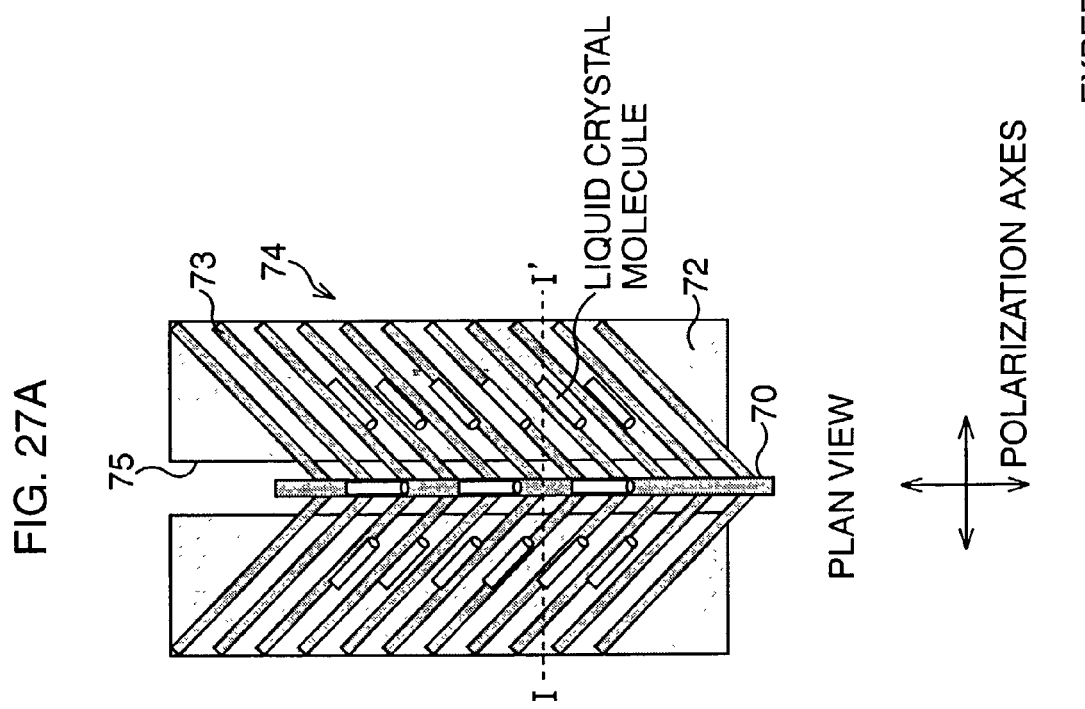

FIGS. 27A and 27B are schematic views showing the main construction of a liquid crystal display of the experiment 13, FIG. 27A is a plan view, and FIG. 27B is a sectional view taken along the line I–I'.

In the liquid crystal display of this experiment, in a display pixel, an insulating structure 72 formed with a band-shaped opening 75 for exposing part of fine electrode patterns 71 being the ITO pixel electrode formed above the transparent glass substrate 1 is provided, and regions with different threshold voltages are formed in the display pixel by this insulating structure 72.

In the fine electrode patterns 71, stripe pattern groups 74 each composed of a plurality of stripe patterns 73 extending in the same direction are formed, and between the adjacent stripe pattern groups 74, respective directions in which the stripe patterns 73 extend are different. The insulating structure 72 is formed so that a portion located midway between the adjacent stripe pattern groups 74 is exposed from the band-shaped opening 75, and the threshold voltage is adjusted so that control for a predetermined gray level display characteristic is performed. In this case, in the display pixel, a region 76 with the insulating structure 72 is a high threshold voltage region, and a region 77 without the insulating structure 72, which is namely the region of the opening 75, is a low threshold voltage region. Accordingly, at low gray levels, only the low threshold voltage region 77 operates, whereby the response time in halftone is shortened, and the aforementioned partial response is realized.

In this experiment, only liquid crystals in the portion of the opening 75 and its vicinity align on the tilt, and liquid crystals on the insulating structure 72 are kept in the state of almost vertical alignment. On this occasion, the polarization axes are disposed in vertical and lateral directions, whereby light does not pass through liquid crystals pointing downward. By allowing light to pass through liquid crystals tilting slightly to the right or the left from below, halftone display can be realized. Thus, when a low voltage is applied, only liquid crystals in the portion of the opening 75 (the region 77) respond, whereby the aforementioned partial response can be realized.

Accordingly, halftone response through the use of a response from black to white which is high-speed response can be realized, whereby the speed of halftone response is increased. Meanwhile, when white is displayed, a sufficient voltage is applied also to liquid crystals in the region with the structure, and hence all of the region 76 with the insulating structure 72 and the region 77 without it respond.

The concrete construction of the liquid crystal display of this experiment will be explained.

In this experiment, each of the ITO pixel electrodes is formed above the transparent glass substrate 1 and patterned in the shape of fine stripes to form the stripe pattern groups 74 to constitute the fine electrode patterns 71. A glass substrate (manufactured by Nippon Electric Glass Co., Ltd.) with a thickness of 0.7 mm is used as a material for the substrate. The fine electrode patterns 71 are formed by repeating V-shapes so that directions of extension of a linear structure differ from each other by almost 90° within the surface of the substrate, and connecting respective electrode materials in the central portion of each V-shape. The width of the V-shape is about 3 µm, the length of each side is about 40 µm, and the distance between respective V-shapes is about 3 µm. A connection portion between the respective V-shapes has a width of about 3 µm.

On the fine electrode patterns 71 thus formed, in a region excepting the middle portions (with a width of 5 µm) of the V-shapes, the insulating structure 72 is selectively formed. The height of the insulating structure 72 is about 0.5 µm. Photosensitive acrylic resin manufactured by JSR is used as a material for the insulating structure. The insulating structure 72 is formed by spin-coating the surface of the transparent glass substrate 1 with the resin, baking it (by the use of a clean oven) at 90° C. for 20 minutes, selectively irradiating it with ultraviolet rays with a photomask, developing it with an organic alkaline developer (TMAH 0.2 wt % of an aqueous solution), and baking it (by the use of the clean oven) at 200° C. for 60 minutes.

The liquid crystal alignment film 6a (vertical alignment film) is formed above this transparent glass substrate 1. A vertical alignment film manufactured by JSR Company is used as a material for the alignment film, and the surface of the transparent glass substrate 1 is spin-coated with this material and pre-baked (by the use of a hot plate) at 80° C. for one minute, and thereafter baked (by the use of a hot plate) at 180° C. for 60 minutes.

Figure 28A:
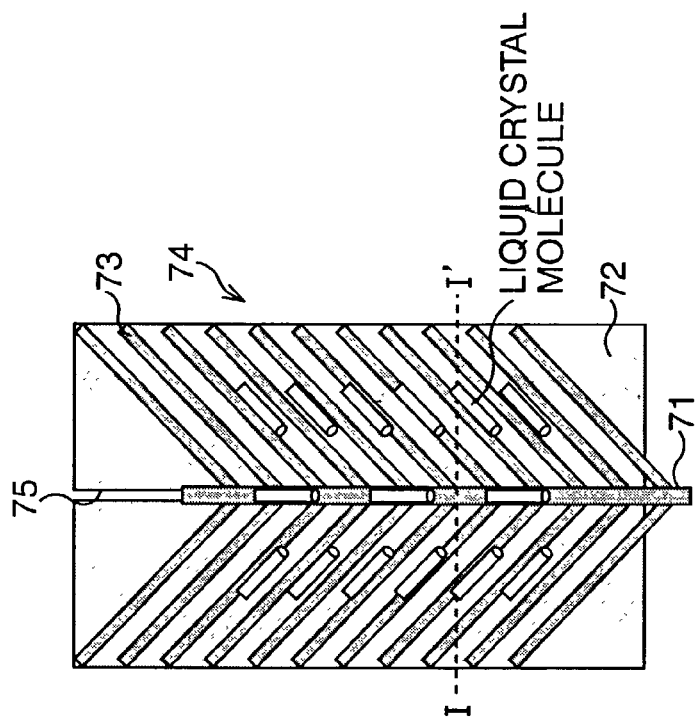
FIG. 28A and FIG. 28B are schematic views showing another example of the liquid crystal display of the experiment 13 in the first embodiment.
Figure 28B:
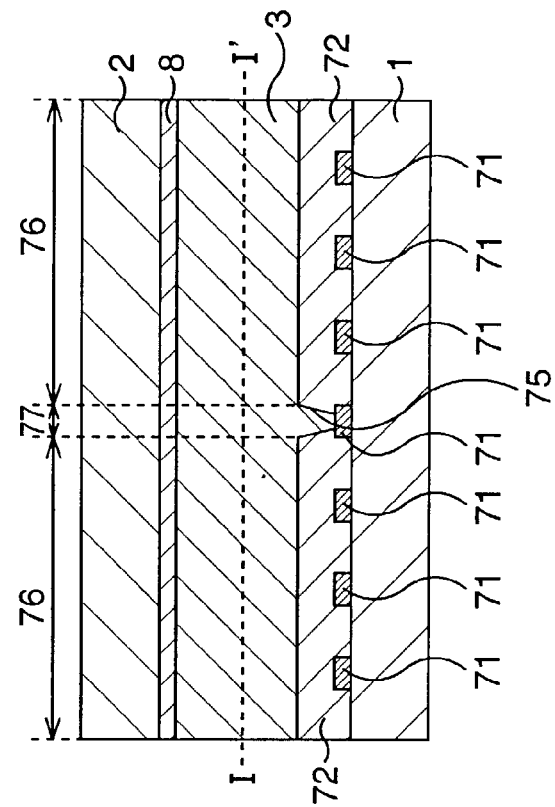
Figure 29B:
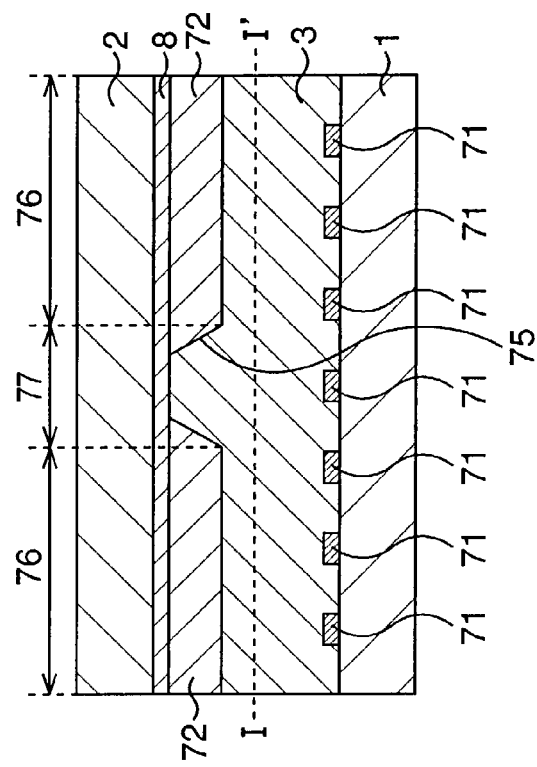
FIG. 29A and FIG. 29B are schematic views showing still another example of the liquid crystal display of the experiment 13 in the first embodiment.
Figure 29A:
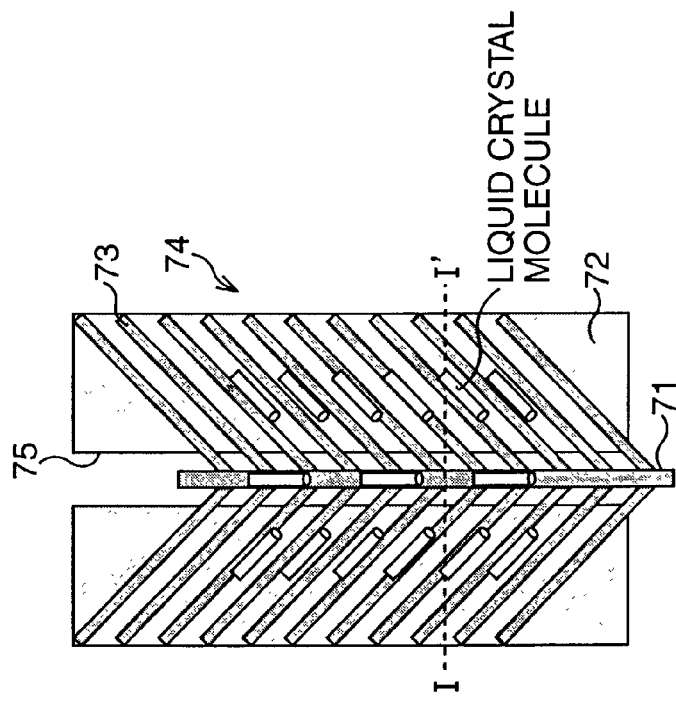
Figure 30A:
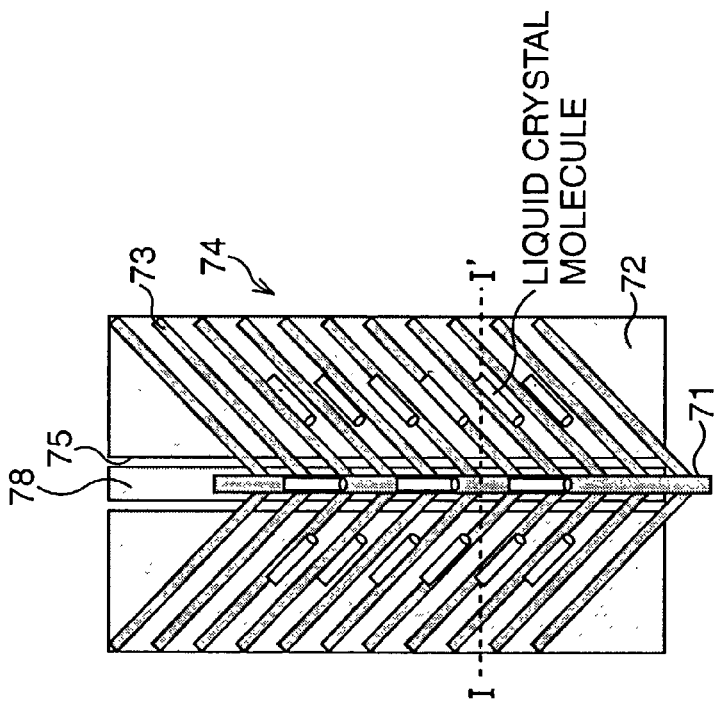
FIG. 30A and FIG. 30B are schematic views showing yet another example of the liquid crystal display of the experiment 13 in the first embodiment.
Figure 30B:
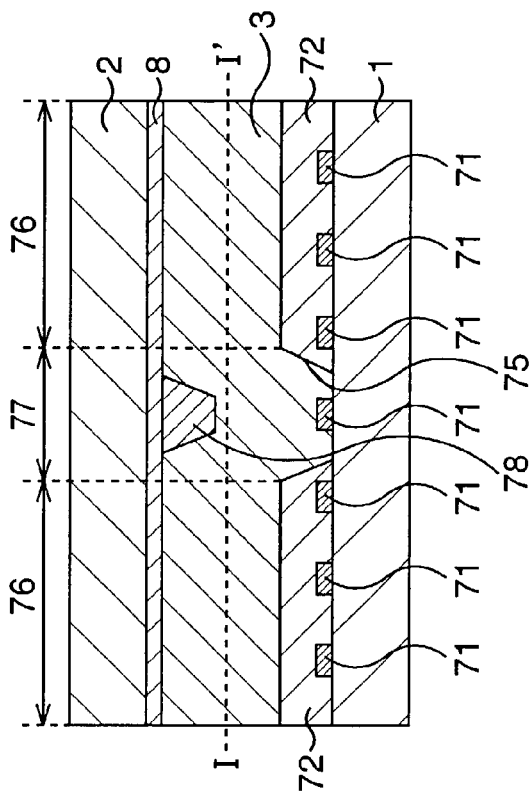

In this experiment, the insulating structures 72 are placed adjacent to the connection portion in the middle of the V-shape, but as shown in FIGS. 28A and 28B, may overlap partially with the connection portion. Moreover, as shown in FIGS. 29A and 29B, the insulating structures 72 may be disposed in portions facing to the fine electrode patterns 71. Furthermore, as shown in FIGS. 30A and 30B, it is suitable to provide a band-shaped insulating structure 78 in a portion facing the transparent glass substrate 1 with the fine electrode patterns 71 formed with the insulating structures 72. In this case, the height of the band-shaped insulating structure 78 is about 0.7 µm, and the width thereof is about 3 µm.

The ITO common electrode 8 is formed all over the other transparent glass substrate 2, and the liquid crystal alignment film 6b is formed on the ITO common electrode 8.

The substrates 1 and 2 thus formed are bonded with a spacer with a diameter of 4 µm (manufactured by Sekisui Fine Chemical) therebetween to form an empty cell, and a liquid crystal material with negative dielectric constant anisotropy manufactured by Merck & Co., Inc. is injected into a space between the substrates 1 and 2 to form the liquid crystal layer 3.

Experiment 14

Figure 31B:
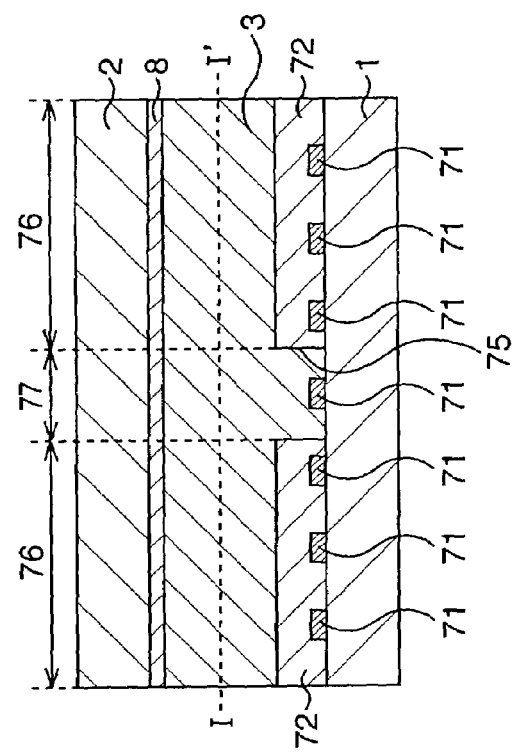
FIG. 31A and FIG. 31B are schematic views showing the main construction of a liquid crystal display of an experiment 14 in the first embodiment.
Figure 31A:
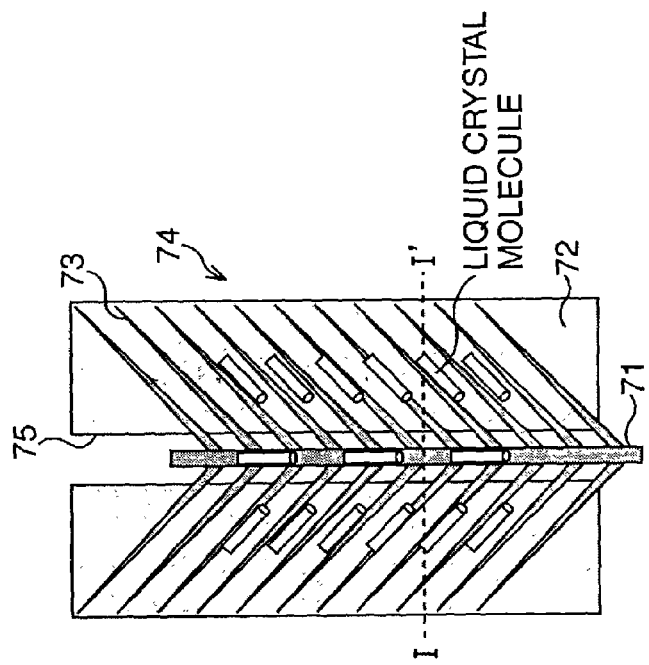

FIGS. 31A and 31B are schematic views showing the main construction of a liquid crystal display of the experiment 14, FIG. 31A is a plan view, and FIG. 31B is a sectional view taken along the line I–I'.

This experiment is a modified example of the experiment 13, and the fine electrode patterns 71 are formed to have tapered tips, thereby imparting a directional property to these fine electrode patterns. More specifically, the width of the ends of the fine electrode patterns 71 is about 6 µm on its wide side and about 2 µm on its narrow side. Thereby, it becomes possible to control the alignment of liquid crystals precisely.

[Experiment 15]

Figure 32A:
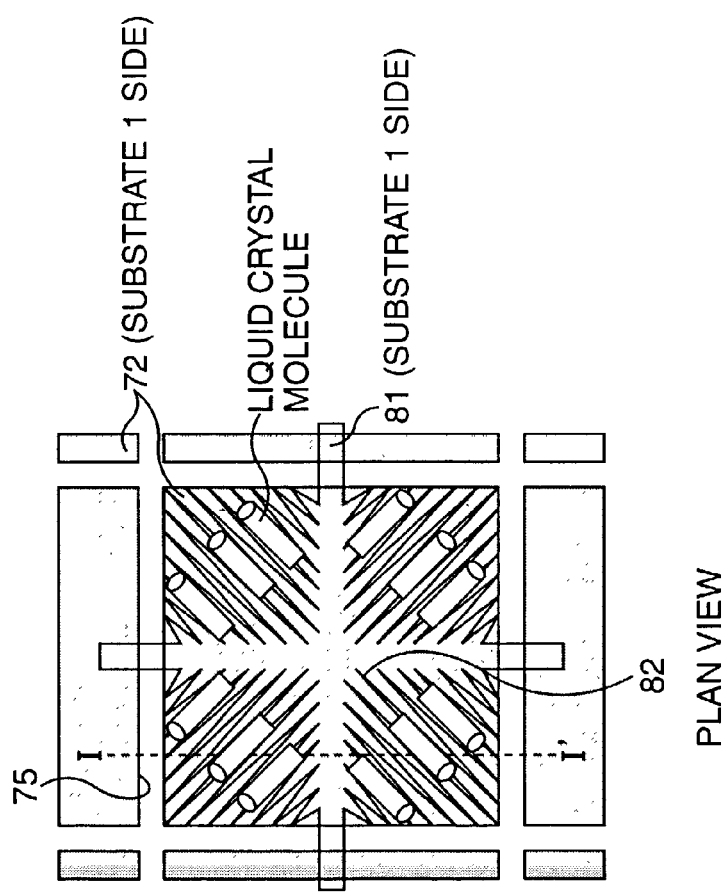
FIG. 32A and FIG. 32B are schematic views showing the main construction of a liquid crystal display of an experiment 15 in the first embodiment.
Figure 32B:
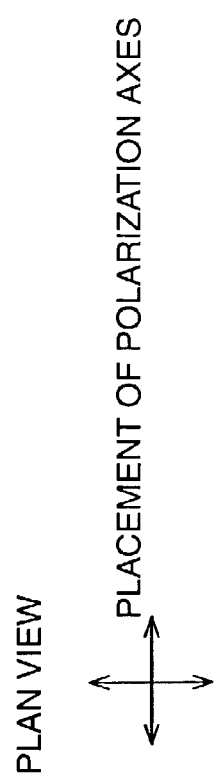
Figure 33B:
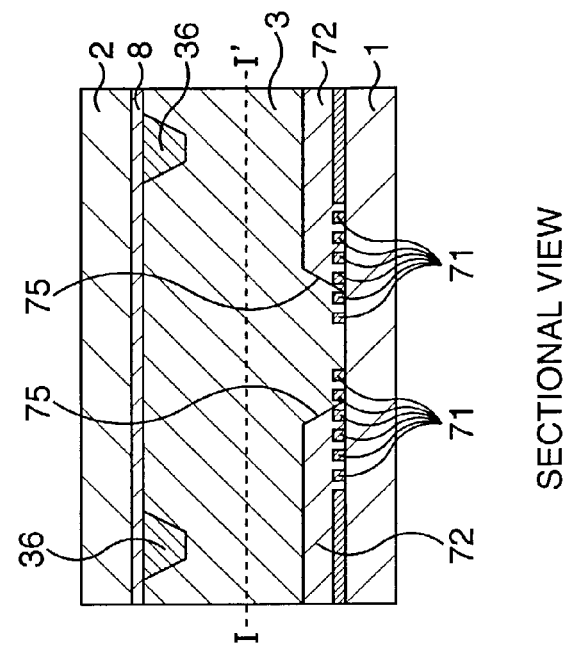
FIG. 33A and FIG. 33B are schematic views showing another example of the liquid crystal display of the experiment 15 in the first embodiment.
Figure 33A:
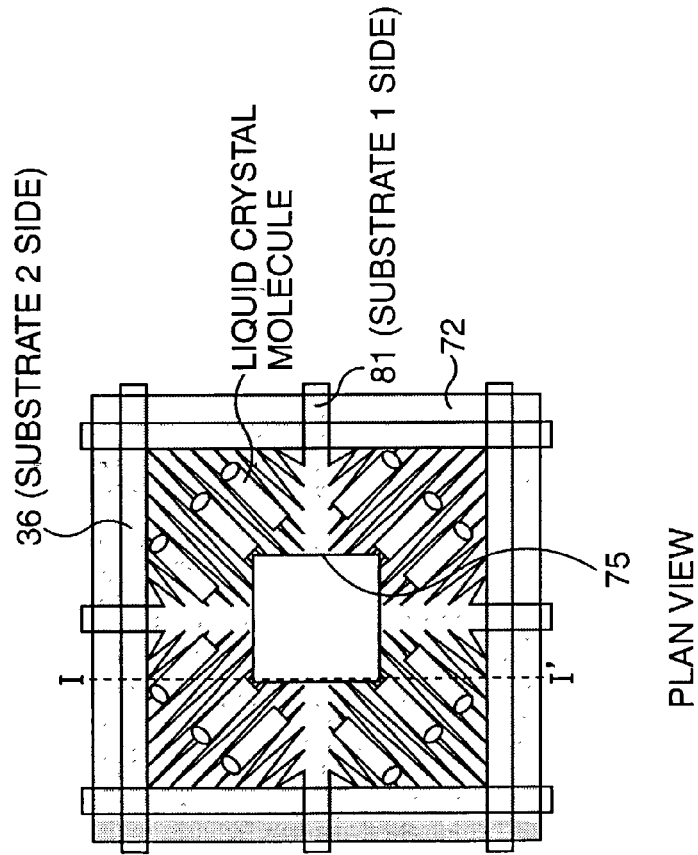
Figure 34B:
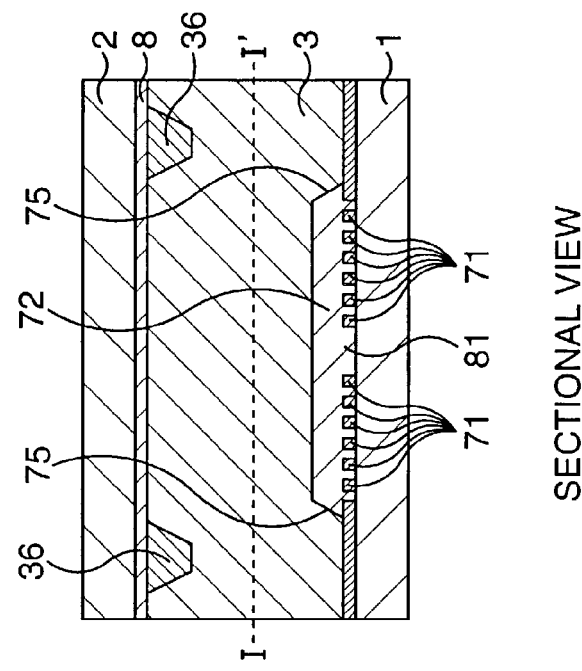
FIG. 34A and FIG. 34B are schematic views showing still another example of the liquid crystal display of the experiment 15 in the first embodiment.
Figure 34A:
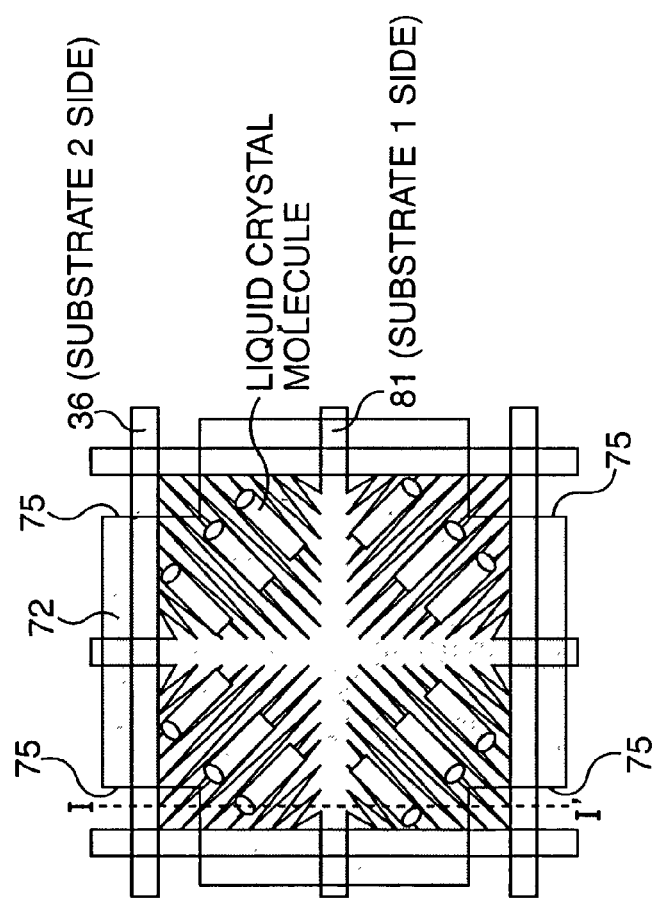

FIGS. 32A and 32B are schematic views showing the main construction of a liquid crystal display of the experiment 15, FIG. 32A is a plan view, and FIG. 32B is a sectional view taken along the line I–I'.

This experiment is a modified example of the experiment 13. It is different from the experiment 13 in the fine electrode patterns 71, and with this difference, different therefrom in the shape of the insulating structure 72.

More specifically, first, lattice-shaped electrode patterns 81 are formed in the ITO pixel electrode. The width of a lattice is 5 µm. In each of four regions divided by the lattice-shaped electrode patterns 81, fine electrode patterns 82 each having a directional property are formed in such a manner that the width of their portions touching the lattice-shaped electrode patterns 81 is wider. The length of each of the fine electrode patterns 82 extending from points closed to an intersection point of the lattice-shaped electrode patterns 81 is 40 µm, and the other fine electrode patterns 82 are arranged perpendicular or parallel to a direction in which the lattice-shaped electrode patterns 81 extend. The insulating structure 72 is formed selectively above the transparent glass substrate 1 having the fine electrode patterns 71 formed with such electrode patterns 81 and 82. In this case, the band-shaped openings 75 are formed to separate the insulating structure 72 in the shape of a lattice. The line width of the opening 75 is 5 µm.

Figure 35C:
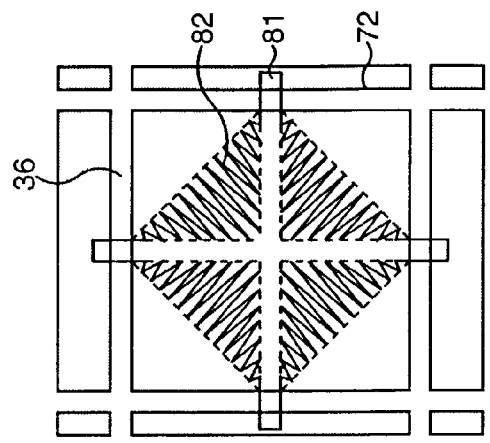
FIG. 35A to FIG. 35C are schematic views showing yet another example of the liquid crystal display of the experiment 15 in the first embodiment.
Figure 35B:
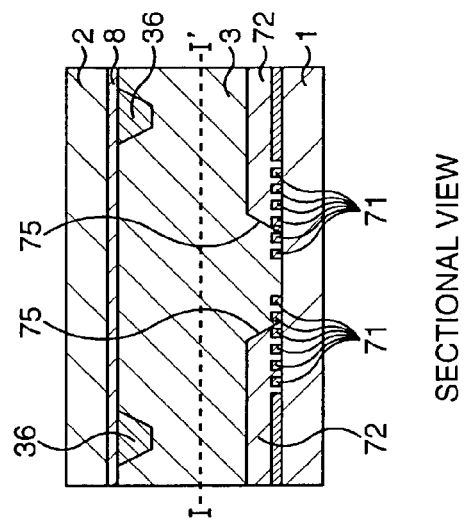
Figure 35A:
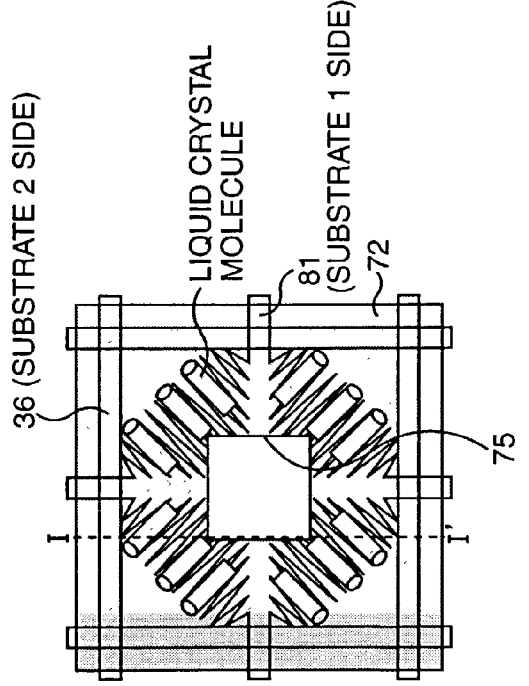

Incidentally, the insulating structure 72 is not always need to be formed in the lattice shape. For example, as shown in FIGS. 33A and 33B, and FIGS. 34A and 34B, the square opening 75 (in a center portion in FIGS. 33A and 33B, and in each of four corners in FIGS. 34A and 34B) may be formed. Moreover, as shown in FIGS. 35A, 35B, and 35C, it is suitable to form the square opening 75 in the central portion, and also, instead of forming the fine electrode patterns 82 overall as in the experiments in FIGS. 32A to 34B, form the fine electrode patterns partially, namely, in such a manner that a fine electrode pattern group has almost a diamond shape as shown in FIG. 35C. Incidentally, in FIGS. 33A to 35C, an example in which the bank-shaped projections 36 which are band-shaped structures are formed on the opposite transparent glass substrate 2 side is shown.

Figure 36B:
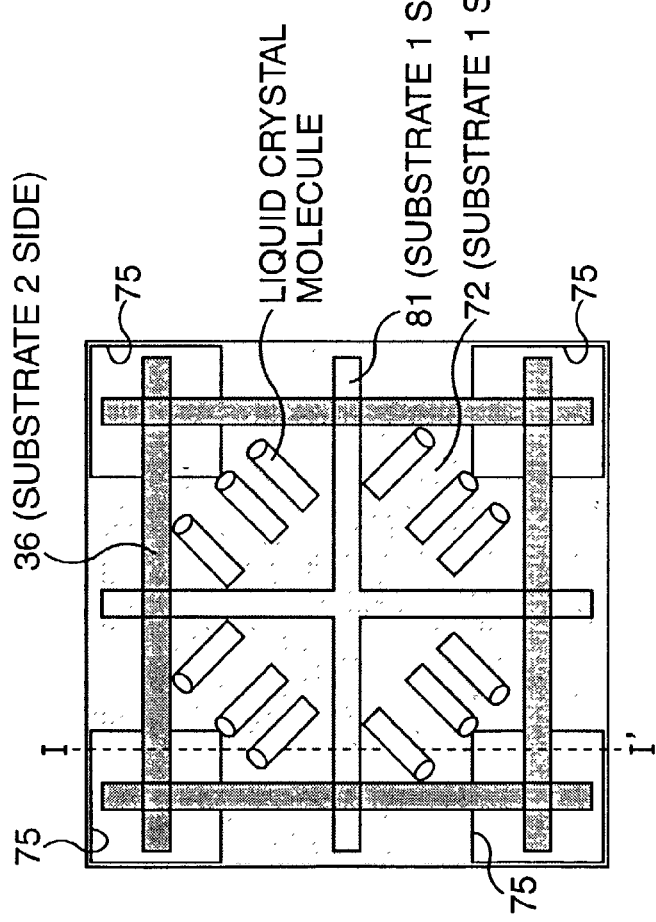
FIG. 36A and FIG. 36B are schematic views showing another example of the liquid crystal display of the experiment 15 in the first embodiment.
Figure 36A:
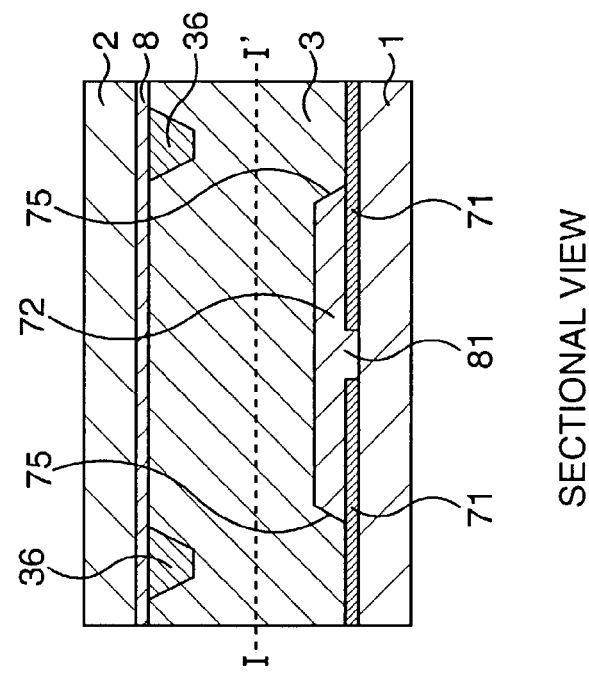

As shown in FIGS. 36A and 36B, it is suitable that in place of the fine electrode patterns 71, only the lattice-shaped electrode patterns 81 are formed in the ITO pixel electrode, the square opening 75 is formed in each of the four corners of the insulating structure 72, and that the bank-shaped projections 36 being band-shaped structures are formed on the transparent glass substrate 2 side. Moreover, as shown in FIGS. 37A and 37B, it is suitable that in place of the fine electrode patterns 71, only the lattice-shaped electrode patterns 81 are formed in the ITO pixel electrode, the insulating structure 72 is pattern-formed in a square shape, and that the band-shaped projections 36 are formed to surround the insulating structure 72. Furthermore, as shown in FIGS. 38A and 38B, it is also suitable that in place of the fine electrode patterns 71, only the lattice-shaped electrode patterns 81 are formed in the ITO pixel electrode, and that the band-shaped openings 75 are formed to separate the insulating structure 72 in the lattice shape.

[Experiment 16]

Figure 39B:
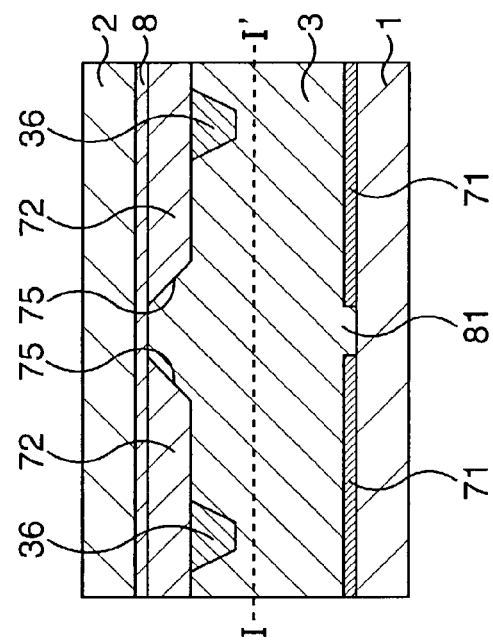
FIG. 39A and FIG. 39B are schematic views showing the main construction of a liquid crystal display of an experiment 16 in the first embodiment.
Figure 39A:
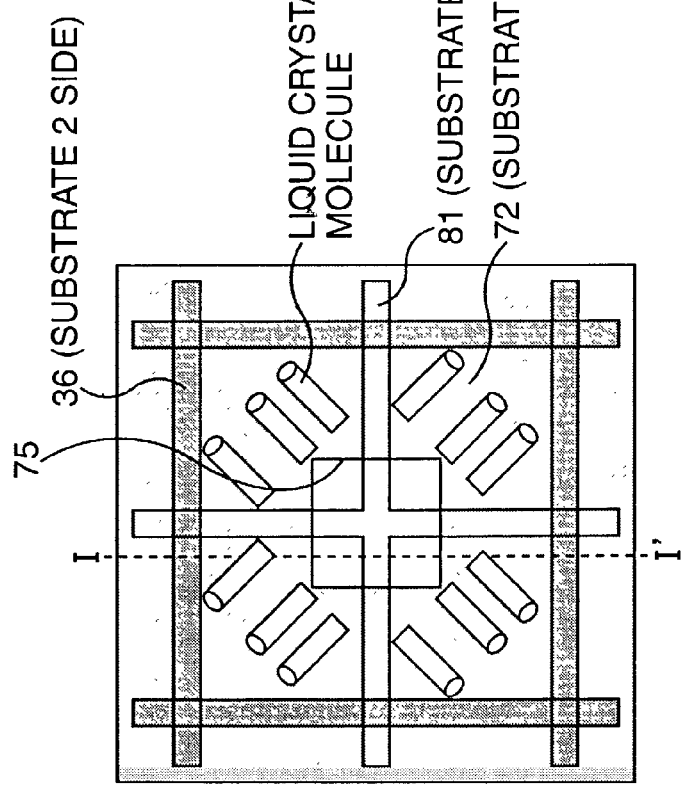

FIGS. 39A and 39B are schematic views showing the main construction of a liquid crystal display of the experiment 16, FIG. 39A is a plan view, and FIG. 39B is a sectional view taken along the line I–I'.

This experiment is a modified example of the experiment 15, and different from the experiment 15 in that the insulating structure 72 is formed on the transparent glass substrate 2 side.

Specifically, the ITO pixel electrode is formed above the transparent glass substrate 1, and the lattice-shaped slits 81 are formed therein to constitute the fine electrode patterns 71. The insulating structure 72 is provided above the opposite transparent glass substrate 2, and the square opening 75 is formed in the central portion thereof. The bank-shaped projections 36 which are structures with a band-shaped lattice pattern are formed on the insulating structure 72. Incidentally, likewise with the experiment 13, it is suitable to form the fine slits 82 in addition to the lattice-shaped electrode patterns 81 in the ITO pixel electrode to constitute the fine electrode patterns 71.

Figure 40B:
FIG. 40A and FIG. 40B are schematic views showing another example of the liquid crystal display of the experiment 16 in the first embodiment.
Figure 40A:
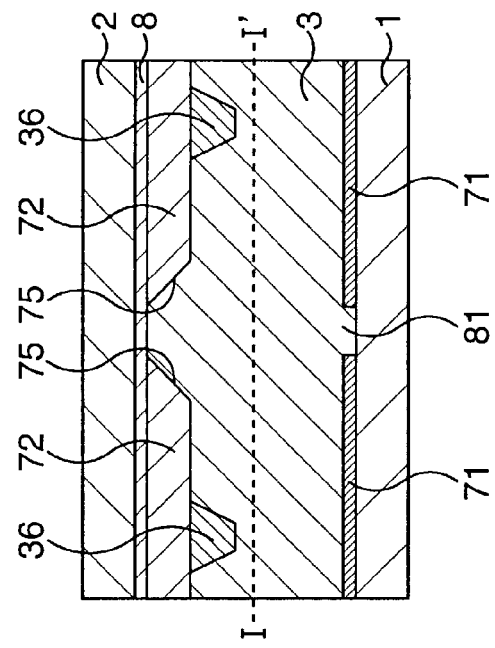

It should be noted that the formation of the insulating structure 72 and the bank-shaped projections 36 is not limited to the aforementioned formation. For example, it is also possible to form the opening 75 in a diamond shape as shown in FIGS. 40A and 40B, to form the band-shaped openings 75 so that the insulating structure 72 is separated in a lattice shape as shown in FIGS. 41A and 41B, or to pattern-form the insulating structure 72 in a square shape so as to face the central portion of the lattice-shaped slits 81 and form the bank-shaped projections 36 in a band shape to surround the insulating structure 72.

[Experiment 17]

FIGS. 43A and 43B are schematic views showing the main construction of a liquid crystal display of the experiment 17, FIG. 43A is a plan view, and FIG. 43B is a sectional view taken along the line I-I'.

This experiment is a modified example of the experiments 15 and 16, and insulating structures are formed on the transparent glass substrate 2 side as well as the transparent glass substrate 1 side.

Figure 44B:
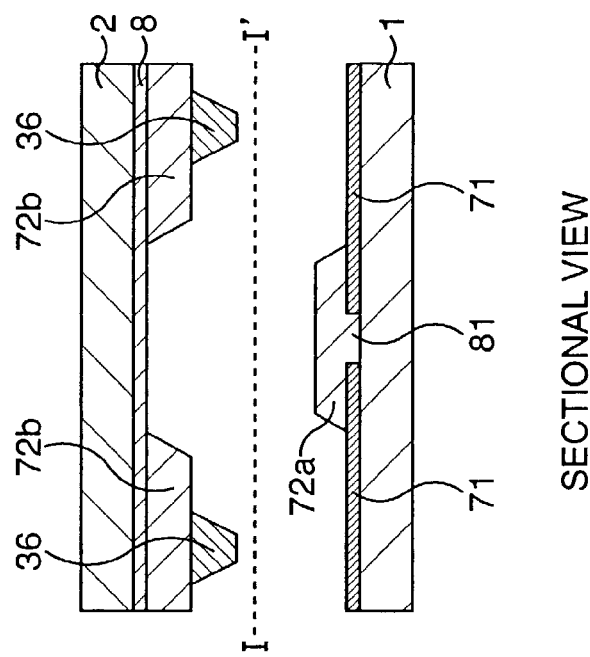
FIG. 44A and FIG. 44B are schematic views showing another example of the liquid crystal display of the experiment 17 in the first embodiment.
Figure 44A:
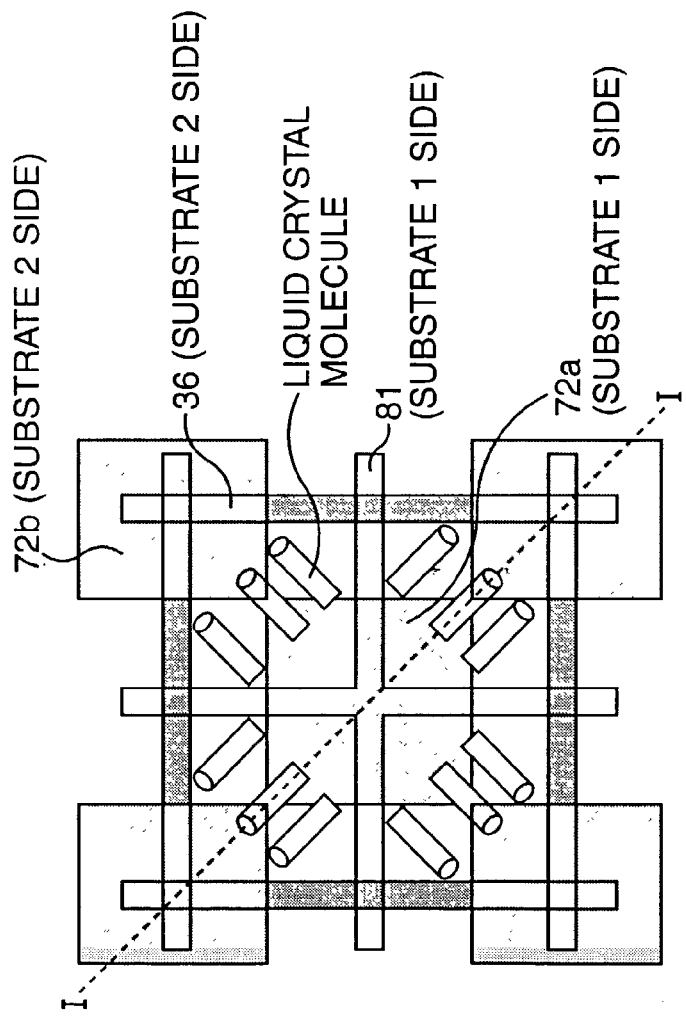

Specifically, on the transparent glass substrate 1 side, the lattice-shaped slits 81 are formed in the ITO pixel electrode to constitute the fine electrode patterns 71, and an insulating structure 72a is provided thereon by being patterned in a square shape. On the other hand, on the transparent glass substrate 2 side, a square insulating structure 72b is pattern-formed in each of four corners thereof, and the band-shaped bank-shaped projections 36 are formed to surround the opposite insulating structure 72a. In this case, when viewed from above, the insulating structures 72a and 72b are formed to partially overlap each other, but it is not always necessary to form those insulating structures in such a manner, and as shown in FIGS. 44A and 44B, the insulating structures 72a and 72b may be formed not to overlap each other.

It should be noted that the formation of the insulating structures 72a and 72b is not limited to the aforementioned formation. For example, it is also possible to form the insulating structure 72a in a diamond shape and form the insulating structure 72b in a triangular shape in each of four corners of the transparent glass substrate 2 so as to correspond with the insulating structure 72a as shown in FIGS. 45A and 45B.

Moreover, as shown in FIGS. 46A and 46B, it is also suitable that on the transparent glass substrate 1 side, the lattice-shaped slits 81 are formed in the ITO pixel electrode to constitute the fine electrode patterns 71, and contrary to the case shown in FIGS. 43A and 43B, the square insulating structure 72a is pattern-formed in each of four corners thereof, on the other hand, the insulating structure 72b is provided by being patterned in a square shape on the transparent glass substrate 2 side, and that the band-shaped bank-shaped projections 36 are formed to surround the insulating structure 72b. In this case, when viewed from above, the insulating structures 72a and 72b are formed to partially overlap each other, but it is not always necessary to form those insulating structures in such a manner, and it is also suitable to form the insulating structures 72a and 72b so as not to overlap each other.

As explained above, according to the liquid crystal display of this embodiment, it becomes possible to improve a delay in response speed at low gray levels and increase the speed of halftone response, whereby very reliable image display having almost the same moving image performance as that of a CRT can be realized.

(Second Embodiment)

Next, the second embodiment of the present invention will be explained.

In this embodiment, similarly to the first embodiment, an MVA mode liquid crystal display, which includes regions (low threshold voltage and high threshold voltage regions) with different threshold voltages in a display pixel and in which the threshold voltages are adjusted so that high-speed response is performed in the low threshold voltage region, is exemplified. In addition to the aforementioned construction, the liquid crystal display of this embodiment is formed in such a manner that at least either of the width or the height of the bank-shaped projection differs according to its position.

Main Construction of This Embodiment

Bank-shaped projections with characteristic shapes in this embodiment will be explained below.

Figure 47:
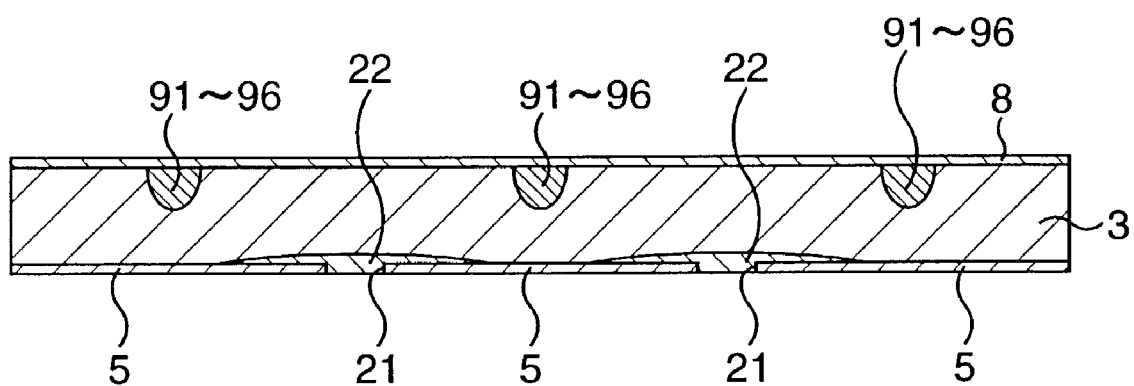
FIG. 47 is a sectional view showing the schematic construction of a liquid crystal display in a second embodiment.

The schematic construction of the liquid crystal display of this embodiment is the same as that of the first embodiment shown in FIG. 1 as shown in FIG. 47. Moreover, similarly to the experiment 1 shown in FIG. 4 in the first embodiment, the transparent glass substrate 1 is provided with the ITO pixel electrode 5 formed with the fine electrode patterns 21, and the band-shaped dielectric layer 22 is pattern-formed to cover the fine electrode patterns 21. Above the transparent glass substrate 2, in portions on the ITO common electrode 8 corresponding to non-dielectric regions of the transparent glass substrate 1, band-shaped bank-shaped projections 91 to 96 made of a dielectric material are formed.

It is widely known that by forming bank-shaped projections on the surface of a substrate in a vertically aligned mode liquid crystal display, the control of alignment of liquid crystals accompanying the application of a voltage can be effectively performed. This is because the bank-shaped projections function as insulators, and hence an electric field in a normal direction in a liquid crystal layer is distorted, whereby liquid crystal molecules are aligned uniformly.

FIGS. 48A to 48D are schematic construction views showing a first example of the bank-shaped projection in this embodiment.

Figure 48A:
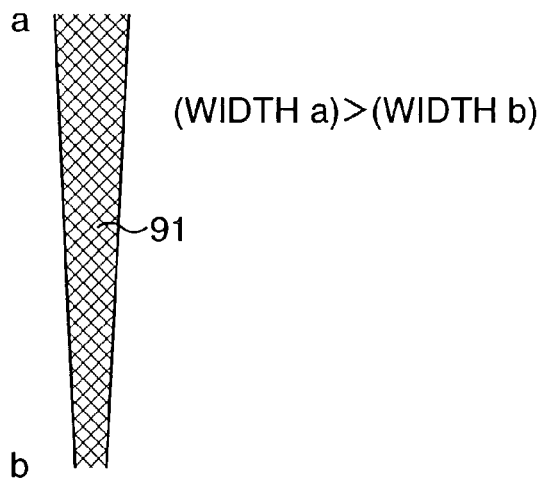
FIG. 48A to FIG. 48D are schematic construction views showing a first example of a bank-shaped projection in the second embodiment.
Figure 48B:
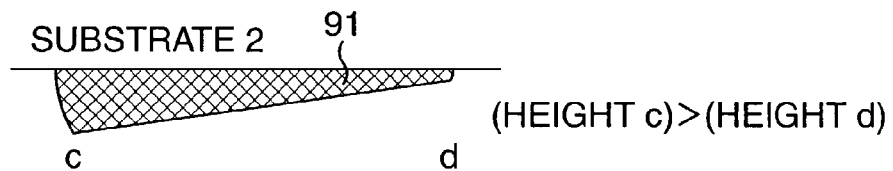

As shown in FIGS. 48A and 48B, the bank-shaped projection 91 of this example is formed in such a manner that its width and height gradually change.

Figure 48C:
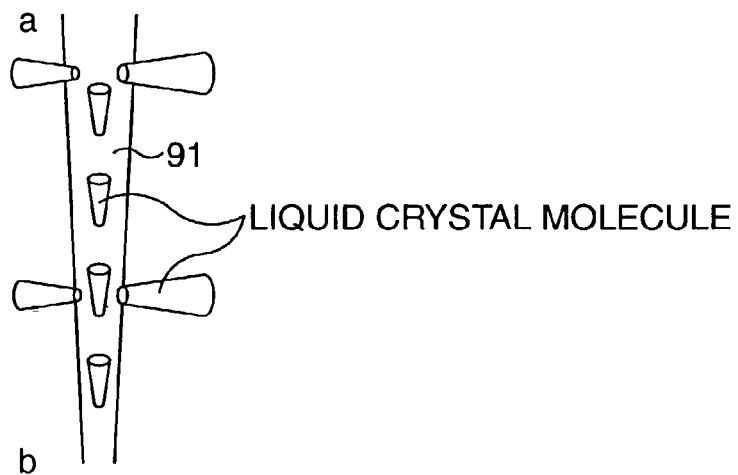
Figure 48D:
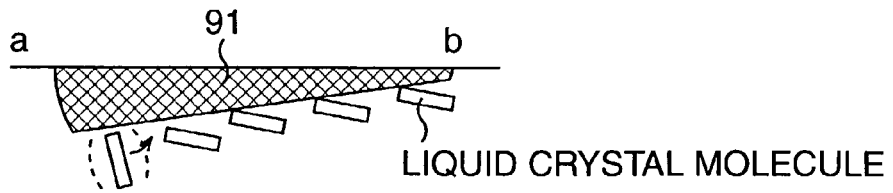

Thanks to such a formation that the bank width changes from a large size (width a) to a small size (width b) and the bank height changes from a large size (height c) to a small size (height d), the direction in which liquid crystal molecules fall can be easily controlled. Since the liquid crystal molecules align along the shape of the bank-shaped projection 91 as shown in FIGS. 48C and 48D, the liquid crystal molecules on the center line of the bank-shaped projection 91 tilt downward in the drawing, and hence the alignment control at the center portion becomes possible. A delay in the stabilization of alignment is eliminated, whereby the response speed is increased as a whole.

The bank-shaped projection 91 is usually made by patterning a photosensitive material. It is known that when the width of the bank is wide, the height thereof is high, and when the bank width is narrow, the height is low, and in this case, it is found that a portion of the bank-shaped projection 91 is formed to tilt continuously. This means that on the occasion of driving at a threshold voltage or lower, the liquid crystal molecules has a slight tilt angle along the inclination of the bank-shaped projection 91 even though they align vertically. In a vertically aligned mode liquid crystal display with a tilt angle, the alignment direction at the time of the application of voltage is prescribed and high-speed response characteristic is shown, and hence also in an MVA mode liquid crystal display, alignment control on the bank-shaped projection 91 becomes possible, whereby the response characteristic can be increased more.

Figure 49:
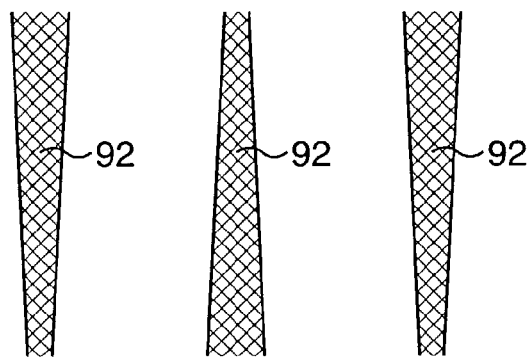
FIG. 49 is a schematic construction view showing a second example of the bank-shaped projection in the second embodiment.

FIG. 49 is a schematic construction view showing a second example of the bank-shaped projection in this embodiment.

Bank-shaped projections 92 of this example are formed in such a manner that a change pattern of the width and height of each projection is opposite between the adjacent bank-shaped projections 92.

In this case, the bank-shaped projections 92 adjacent to one another in top view in the drawing are disposed cyclically while the large and small bank widths are alternated, whereby it becomes possible to obtain a stable alignment property without any distortion being caused in the direction of alignment of the liquid crystal molecules, and also to prevent the occurrence of a domain with poor transmittance.

Figure 50:
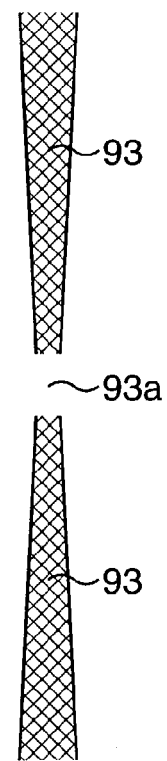
FIG. 50 is a schematic construction view showing a third example of the bank-shaped projection in the second embodiment.

FIG. 50 is a schematic construction view showing a third example of the bank-shaped projection in this embodiment.

A bank-shaped projection 93 of this example is divided at one portion thereof to form a gap portion 93a therein. In this case, it is confirmed that the alignment of liquid crystal molecules can be easily controlled specially by the gap portion 93a.

Figure 51:
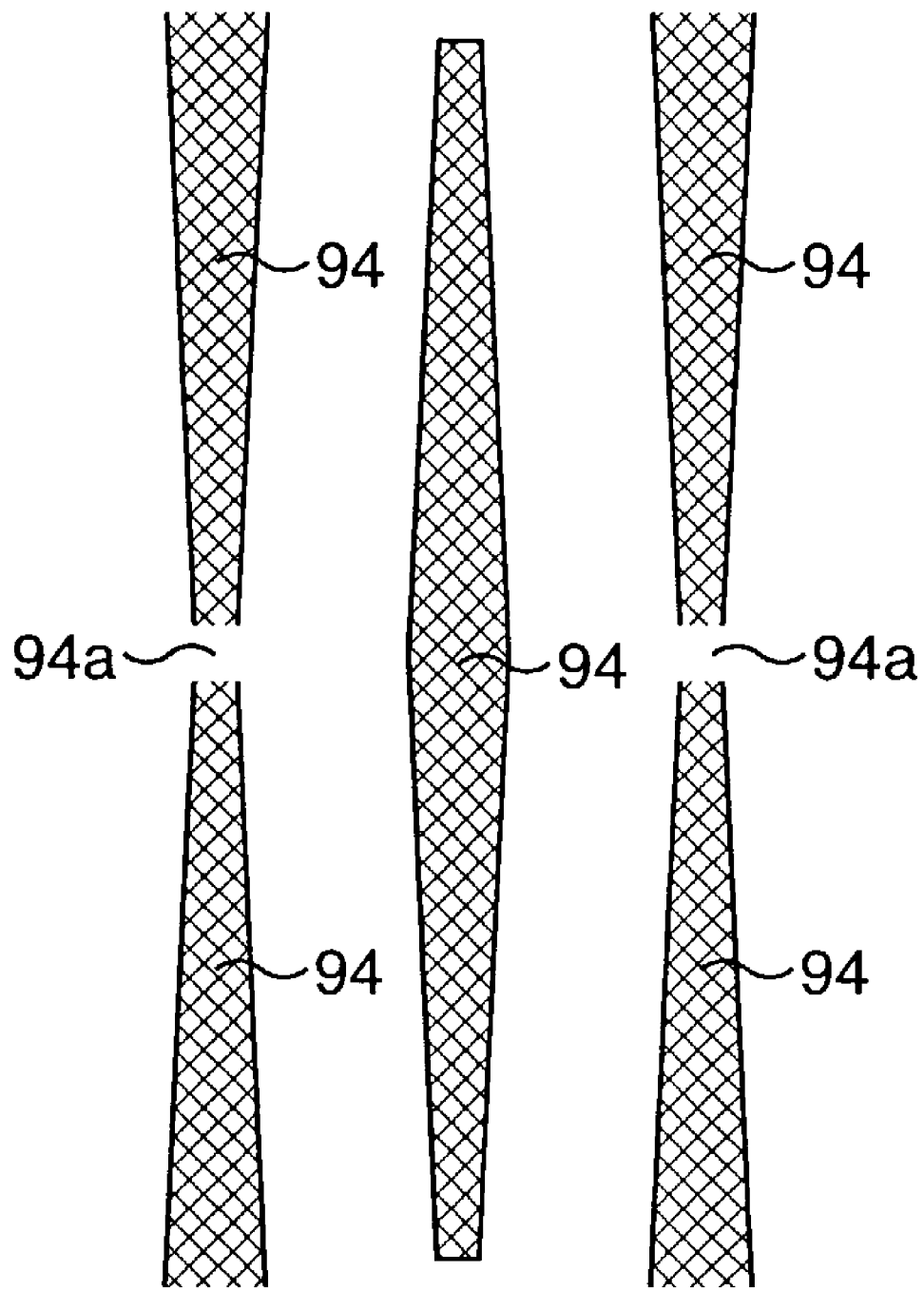
FIG. 51 is a schematic construction view when the second and third examples of the bank-shaped projection in the second embodiment are combined.

As the result of a combination of a conception of the construction of this bank-shaped projection 93 and a conception of the construction of the bank-shaped projection 92, a conception of a bank-shaped projection 94 having a gap portion 94a shown in FIG. 51 is reached.

Figure 52A:
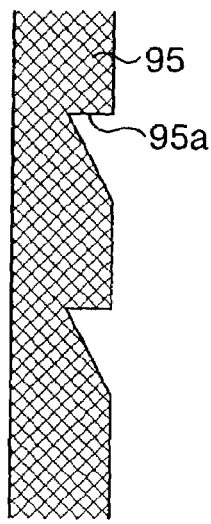
FIG. 52A to FIG. 52C are schematic construction views showing a fourth example of the bank-shaped projection in the second embodiment.
Figure 52C:
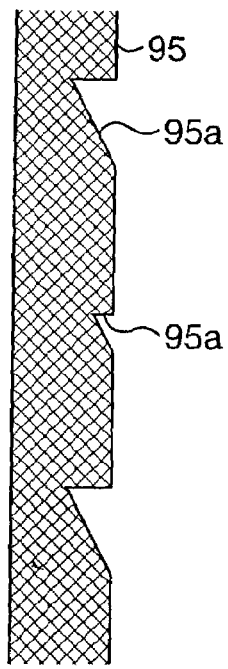
Figure 52B:
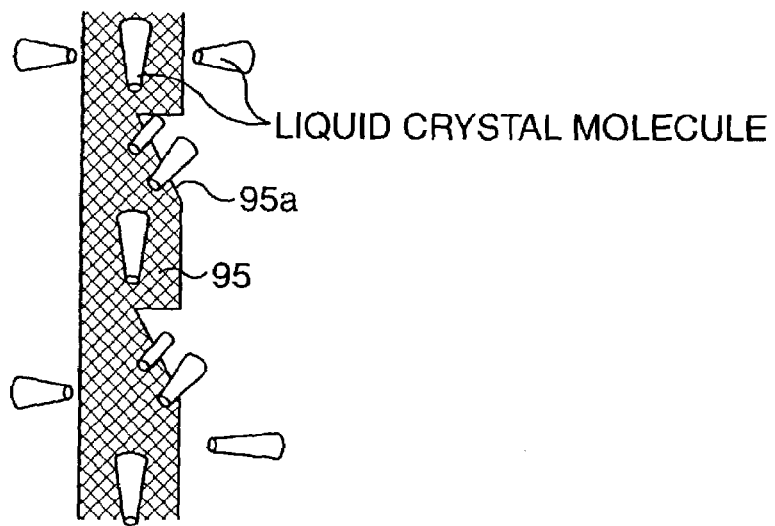

FIGS. 52A to 52C are schematic construction views showing a fourth example of the bank-shaped projection in this embodiment.

A bank-shaped projection 95 of this example is formed in such a manner that at least either its width or its height changes cyclically, and more specifically, notches 95a are formed in one side in a longitudinal direction thereof (FIG. 52A).

By forming the notches 95a as stated above, the liquid crystal molecules tends to align according to the notches 95a in the application of voltage. By making a line in a slanting direction longer than a side perpendicular to the bank-shaped projection 95 in the notch 95a, the alignment direction of the liquid crystal molecules can be controlled (FIG. 52B). This means in a sense that the stabilization of alignment is made possible in a short time by controlling the alignment direction on the bank-shaped projection 95 based on the alignment direction of each of the notches 95a.

It is preferable to form the notch 95a in the shape of a right triangle since there is a limit to the accuracy of its patterning. Moreover, it is not required that all the sizes of the notches 95a are the same, and it is possible to provide the balance among the sizes optionally. For example, a slightly larger notch 95a is formed in a portion where a large change in orientation is desired, or in a portion susceptible to an electric field different from an original electric field.

Similarly to the size of the notch 95a, the intervals between the adjacent notches 95a can be prescribed optionally. Namely, when the aforementioned effect of the notches 95a is required more noticeably, it is recommended to reduce the intervals to dispose the notches 95a more densely. It is also possible to mingle regions in which the notches 95a are disposed densely and sparsely. Further, it is preferable to change the size of the notch 95a alternately (FIG. 52C).

Figure 53A:
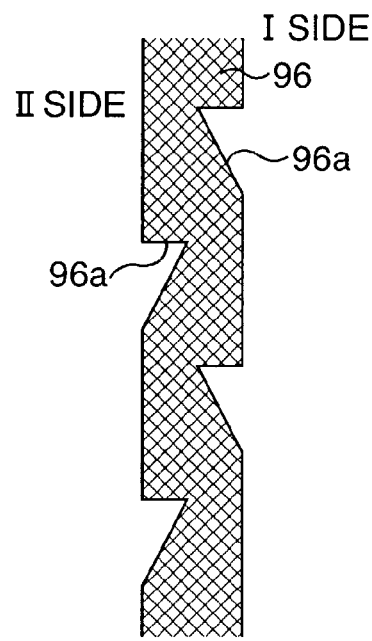
FIG. 53A and FIG. 53B are schematic construction views showing a fifth example of the bank-shaped projection in the second embodiment.
Figure 53B:
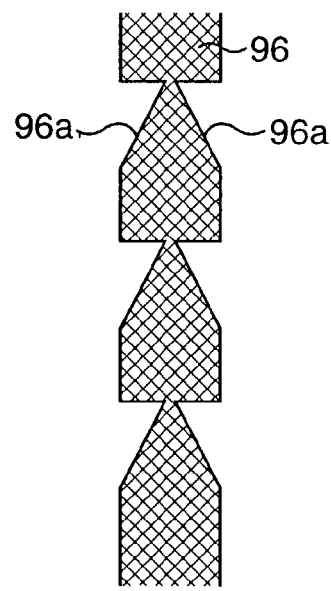

FIGS. 53A and 53B are schematic construction views showing a fifth example of the bank-shaped projection in this embodiment.

In a bank-shaped projection 96 of this example, as shown in FIG. 53A, notches 96a are formed alternately on the side of one side I of the bank-shaped projection 96 and on the side of the other side II thereof. This construction has the advantage of being able to form the notches larger as well as to form the notches densely.

In this case, as shown in FIG. 53B, it is also suitable to form the notches 96a on the right and left sides I and II symmetrically.

Concrete Experiments

Based on the aforementioned basic construction, concrete experiments of this embodiment will be explained below.

[Experiment 1]

The bank-shaped projections 91 shown in FIGS. 48A to 48D are formed above the transparent glass substrate 2.

Namely, after the formation of the ITO common electrode 8, a resist (manufacture by Shipley Company) is spin-coated at 1500 rpm for 20 seconds, then exposed via a photomask, and developed so that the bank width a is about 10 μm, the bank width b is about 4 μm, and the bank length in the longitudinal direction is about 45 μm. After the development, the resist is baked at 120° C. for 40 minutes, and in addition, at 200° C. for 40 minutes, and thereafter subjected to ashing processing.

When the height of each of the bank-shaped projections 91 is thereafter measured, it is confirmed that the height on the bank width a side is about 1.7 μm, the height on the bank width b side is about 1.0 μm, and that the bank-shaped projection 91 is formed with an inclination of about 0.9°. A VA cell subjected to rubbing processing usually has a pretilt angle of about 89°, and hence the fact that the inclination of this bank is about 1° in this case is an appropriate result in a sense of providing a gently inclined portion.

Above the transparent glass substrate 1, as shown in FIG. 47, the fine electrode patterns 21 are pattern-formed in the ITO pixel electrode 5, and then the resist is applied thin and patterned to form the dielectric layer 22 to cover the fine electrode patterns 21. Above these substrates 1 and 2, the liquid crystal alignment films 6a and 6b are formed using the vertical alignment film manufactured by JSR, and liquid crystals (manufactured by Merck & CO., Inc.) are injected therebetween to make a liquid crystal cell (cell thickness: about 4.0 µm). It is confirmed that when a voltage is applied to this liquid crystal cell, liquid crystal molecules are aligned, and especially on the bank-shaped projection 91, favorable liquid crystal alignment can be obtained along its inclined plane.

[Experiment 2]

Respective components are formed above the transparent glass substrates 1 and 2 in almost the same manner as in the experiment 1.

In this experiment (liquid crystal cell A), however, the bank-shaped projections 92 shown in FIG. 49, in which a change pattern of the width and height of each of the projections is opposite between the adjacent bank-shaped projections 92, are formed above the transparent glass substrate 2, and the transmittance thereof is compared with a conventional case (liquid crystal cell B) in which bank-shaped projections with the fixed bank width and height are formed.

As a result of this, a distortion occurs between the adjacent bank-shaped projections in the conventional liquid crystal cell B, whereas the liquid crystal cell A of this experiment shows a uniform alignment property. When 5.4 V is applied, the liquid crystal cell B has a transmittance of 19.4%, whereas the liquid crystal cell A can obtain a transmittance as high as 21.1%, whereby it is confirmed that the construction of this experiment is suitable to the MVA mode liquid crystal display.

[Experiment 3]

Respective components are formed above the transparent glass substrates 1 and 2 in almost the same manner as in the experiment 1.

In this experiment (liquid crystal cell C), however, the bank-shaped projections 95 shown in FIGS. 52A to 52C each having the notches 95a in one side in its longitudinal direction are formed above the transparent glass substrate 2, and the transmittance thereof is compared with a conventional case (liquid crystal cell D) in which bank-shaped projections with the fixed bank width and height are formed. In the liquid crystal cell C, the bank width of the bank-shaped projection 95 is about 10 µm, and the right triangle-shaped notches 95a each having a side perpendicular to the longitudinal direction of the bank-shaped projection 95 with a length of about 5 µm and an oblique side with a length of about 12 µm are formed. In the liquid crystal cell D, bank-shaped projections with a bank width of about 10 µm are formed.

As a result of this, domains on the bank-shaped projections 95 are made uniform and alignment is stabilized instantaneously in the liquid crystal cell C of this experiment, whereas it takes a long time to stabilize alignment in its central portion in the conventional liquid crystal cell D. Moreover, in the liquid crystal cell D, 45 ms are needed at an applied voltage of 3 V, whereas in the liquid crystal cell C, a fast response characteristic with a speed of 35 ms is shown, whereby the effect of an increase in the speed of the response characteristic in this experiment can be confirmed.

As explained above, according to the liquid crystal display of this embodiment, it is possible to increase the speed of halftone response by improving a delay in response speed at low gray levels, thereby realizing moving image performance nearly equal to that of a CRT, and besides the time required for the stabilization of the alignment of liquid crystal molecules can be drastically reduced by prescribing the shape of a bank as shown by the bank-shaped projections 91 to 96. Consequently, in displaying moving images, the display with a little sense of incongruity can be obtained, whereby image display with extremely high reliability can be realized.

(Third Embodiment)

Next, the third embodiment of the present invention will be explained.

In this embodiment, similarly to the first embodiment, an MVA mode liquid crystal display, which includes regions (low threshold voltage and high threshold voltage regions) with different threshold voltages in a display pixel and in which the threshold voltages are adjusted so that high-speed response is performed in the low threshold voltage region, is exemplified. In the liquid crystal display of this embodiment, an insulating member is partially provided on one substrate so that the display pixel is divided into two or more regions with different distances between the aforementioned opposed electrodes.

Basic Construction of This Embodiment

The basic construction of this embodiment will be explained below.

Figure 54:
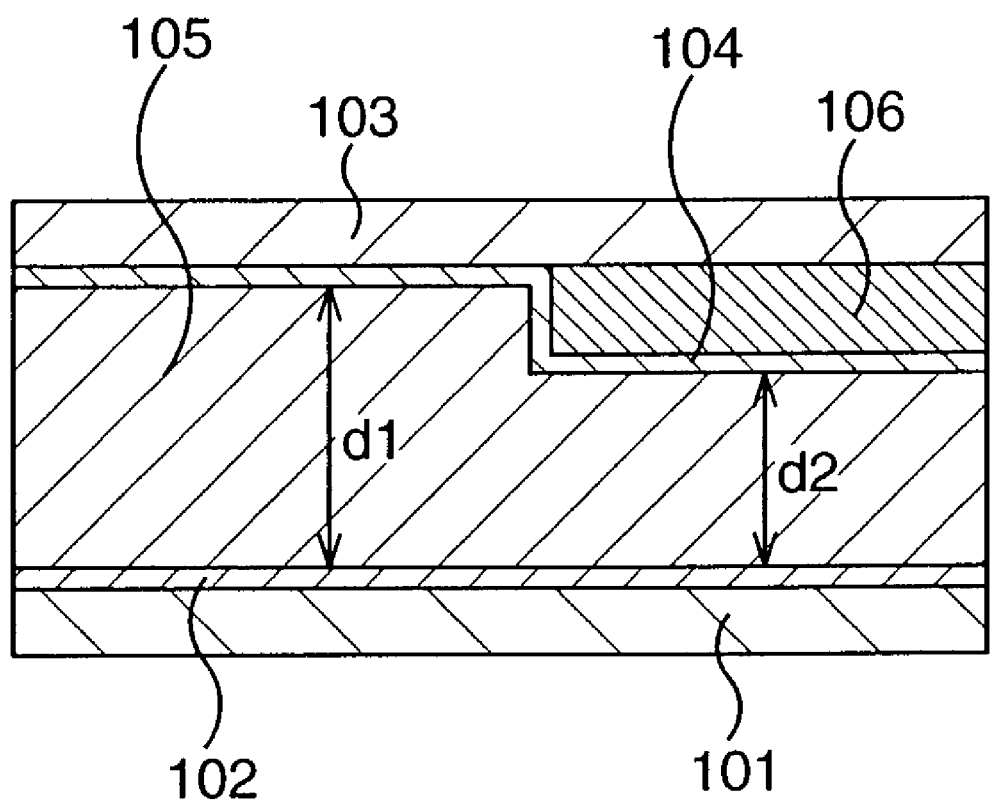
FIG. 54 is a schematic sectional view showing the schematic construction of a liquid crystal display in a third embodiment.

In the schematic construction of the liquid crystal display of this embodiment, as shown in FIG. 54, a TFT substrate 101 on which a pixel electrode 102 is formed and a color filter (CF) substrate 103 on which an ITO transparent electrode 104 is formed are disposed facing each other with a liquid crystal layer 105 and the like therebetween, and a transparent insulating member 106 is provided in a predetermined portion between the TFT substrate 101 and the ITO electrode 104. By this insulating member 106, the distances (d1 and d2) between the substrates 101 and 103 are partially adjusted.

Generally, it is ideally desirable that the response speed is constant irrespective of display gray levels. However, in the case of the conventional MVA or TN mode liquid crystal display, there is seven times to nine times of difference in the response speed among gray levels at the maximum, and hence an after-image is perceived at part of gray levels when moving pictures are displayed (See FIG. 2). As what improves the response speed in a low gray level region with respect to the whole panel, partial response by providing a dielectric layer on the TFT substrate side is proposed, but in this embodiment, as further improved proposal, by changing the cell thickness of a portion of the display pixel, a portion, in which the cell thickness is thin and the response speed of liquid crystals is fast, is effectively utilized at low gray levels.

Moreover, in the case of MVA, such a construction that an area which lights up changes according to a display gray level is provided. For example, a large area lights up in bright display (at high gray levels), only a small area lights up in dark display (at low gray levels). Further, in order to make the response speed constant at each gray level, when display is performed at some gray level, by allowing a portion which operates on the lower gray level side to response at a high speed, such partial response that almost constant response speed can be obtained irrespective of gray levels is provided in the whole panel.

Such a construction shown in FIG. 54 is thought out as a means for realizing the above, and by forming the transparent insulating member 106 in a portion of the display pixel, a region in which a portion of the thickness of a cell is small is provided. In the portion with a small cell thickness, the response speed of liquid crystals is high. Therefore, when liquid crystals whose Δn are regulated are used in this portion, only the portion with the small cell thickness (a portion shown by the distance d2 in FIG. 54) becomes bright at a low voltage since the transmittance is lowered in a portion with a large cell thickness (a portion shown by the distance d1 in FIG. 54).

Accordingly, at low gray levels, only a portion with the small cell thickness which responses at a high speed can be seen (partial response), and hence, in the display of the whole panel, an increase in speed in the low gray level region can be realized.

The area of the portion with the small cell thickness need not be the same as that of the thick portion although the insulating member 106 and the like need to be patterned, and therefore, to obtain a desired T-V characteristic (gray level display characteristic), a balance therebetween can be provided optionally.

Moreover, the cell thickness of the portion with the small cell thickness can be changed by changing the thickness of the insulating member, whereby a T-V characteristic in this portion can be changed by the thickness of the insulating member 106.

Concrete Experiments

The concrete experiments of this embodiment will be explained below based on the aforementioned basic construction.

[Experiment 1]

Figure 55B:
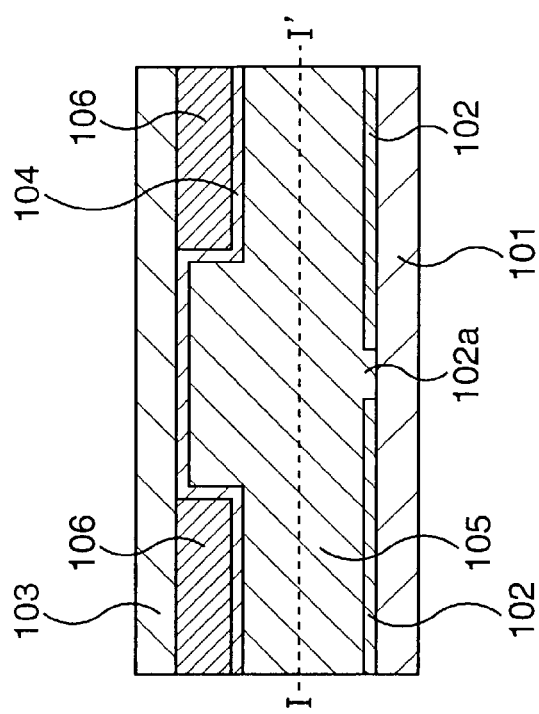
FIG. 55A and FIG. 55B are schematic construction views showing a liquid crystal display of an experiment 1 in the third embodiment.
Figure 55A:
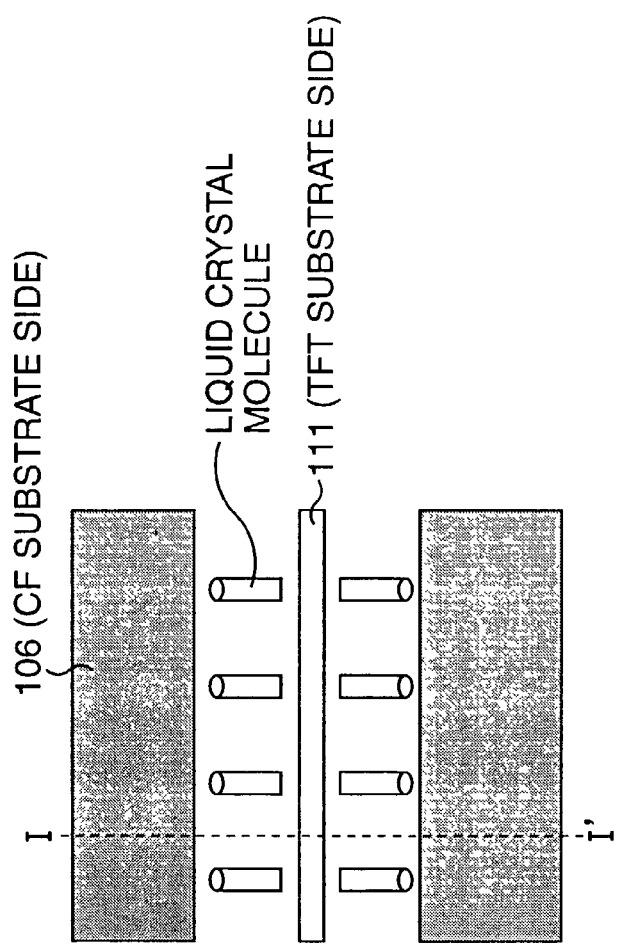

As shown in FIGS. 55A and 55B (FIG. 55A is a plan view, and FIG. 55B is a sectional view taken along the line I–I'), a photosensitive transparent resin for the insulating member such as acrylic, polyimide, or epoxy with a thickness of about 0.7 μm is applied on a colored resin of the CF substrate 103, exposed via photomask, and developed, whereby the insulating member 106 is removed in such a manner that the insulating member 106 is left in only a portion of the display pixel and the other portions have an ordinary cell thickness. Thereafter, the ITO transparent electrode 104 is formed, and thus the CF substrate 103 is completed.

As the TFT substrate 101, in the same way as before, a substrate formed with a slit 102a in each of the pixel electrodes 102 is used. The slit 102a in this case may be shaped as shown in FIG. 55A, or may have the shape of teeth of a comb.

Alignment films are formed above these TFT substrate 101 and CF substrate 103. After these two substrate are bonded and cut, liquid crystals whose Δn is regulated for a small gap are injected, and thus an MVA liquid crystal panel with a cell thickness of 4.2 μm in the ordinary portion and a cell thickness of 3.5 μm in the small gap portion is fabricated. With the application of voltage, the potion with the small gap starts to light up, and a panel with a favorable response characteristic especially even in a low gray level region can be obtained.

[Experiment 2]

Figure 56B:
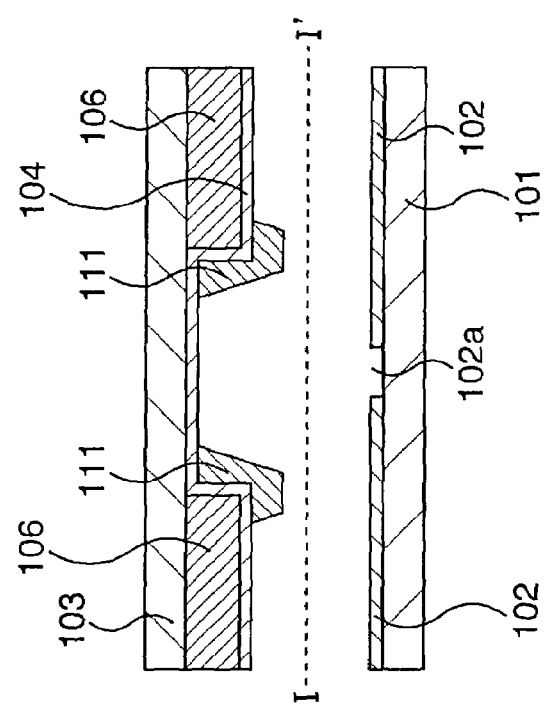
FIG. 56A and FIG. 56B are schematic construction views showing a liquid crystal display of an experiment 2 in the third embodiment.
Figure 56A:
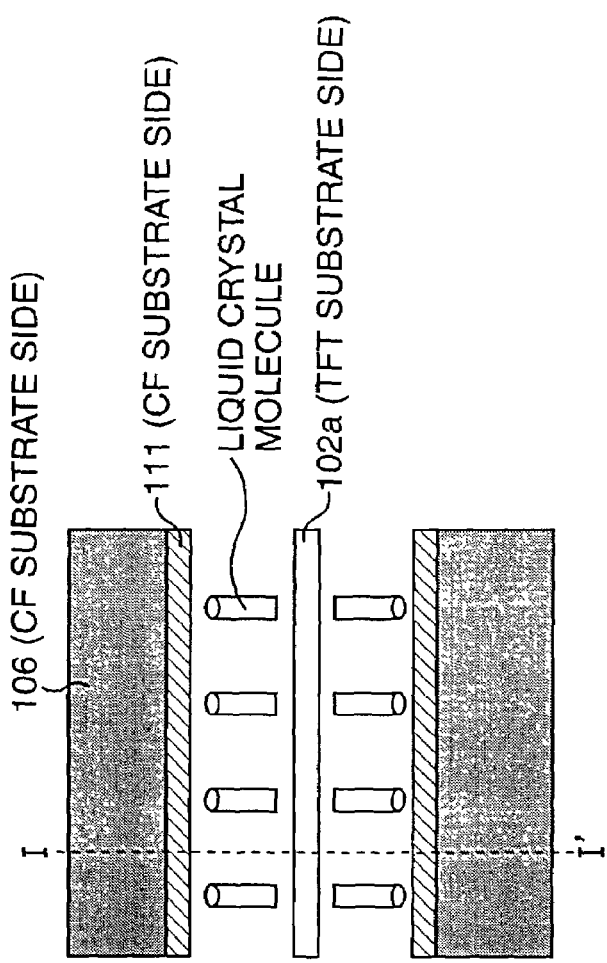

Similarly to the experiment 1, the TFT substrate 101 and the CF substrate 103 are fabricated. However, as shown in FIGS. 56A and 56B (FIG. 56A is a plan view and FIG. 56B is a sectional view taken along the line I–I'), on the CF substrate 103 side, a bank-shaped projection 111 with a line width of 10 μm and a thickness of 1.2 μm is formed with the resist at an end portion of the insulating member 106 which is a boundary portion of a gap where the cell thickness changes.

When a panel is made using these substrates as in the experiment 1, a reduction in transmittance due to disorder of alignment occurring in a portion with a difference in level where the cell thickness changes can be prevented, and consequently the panel which has a favorable response characteristic and high transmittance even in the low gray level region can be obtained.

[Experiment 3]

Figure 57B:
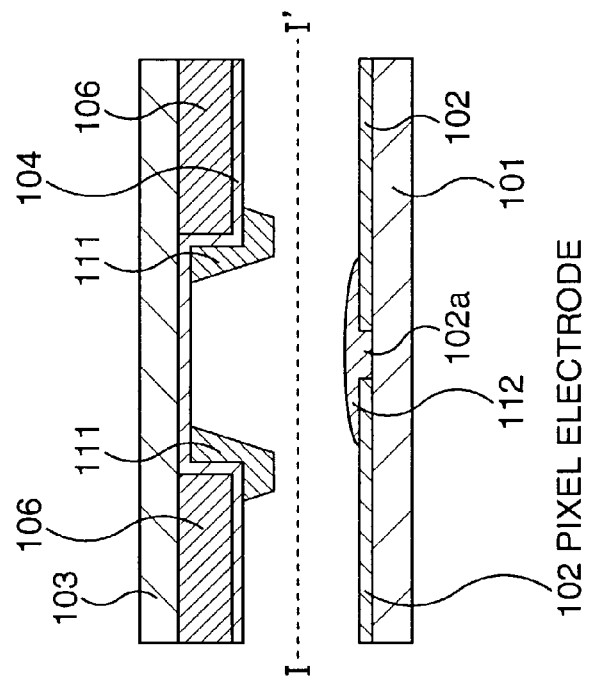
FIG. 57A and FIG. 57B are schematic construction views showing a liquid crystal display of an experiment 3 in the third embodiment.
Figure 57A:
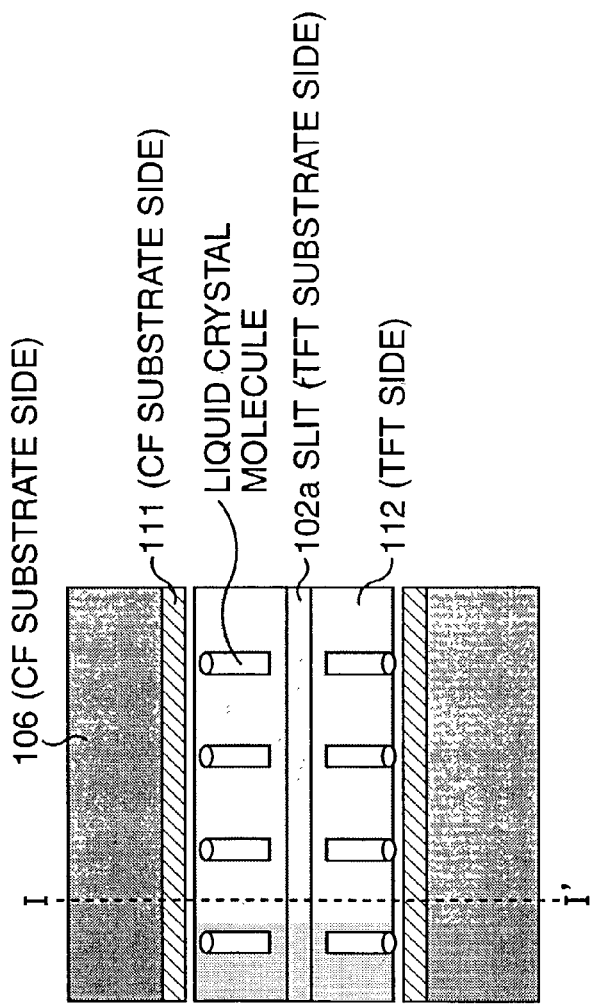

Similarly to the experiment 2, the TFT substrate 101 and the CF substrate 103 are fabricated. However, as shown in FIGS. 57A and 57B (FIG. 57A is a plan view and FIG. 57B is a sectional view taken along the line I–I'), on the TFT substrate 101, the resist as a thin film insulator with a thickness of about 5 μm is applied onto a portion of the slit 102a to cover the slit 102a and patterned to form the dielectric layer 112.

It is already known that when a structure is formed in a region including the slit 102a as described above, especially response in a halftone portion can be improved greatly.

In the case of combination with this method, in the low gray level region, halftone display is realized by the partial response, that is, only liquid crystal molecules in a region with a small cell thickness are allowed to response from black to white, and the other regions where the dielectric layer 112 exists remain black. When the whole panel is seen, the response from black to white showing high-speed response can be used for halftone response, and consequently response speed at low gray levels increases more.

According to the liquid crystal display of this embodiment, by reducing the cell thickness of a portion of the display pixel, it becomes possible to make the response speed of liquid crystals uniform at each gray level, and enhance the response characteristic of a panel at low gray levels without a delay in response speed in the low gray level region which is seen in a conventional MVA panel. Moreover, the occurrence of after-images is prevented in an actual unit, and hence display without a sense of incongruity can be obtained even in moving images, resulting in contribution to an improvement in display quality.

Fourth Embodiment

Next, the fourth embodiment of the present invention will be explained.

In this embodiment, likewise with the first embodiment, an MVA mode liquid crystal display including regions (low threshold voltage and high threshold voltage regions) with different threshold voltages in a display pixel, in which the threshold voltages are adjusted such that high-speed response is performed in the low threshold voltage region, is exemplified, but this embodiment is characterized by the method of manufacturing the liquid crystal display.

Basic Construction of This Embodiment

The basic construction of this embodiment will be explained below.

In the MVA mode liquid crystal display, there arise the following problems in its manufacturing process.

(1) In the MVA mode liquid crystal display, in order to improve response speed at low gray levels, for example, it is necessary to selectively provide a dielectric film on a pixel electrode on the side of a substrate (TFT substrate) provided with a thin film transistor as stated above. Therefore, the number of manufacturing process steps is increased.

(2) One of the main causes of the occurrence of a failure to the transistor in the manufacturing process of the thin film transistors is electrostatic breakdown of an insulating film. In processing utilizing a plasma performed in a deposition process such as PVD or CVD for depositing a conducting film or an insulating film or a dry etching process for working gate electrodes or wires, static electricity builds up in floating gate electrodes and source/ drain electrodes, causing dielectric breakdown to the insulating film and particularly to the gate insulating film. Moreover, the failure also occurs due to static electricity which builds up in electrodes by so-called peeling electrification which occurs when a substrate coated with a resist is removed from a supporting table after being baked in a photolithography process for forming the source/drain electrodes. Further, due to the aforementioned electrostatic buildup, a TFT characteristic sometimes deteriorates, and especially, the threshold voltage changes in some cases. Generally, as a method for preventing electrostatic breakdown, there is a method by which gate bus lines and drain bus lines are bundled and connected on the periphery of the substrate and allowed to have the same potential. To reduce the number of process steps, these wires are connected by using the same wires as the gate bus lines or the drain lines, and Al or Al alloy is used as the gate bus lines and drain bus lines to reduce wire resistance. In this case, in a panel process, there arises a problem that an end face of the connecting wire is exposed to the atmosphere and thereby corrodes after scribing.

Hitherto, as the dielectric film deposited on the pixel electrodes of the thin film transistor substrate, a resist or the like is deposited after the thin film transistors are formed. On the other hand, in this embodiment, the dielectric film is formed by using a gate insulating film and a final protective film in the manufacturing process of the thin film transistors.

Moreover, in this embodiment, in the method of manufacturing the thin film transistors, after gate electrodes and gate bus lines are formed, pixel electrodes which are a transparent conducting film are formed with an insulating film therebetween and simultaneously wires for connecting the gate bus lines and the drain bus lines are formed in a peripheral portion by the transparent conducting film. Further, the insulating film is removed by using the mask, a gate insulating film, a semiconductor film, and a high impurity concentration semiconductor film are deposited continuously, and the gate insulating film, the semiconductor film, and the high impurity concentration semiconductor film are selectively left by patterning. Furthermore, contact holes are formed in the pixel electrodes, gate bus line terminals, and the peripheral connecting wires formed by the transparent conducting film. Subsequently, source/drain electrodes and drain bus lines are formed, and simultaneously the peripheral connecting wires formed by the transparent conducting film and the drain bus lines are connected, and the peripheral connecting wires formed by the transparent conducting film and the gate bus line terminals are connected by wires in the same layer as that of the source/drain electrodes.

The gate insulating film or the final protective film is used as the dielectric film in this embodiment, and hence the response speed of the MVA mode liquid crystal display can be improved efficiently without increasing the number of manufacturing process steps.

Moreover, the end portions of the gate bus lines and the drain bus lines formed on the insulating substrate are connected by the peripheral connecting wires formed by the transparent conducting film and thereby have the same potential until the TFTs are fabricated. To be precise, at a stage where the conducting film constituting the source/drain electrodes and the drain bus lines is deposited, a short circuit automatically occurs between this conducting film and the gate electrodes, which prevents the electrostatic breakdown of the gate insulating film and the deterioration of TFT characteristics. Further, since the connecting wires are the transparent conducting film, for example, ITO, even if the end faces of the wires are exposed to the atmosphere after scribing in the panel process, the end faces no longer corrode.

Concrete Experiment

Based on the aforementioned basic construction, the concrete experiment of this embodiment will be explained below.

Figure 58:
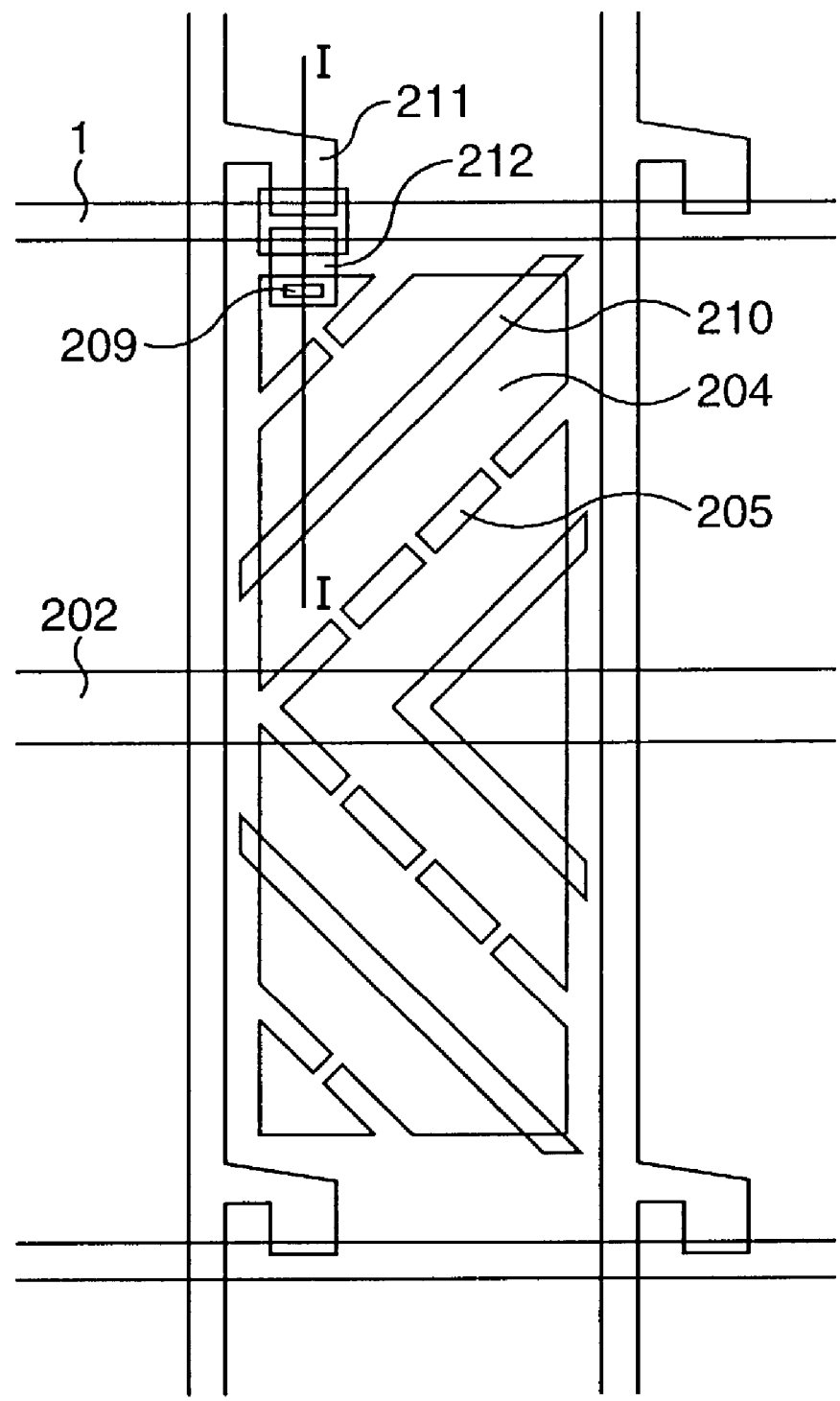
FIG. 58 is a schematic plan view showing a liquid crystal display in a fourth embodiment.
Figure 59:
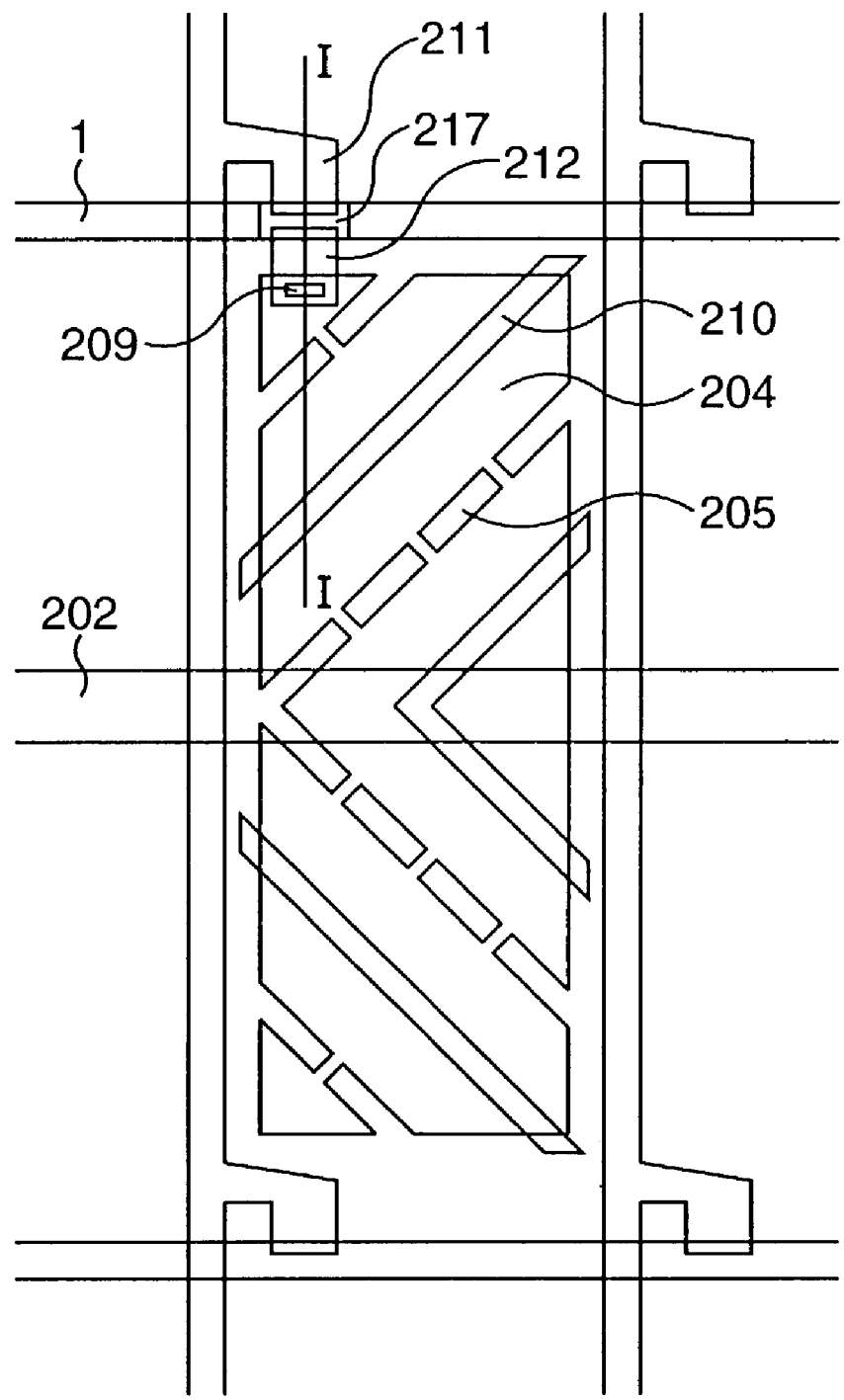
FIG. 59 is a schematic plan view showing the liquid crystal display in the fourth embodiment.
Figure 64:
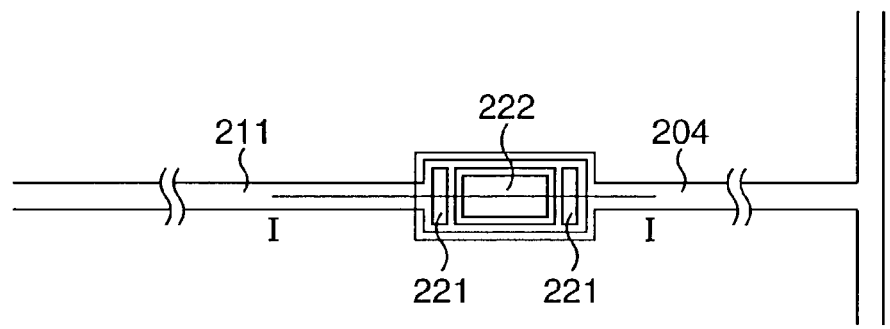
FIG. 64 is a schematic plan view showing a drain bus line terminal and its vicinity in the fourth embodiment.
Figure 65A:
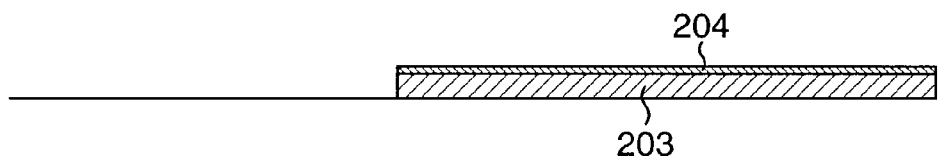
FIG. 65A to FIG. 65C are schematic sectional views showing the process of forming the drain bus line terminal.
Figure 65B:
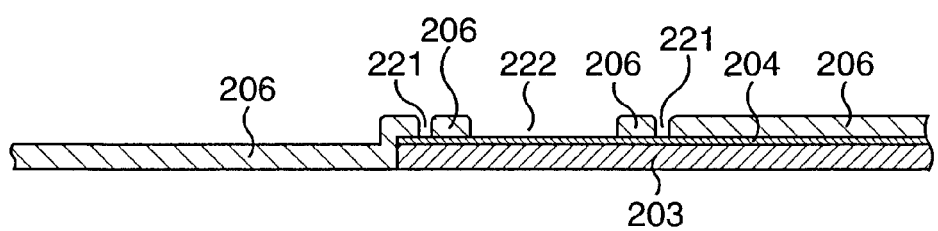
Figure 65C:
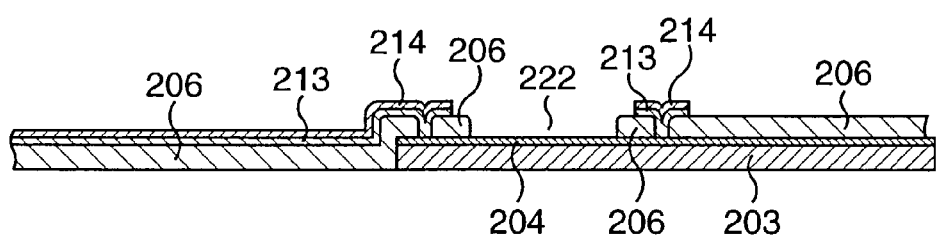

FIG. 58 and FIG. 59 are plan views of the TFT substrate. FIGS. 60A to 60E and FIGS. 61A to 61E are sectional views showing the process of manufacturing the TFT of this experiment. FIG. 62 is a plan view showing the gate bus line terminal and its vicinity. FIGS. 63A to 63D are sectional views showing the process of forming the gate bus line terminal. FIG. 64 is a plan view showing the drain bus line terminal and its vicinity. FIGS. 65A to 65C are sectional views showing the process of forming the drain bus line terminal.

First, the process of forming the TFT will be explained based on FIGS. 60A to 60E and FIGS. 61A to 61E, and thereafter, the process of fabricating the gate bus line and the process of fabricating the drain bus line will be explained.

Figure 60A:
FIG. 60A to FIG. 60E are schematic sectional views showing a method of fabricating a channel etch-type TFT in the fourth embodiment.

First, as shown in FIG. 60A, after an Al film 201 is formed on the glass substrate, the Al film 201 is patterned to form gate electrodes as well as the gate bus lines. In this case, a mixed solution of phosphoric acid, acetic acid, nitric acid, and water is used as an etchant of the Al film 201.

Figure 60B:
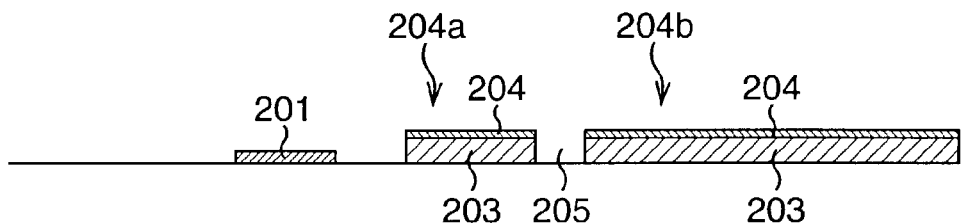

Subsequently, as shown in FIG. 60B, by a CVD method, an insulating film 203 such as SiN or the like is deposited overall, and following this, by a sputtering method, an ITO film 204 is deposited overall so as to have a thickness of about 50 nm and then patterned to form pixel electrodes 204b and peripheral connecting wires 204a. Incidentally, as shown in FIG. 58, domain regulating slit 205 is formed in the pixel electrode 204b. In this case, the ITO film 204 is etched by using a photoresist as a mask, and a hydrochloric acid ferric chloride hydrochloric acid solution, a mixed solution of hydrochloric acid, nitric acid, and water, or the like as an etchant, and the insulating film 203 is etched by a fluorine series gas by a reactive ion etching method.

Figure 60C:
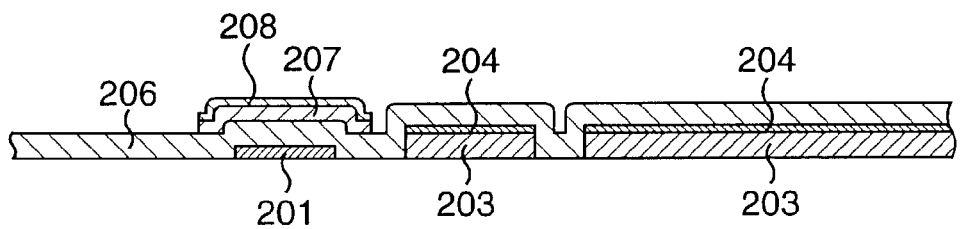

Subsequently, as shown in FIG. 60C, by a plasma CVD method, a SiN film 206, an a-Si operating semiconductor film 207, and an n$^+$a-Si film 208 are formed in sequence, and the n$^+$a-Si film 208 and the a-Si operating semiconductor film 207 are patterned with the photoresist as a mask by the reactive ion etching method in such a manner that at least only portions which are made gate electrodes and source/drain electrodes are left. When the n$^+$a-Si film 208 and the a-Si operating semiconductor film 207 are patterned, etching is performed by the fluorine series gas by the reactive ion etching method.

Figure 60D:
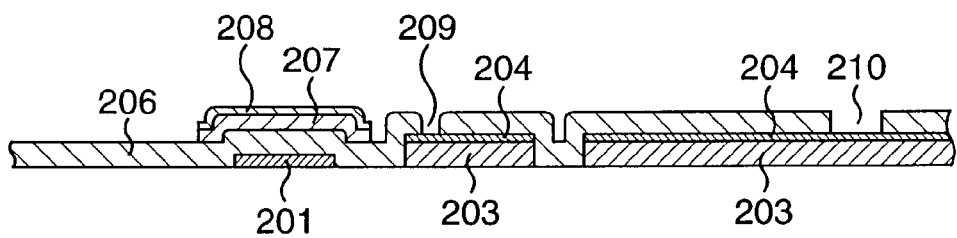

Thereafter, as shown in FIG. 60D, contact holes 209 of pixel electrodes, peripheral connect wire terminals, and gate bus line terminals are formed, and slits 210 of the gate insulating film (dielectric film) 206 are formed on the pixel electrodes. In this case, the gate insulating film (dielectric film) 206 is etched with the photoresist as a mask by the reactive ion etching method using the fluorine series gas. Incidentally, the gate insulating film is at least one type selected from the group consisting of SiN, SiO, SiON, Al oxide, Al nitride, a novolak resin, an acrylic resin, and a polyimide resin, and formed in a single layer or multiple layers.

Figure 60E:
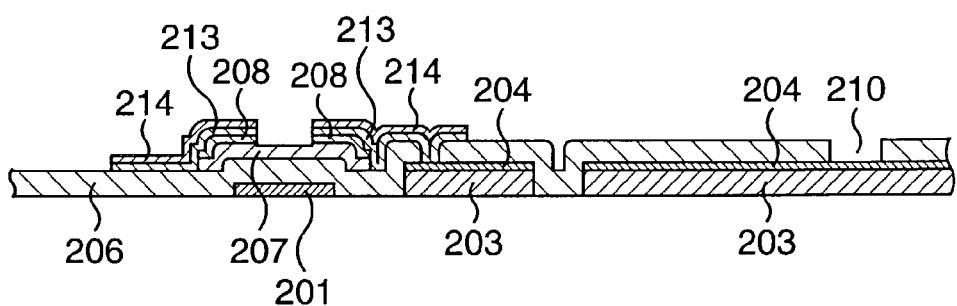

Subsequently, as shown in FIG. 60E, by the sputtering method, a Ti film 213 and an Al film 214 are stacked, and the Al film 214 to the SiN film 206 are patterned with the photoresist as a mask, and the Ti film 213, the Al film 214, and the n$^+$a-Si film 208 are divided on the a-Si operating semiconductor film 207 and extended to both sides, whereby a drain electrode and a source electrode are formed in a TFT formation region, and at the same time, the drain bus line linked to the drain electrode is connected to a peripheral connecting wire 204a, and the gate bus line is connected to the peripheral connecting wire 204a in a drain metal pattern. The TFT is thus completed. Incidentally, on the occasion of patterning, the Al film 213 and the Ti film 214 are etched by using a mixed gas of $BCl_3$ and $Cl_2$ by the reactive ion etching method. The plane state thereof is as shown in FIG. 58, and the TFTs are formed in a matrix shape above the glass substrate 1 as shown in FIG. 60E. Incidentally, a capacitive bus line 202 is formed in the middle portion in FIG. 58.

Next, a method of fabricating an etching stopper type TFT will be explained. The method of fabricating a channel etch type TFT is explained above with reference to FIGS. 60A to 60E, whereas the method of fabricating the etching stopper type one is shown in FIGS. 61A to 61E.

Figure 61A:
FIG. 61A to FIG. 61E are schematic sectional views showing a method of fabricating an etching stopper-type TFT in the fourth embodiment.

First, as shown in FIG. 61A, after the Al film 201 is formed on the glass substrate, the Al film 201 is patterned to form gate electrodes as well as the gate bus lines. In this case, the mixed solution of phosphoric acid, acetic acid, nitric acid, and water is used as the etchant of the Al film 201.

Figure 61B:
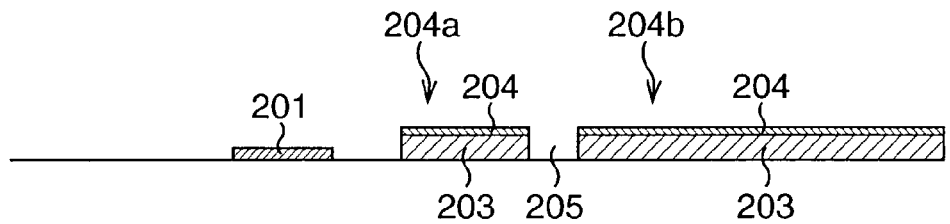

Subsequently, as shown in FIG. 61B, by the CVD method, the insulating film 203 such as SiN or the like is deposited overall, and following this, by the sputtering method, the ITO film 204 is deposited so as to have a thickness of about 50 nm and then patterned to form pixel electrodes and peripheral connecting wires 204a. Incidentally, as shown in FIG. 59, the domain regulating slit 205 is formed in the pixel electrode 204b. In this case, the ITO film 204 is etched by using the photoresist as a mask, and the hydrochloric acid ferric chloride hydrochloric acid solution, the mixed solution of hydrochloric acid, nitric acid, and water, or the like as an etchant, and the insulating film 203 is etched by the fluorine series gas by the reactive ion etching method.

Figure 61C:
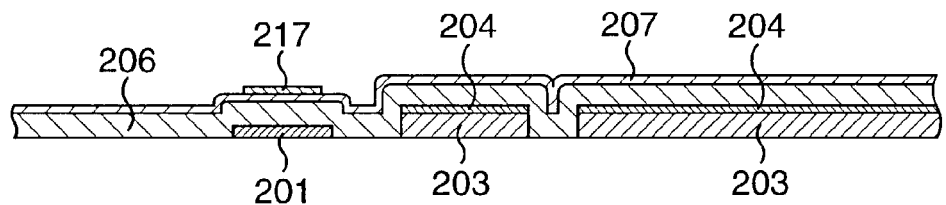

Subsequently, as shown in FIG. 61C, by the plasma CVD method, the SiN film 206, the a-Si operating semiconductor film 207, and a SiN channel insulation protective film 217 are formed in sequence, and the SiN channel insulation protective film 217 is patterned with the photoresist as a mask by the reactive ion etching method in such a manner that at least only portions which are made channels on the gate electrodes are left. When the SiN channel insulation protective film 217 is patterned, etching is performed using the fluorine series gas by the reactive ion etching method.

Figure 61D:
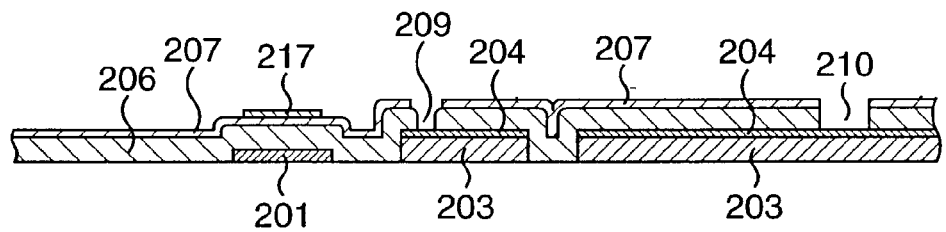

Thereafter, as shown in FIG. 61D, contact holes of pixel electrodes, peripheral connecting wire terminals, and gate bus line terminals are formed in the a-Si operating semiconductor film 207 and the gate insulting film 206, and slits 210 of the gate insulating film (dielectric film) 206 are formed on the pixel electrodes. In this case, the insulating film is etched with the photoresist as a mask and the fluorine series gas by the reactive ion etching method.

Figure 61E:
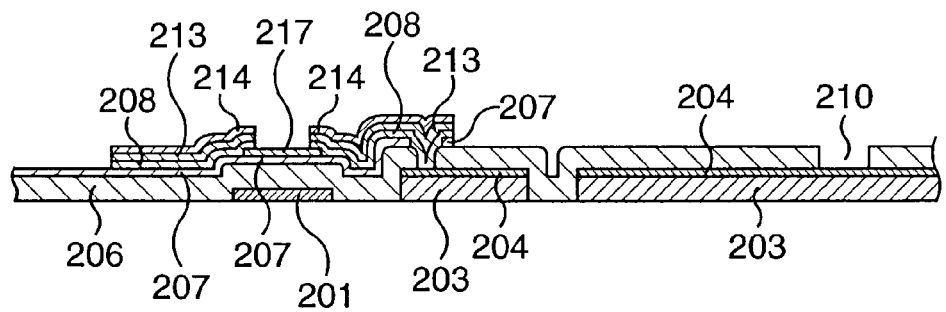

Subsequently, as shown in FIG. 61E, by the plasma CVD method, the $n^+$a-Si film 208 is formed, then by the sputtering method, the Ti film 213 and the Al film 214 are stacked, and the Al film 214 to the SiN film 206 are patterned with the photoresist as a mask, and extended to both sides of the gate electrode, whereby a drain electrode and a source electrode are formed in a TFT formation region, and at the same time, the drain bus line linked to the drain electrode is connected to a peripheral connecting wire, and the gate bus line and the peripheral connecting wire are connected in a drain metal pattern. The TFT is thus completed. Incidentally, on the occasion of patterning, the Al film 214 and the Ti film 213 are etched by using the mixed gas of $BCl_3$ and $Cl_2$ by the reactive ion etching method, and the $n^+$a-Si film 208 and the a-Si operating semiconductor film 207 are etched by the fluorine series gas. The plane state thereof is as shown in FIG. 59, and TFTs are formed in a matrix shape above the glass substrate 1 as shown in FIG. 61E.

Next, the process of forming the gate bus line terminal and the drain bus line terminal will be explained based on FIGS. 63A to 63D, and FIGS. 65A to 65C respectively.

First, as shown in FIG. 63A, as stated above, after being deposited on the glass substrate, the Al film 201 is patterned to form the gate electrodes, gate bus lines, and their terminals. Each of the gate bus lines extends, for example, in an X-direction on the glass substrate, and a plurality of gate bus line terminals linked with the gate bus lines are formed along two opposed sides of the glass substrate.

Subsequently, as shown in FIG. 63B and FIG. 65A, the insulating film 203 and the ITO film 204 are grown to form the pixel electrodes, and simultaneously the peripheral connecting wires 204a for integrating the ends of the gate bus lines and the drain bus lines are formed along the peripheral edge of the glass substrate. The insulating film 203 is removed with this mask pattern.

Thereafter, as shown in FIG. 63C and FIG. 65B, the SiN film 206, the a-Si operating semiconductor film 207, and the $n^+$a-Si film 208 are overall formed, and the $n^+$a-Si film 208 and the a-Si operating semiconductor film 207 are removed from above the gate bus lines and their terminals so as to leave only portions which are made the gate electrodes and the source/drain electrodes by patterning.

Then, as shown in FIG. 63C, on the gate bus line side, contact holes 218 and 219 of the pixel electrodes, the peripheral connecting wire terminals, and the gate bus line terminals are formed in the gate insulating film 206 above the gate bus line terminals 220. Meanwhile, as shown in FIG. 65B, on the drain bus line side, contact holes 221 of the drain terminals are formed in the gate insulating film 206 above the drain bus line terminals 222.

Subsequently, as shown in FIG. 63D and FIG. 65C, the Ti film 213 the Al film 214 are overall formed, and patterned to form the source electrodes and the drain electrodes, and simultaneously the drain bus lines to be integrated with the drain electrodes are extended in a Y-direction, whereby the drain bus line terminals are connected to the peripheral connecting wires. At the same time, the gate bus line terminals 220 and the peripheral connecting wire terminals, in which the contact holes 219 are formed, are connected by wires on the same layer. On this occasion, the peripheral connecting wires 204a themselves become the gate bus line terminals 220 and the drain bus terminals 222.

The plane state on this occasion is as shown in FIG. 62 and FIG. 64, and the drain bus lines are in a state of being connected to the peripheral connecting terminals. As a result, when the Ti film 213 is formed to form the drain electrodes, the Ti film 213 is in a state of conducting to the gate bus lines and the peripheral connecting wires 204a, and at the same time, the gate bus lines are connected to the peripheral connecting wires by wires on the same layer as that of a drain metal, whereby the gate layer and the drain layer have the same potential, which prevents electrostatic breakdown from occurring. Incidentally, before the drain electrodes are formed, there is no possibility of the occurrence of electrostatic breakdown. Accordingly, the gate insulating film is never broken down by static electricity, whereby the problem of a short circuit between the gate and the drain in the process of forming the TFTs is avoided. The process of forming the drain bus lines, gate bus lines, and their lead terminals is thus completed.

Incidentally, according to the aforementioned experiment, since the Ti film 213 for preventing a battery effect is formed after the pixel electrodes are formed by the ITO film 204, and thereafter the Al film 214 is formed, and drain electrodes 211 and the source electrodes 212 are then formed, the ITO pixel electrodes never make contact with the Al film 214, and hence corrosion due to the battery effect does not occur at the time of patterning of the Al film 214. In this case, the Al film 214 is formed for a reduction in resistance, and the Ti film 213 thereunder is provided as a barrier metal layer and a battery effect prevention layer. Incidentally, as a metallic film for a reduction in resistance, Au, Cu, Ag, and the like can be used in addition. As a metallic film for barrier effect prevention, Ta, Cr, Mo, W, and the like can be used. As the pixel electrode, in addition to the ITO film, tin oxide and the like can be used.

As explained above, according to this embodiment, it becomes possible to realize the MVA mode liquid crystal display in which the response speed on the low gray level side is increased, and manufacture this liquid crystal display efficiently without increasing the number of fabrication process steps.

Moreover, according to this embodiment, the drain electrodes and the drain bus lines are adapted to have the same potential with the gate electrodes via the peripheral connecting wires and the gate bus lines from a point in time when they are formed, whereby electrostatic breakdown of the gate insulating film in the deposition process and the dry etching process can be prevented from occurring.

According to the present invention, it becomes possible to increase the speed of halftone response by improving a delay in response speed at low gray levels, whereby very reliable image display having moving image performance almost equal to that of a CRT can be realized.

Moreover, according to the present invention, it becomes possible to increase the speed of halftone response by improving a delay in response speed at low gray levels, whereby moving image performance almost equal to that of the CRT can be realized, and by prescribing the shape of the bank-shaped projection, the time required to stabilize the alignment of liquid crystals can be drastically reduced. Consequently, on the occasion of the display of moving images, display with a little sense of incongruity can be obtained, and extremely reliable image display can be realized.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A liquid crystal display comprising:
a pair of substrates having electrodes; and
a liquid crystal layer sandwiched between said substrates,
wherein a bank-shaped projection made of an insulating material is formed on the electrode,
wherein regions with different threshold voltages are formed in each of display pixels, and
wherein control for a desired gray level display characteristic is performed by adjusting the threshold voltages.

2. A method of manufacturing a liquid crystal display constructed by sandwiching a liquid crystal layer between a pair of substrates having electrodes, comprising the steps of:
forming a bank-shaped projection made of an insulating material is formed on the electrode;
forming regions with different threshold voltages in each of display pixels; and
performing control for a desired gray level display characteristic by adjusting the threshold voltages.

3. A liquid crystal display comprising:
a pair of substrates having electrodes; and
a liquid crystal layer sandwiched between said substrates,
wherein a bank-shaped projection made of an insulating material is formed on the electrode,
wherein each of display pixels is divided into two or more regions having different capacitances by capacitive coupling, and
wherein voltages corresponding to the capacitances are applied to the respective regions in the application of a driving voltage.

4. The liquid crystal display according to claim 3, wherein, above one of the substrates, the respective regions are formed according to the presence or absence of the electrode, and on a layer under the electrode, a capacitive electrode which capacitively couples with the electrode is provided.

5. The liquid crystal display according to claim 3, wherein in a predetermined portion corresponding to the region on the layer under the electrode of one of the substrates, a capacitive electrode which capacitively couples with the electrode is provided.

6. The liquid crystal display according to claim 3, wherein the liquid crystal layer is composed of liquid crystals having negative dielectric constant anisotropy, liquid crystal molecules are aligned almost vertically when no voltage is applied, and the liquid crystal molecules are aligned almost horizontally when a predetermined voltage is applied.

7. The liquid crystal display according to claim 6, wherein a domain regulator for regulating the liquid crystal molecules so that the liquid crystal molecules are aligned on a tilt in a plurality of tilting directions in each of the display pixels when a voltage lower than the predetermined voltage is applied is provided.

8. The liquid crystal display according to claim 3, wherein a plurality of through-holes are formed densely in the electrode.

* * * * *